US006182153B1

United States Patent
Hollberg et al.

(10) Patent No.: US 6,182,153 B1
(45) Date of Patent: Jan. 30, 2001

(54) OBJECT-ORIENTED PROGRAMMING INTERFACE FOR DEVELOPING AND RUNNING NETWORK MANAGEMENT APPLICATIONS ON A NETWORK COMMUNICATION INFRASTRUCTURE

(75) Inventors: Ulf Hollberg, Wiesloch; Ralf Stefan Ehrlich, Karlsruhe; Ulrich Scheere, Sindelfingen; Olaf Zimmermann, Sandhausen, all of (DE)

(73) Assignee: International Business Machines Corporation, Armonk, NY (US)

( * ) Notice: Under 35 U.S.C. 154(b), the term of this patent shall be extended for 0 days.

(21) Appl. No.: 08/602,170

(22) Filed: Feb. 15, 1996

(30) Foreign Application Priority Data

Feb. 17, 1995 (EP) ................................. 95102234

(51) Int. Cl.[7] ................................................. G06F 13/00
(52) U.S. Cl. ................................................. 709/315
(58) Field of Search ................................ 395/683, 680, 395/682; 709/315

(56) References Cited

U.S. PATENT DOCUMENTS

| 4,994,998 | | 2/1991 | Anezaki | 364/900 |
|---|---|---|---|---|
| 5,210,535 | | 5/1993 | Fujita | 341/51 |
| 5,257,371 | | 10/1993 | Anezaki | 395/650 |
| 5,291,583 | * | 3/1994 | Bapat | 395/704 |
| 5,418,793 | | 5/1995 | Chang et al. | 371/27 |
| 5,418,963 | | 5/1995 | Anezaki et al. | 395/700 |
| 5,491,822 | | 2/1996 | Allen et al. | 395/700 |
| 5,504,906 | | 4/1996 | Lutoff | 395/700 |
| 5,506,985 | | 4/1996 | Motoyama et al. | 395/600 |
| 5,517,622 | * | 5/1996 | Ivanoff et al. | 395/200.62 |
| 5,519,868 | * | 5/1996 | Allen et al. | 395/704 |
| 5,530,864 | | 6/1996 | Matheny et al. | 395/700 |
| 5,568,605 | | 10/1996 | Clouston et al. | 395/182.02 |
| 5,572,724 | | 11/1996 | Watanabe et al. | 395/616 |
| 5,627,979 | * | 5/1997 | Chang et al. | 345/335 |
| 5,632,035 | * | 5/1997 | Goodwin | 395/704 |

OTHER PUBLICATIONS

SOMobjects Developer Toolkit Users Guide, Version 2.0, p. 6–1 thru 6–21, Jun. 1993.*
DSET Corporations, ASN.C Version 3.2 Programmer's Reference Manual, 1992, p. 5–1–5–10.*
Li et al, Object oriented construction of classes for communication protocols, 1993, International Journal of Mini and Microcomputers, vol. 15, No. 2, p. 90–94.*
IEEE Journal of Selected Areas in Communication, Aug. 1994, vol. 12, #6, pp. 1011–1019 "Automatic Translation of OSI Managed Object Classes . . . ".

* cited by examiner

Primary Examiner—Robert B. Harrell
(74) Attorney, Agent, or Firm—John J. Timar

(57) ABSTRACT

A programming interface for converting network management application programs written in an object-oriented language into network communication protocols. The application programs manipulate managed objects specified according to GDMO/ASN.1 ISO standards. Methods are provided for mapping from GDMO templates and ASN.1 defined types into C++ programming language.

The interface has both an object interface composing means for generating code which provides proxy managed object classes as local representatives for managed object classes, and a run time system means for providing proxy agent object classes as representatives for remote agents.

16 Claims, 4 Drawing Sheets

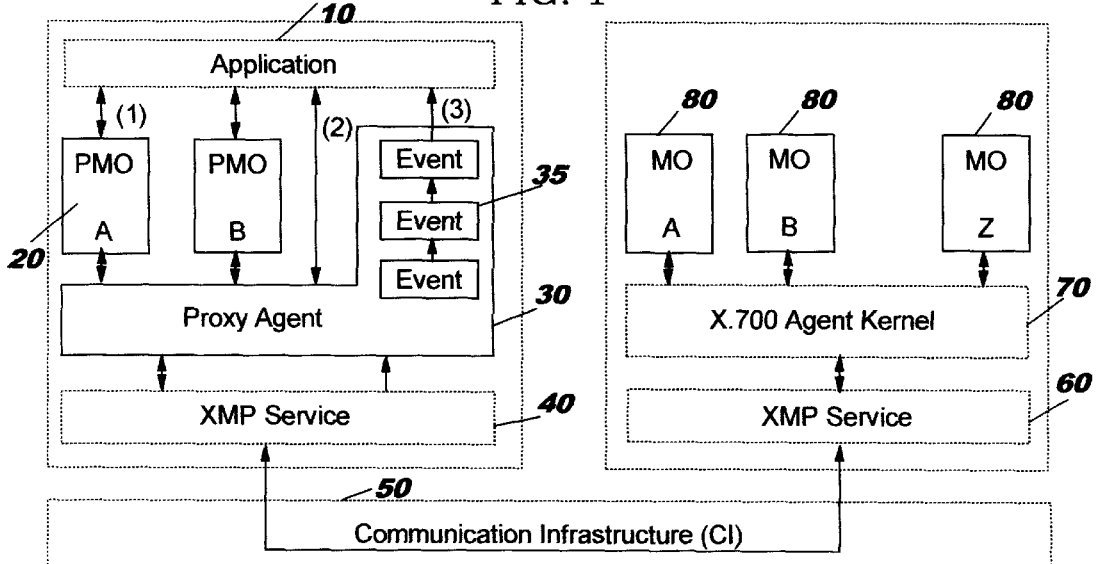

| GDMO Templates | Semantics |
|---|---|
| Managed Object Class | The basic template for the definition of entities of management information. Mainly references GDMO Package Templates. |
| Package | Three possibly empty sequences of names of<br>• GDMO Attribute Templates with annotation for accessibility, initial<br>• value, and value ranges,<br>• GDMO Action Templates and<br>• GDMO Notification Templates |
| Attribute | A reference to another attribute template (and optional modifiers), or a reference to an ASN.1 defined type with an indication on the required operations. |
| Attribute Group | Clusters of GDMO Attributes to allow to reference several Attributes at once under one name. |
| Action | Defines a method of the managed object class and optionally references to ASN.1 defined types for outgoing and incoming information. |
| Notification | References an ASN.1 type for the information which will be passd with the event notification of the defined type. In addition, parts of this ASN.1 structure can be named by Attribute template labels. |
| Parameter | This template permits the specification and the registration of a parameter syntax and behavior that may be associated with particular attributes, actions and notifications. |
| Name Binding | Defines the allowed naming and containment relationship between managed objects. This template is not of direct interest for generating source code for management applications. |

FIG. 5

| ASN.1 Primitive Types | |
|---|---|
| ASN.1 Primitive Types | Semantics |
| null | a type with an empty value "NULL" |
| boolean | Boolean values, this is, "TRUE" or "FALSE" |
| enumerated | a set of named values, for example, enum(red(1), green(2), blue(5)). |
| integer | integer of unlimited range |
| real | real numbers of an unlimited range and arbitrary precision |
| any | depreciated: intended as place holder, not as type |
| any defined by <x> | as any, but <x> identifies the syntax to the application |
| object identifier | a unique identifier |

| ASN.1 String Types | |
|---|---|
| ASN.1 String Types | Semantics |
| bit string | a sequence of bits |
| octet string | a sequence of octets (that is, 8 bits) |
| <x>-string | sequences of characters from some alphabet <x>, for example, IA5String |
| generalizedTime | a general time stamp |
| utctime | a universal time stamp |

| ASN.1 Constructors | |
|---|---|
| ASN.1 Constructors | Semantics |
| choice | a set of named alternatives |
| sequence | a ordered set of named components of various types |
| sequence of <x> | a ordered set of components of the type <x> |
| set | a unordered set of named components of various types |
| set of <x> | a unordered set of components of the type <x> |

OBJECT-ORIENTED PROGRAMMING INTERFACE FOR DEVELOPING AND RUNNING NETWORK MANAGEMENT APPLICATIONS ON A NETWORK COMMUNICATION INFRASTRUCTURE

A portion of the disclosure of this patent document contains material which is subject to copyright protection. The copyright owner has no objection to the facsimile reproduction by anyone of the patent document or the patent disclosure, as it appears in the Patent & Trademark Office patent files or records, but otherwise reserves all copyright rights whatsoever.

BACKGROUND OF THE INVENTION

This invention is directed to a programming interface for developing and running network management application programs written in an object-oriented language having object class definitions, on a network communication infrastructure wherein the application programs manipulate managed objects that are specified according to the GDMO/ASN.1 ISO standards and are made available at remote management agents through the communication infrastructure. Beyond this it relates to methods for mapping from Guidelines for Definition of Managed Objects (GDMO) templates and Abstract Syntax Notation One (ASN.1) defined types into the C++ language and a platform for the implementation of the interface.

OSI network management applications and CCITT Telecommunication Management Network (TMN) applications are based on the ability to manipulate managed objects which are specified in GDMO/ASN.1 and which are made available at remote management agents through a communication infrastructure.

Currently, XMP/XOM from the X/Open [X/Open XMP] is the only standardized API to the communication infrastructure for management applications. XMP/XOM is cumbersome to use. XMP/XOM based applications are lengthy and difficult to write, understand and debug. Furthermore XMP/XOM does not allow for static (compile time) type checking, so that many type errors show up at run-time. Therefore most programmers certify that using XMP/XOM is cumbersome and time consuming. Implementers of network management applications are thus confronted with the user unfriendliness of the XMP/XOM interface.

In order to promote code quality and reusability more and more applications are written in the object-oriented programming language C++. Even though management information is defined in the object-oriented specification language GDMO, XMP/XOM uses the C language.

Further, managed objects are formally specified in GDMO and ASN.1. Development tools that support GDMO and ASN.1 can thus drastically reduce the development time of network management applications. Therefore a demand for a C++ embedding to hide the intricacies of XMP/XOM and GDMO based tools to support the development of OSI management applications is ascertainable.

The development of applications within the OSI management framework [ISO 10040] is a rather complex undertaking. The estimated costs for the development of new applications support this perception. In order to boost the development process, additional support by higher-level interface and corresponding tools is required.

SUMMARY OF THE INVENTION

It is therefore an objective of the invention to develop an object-oriented interface (OOI) which provides an object-oriented abstraction of OSI management information and services for use in regular, non-distributed applications.

A further objective of the invention is to provide an OOI for access to managed objects which is simple to use.

Further objectives of the invention are to relieve the application programmers from most technical details related to communication and XMP/XOM, to provide an object-oriented, strong typed language embedding of management information and management services into C++, to generate automatically methods to manipulate specified managed objects, and to be open to future management paradigms or communication infrastructures, such as OSF-DME.

The requirements for the OOI design thus can be summarized as follows:
1. relieve the application programmers from most technical details related to communication and XMP/XOM;
2. provide an object-oriented, strong typed language embedding of management information and management services into C++;
3. automatically generate methods to manipulate specified managed objects; and
4. be open to future management paradigms or communication infrastructures, such as OSF-DME.

These problems are solved by the features of the invention laid down in the independent claims. The programming interface (OOI) according to the invention provides access to managed objects via telecommunication networks. The Object Interface Composer (OIC) automatically generates C++ class definition and implementation files based on managed object specifications written in GDMO and ASN.1 and thus increases the efficiency of program developers. Using the OOI, a network management application can access managed objects stored at remote agents through methods of those generated classes.

The intricacies of XMP/XOM are hidden from the application programmer by C++ classes. As a result application programmers can concentrate on writing their application instead of having to deal with communication protocols or low level interfaces to the communication stack. The OOI hides the intricacies of the communication infrastructure and particularly that of XMP/XOM behind a programmer-friendly object-oriented C++ operator interface.

As opposed to XMP/XOM based code, OOI based code is concise and readable. The OIC may also comprise means for minimizing the number of generated classes and the number of objects to be handled by an application at run time, i.e., the OIC generates C++ classes for the relevant GDMO templates only. The OOI therefore drastically simplifies the development of management applications by hiding the XMP API below C++ objects.

Furthermore the full embedding of managed objects into C++ allows for strong type checking at compile time, whereas cumbersome debugging is usually necessary for XMP/XOM based applications. Without the OOI, programmers either use the cryptic and C-oriented XMP/XOM API or develop some kind of OOI on their own. Such ad hoc solutions take time to develop and usually lack the support of a source code generator similar to the OIC so that the managed object specification must be manually translated. Those solutions are of course time consuming and error prone. With the OOI, the additional development effort and the weaknesses of ad hoc solutions can be avoided. The OOI Run Time System provides C++ classes which allow convenient access to the Common Management Information Service (CMIS).

Both, the object-oriented interface (OOI) for use in OSI management applications and the related Object Interface Composer (OIC), minimize the effort needed to build the communication related functions of management applications.

An application written on top of the OOI is independent of the management service provider. The current version of the OOI is based on the XMP/XOM [XMP] service, but future versions of the OOI could use a different communication vehicle such as OSF-DME. The application could be ported to a new service provider with minimal effort. The OOI API does not depend upon XMP/XOM so that applications do not need to be rewritten when the OOI is ported to another communication infrastructure.

Preferred embodiments of the interface according to the invention are characterized in the claims. The OOI provides static type checking and is easy to use. The OSI definition of management information is object-oriented, thus the OOI takes advantage of object-oriented design techniques and provides a genuine object-oriented interface written in C++.

Managed objects (MO) are formally described in the GDMO/ASN.1 language. This allows for the automatic generation of MO specific source code. The Object Interface Composer (OIC) takes MO specifications that conform with GDMO/ASN.1 and generates C++ classes that provide methods to manipulate these objects. The OOI further provides methods to manipulate standardized MOs.

Strong typing is commonly defined as the compile time checking of type compatibility in programs; it is frequently used as co-notation of 'static typing'. This means that a correctly compilable program in strong typed language, such as C++, will be guaranteed to be type safe. Type safeness means that variables have a defined type which completely specifies the value range and the permissible operations on the values of the type. Also, constants must be defined as specific values of certain types. This argument also applies to the type checking of parameters of procedures.

The net effect of strong typing is that the compiler will detect and prohibit the invocation of undefined methods on variables and illegal assignments of values of type X to variables of type Y. In this context, illegal means that no appropriate typecast has been defined explicitly.

With respect to object-oriented languages, strong typing is of even greater importance because in these languages it is common to define many application oriented types. In writing distributed applications, debugging is far more complicated than for local programs. Without strong typing, errors may be caused by unintended misuse of defined variables. Obviously, the avoidance of these errors saves debugging time.

Further, type safeness is essential for applications which will be installed in a wide range of network conditions. Using strong typing, the compiler is enabled to perform the compatibility checks for assignment, procedure parameters etc. If the compiler does not guarantee type-safe programs, the type safeness must be enforced at run-time by checking the type compatibility at the right locations in the program, which is by itself an error prone task. The execution time for these run-time checks may reach a non-trivial percentage and thus degrade the performance of the application.

The OOI supports strong, static typing for management applications which work with a known inventory of management information. In addition, the generic part of the OOI supports generic management applications. Finally, to allow the coexistence of generic and strong typed components within the same application, the OOI makes provision for using the same objects through the type-safe and the generic interface. This means that by using the OOI, objects will be allocated and used in a strong-typed manner as long as their types are known at compile time. In addition, objects of types which are unknown at compile time, may be allocated and used via the 'weak'-typed interfaces.

The invention is also related to methods for mapping GDMO templates and ASN.1 types into C++ classes. These objects of the invention and the programming interface itself will become clear with regard to preferred embodiments of the invention which are illustrated by the appended drawings.

BRIEF DESCRIPTION OF THE DRAWINGS

FIG. 1 shows the OOI components and their run-time environment.

FIG. 2 gives a tabular overview of GDMO templates and their intended use.

FIG. 5 shows the data types available in ASN.1.

DETAILED DESCRIPTION OF THE PREFERRED EMBODIMENT

Figure 3:
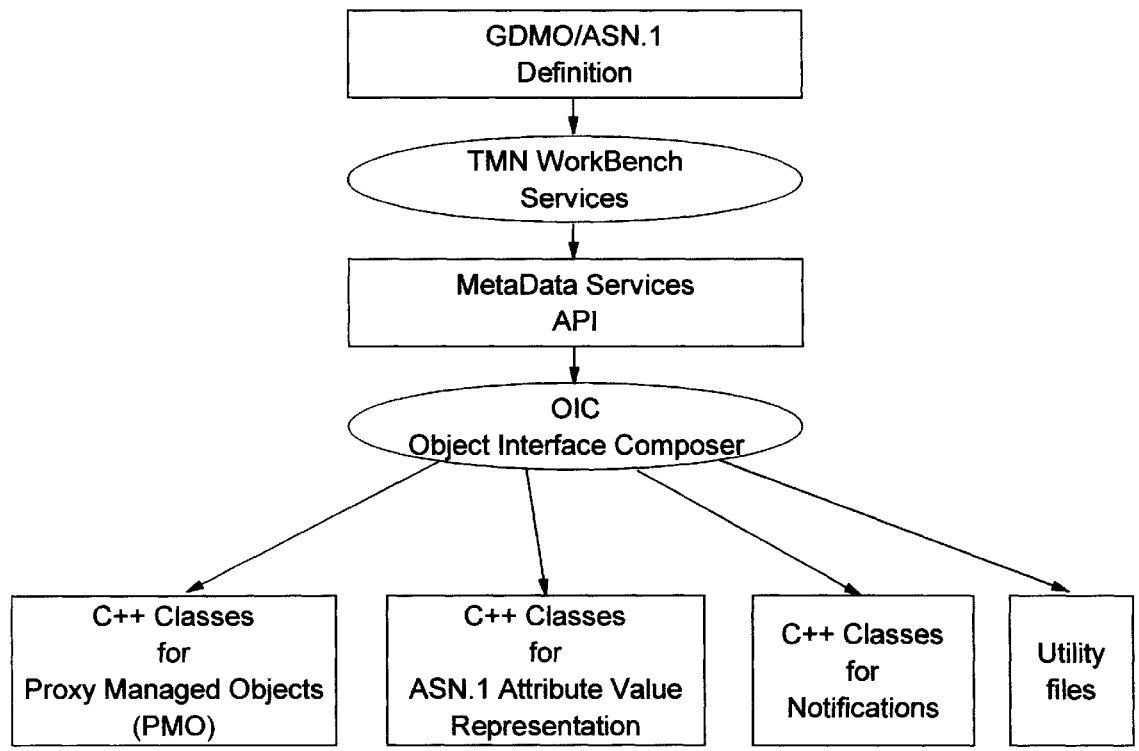
FIG. 3 shows a flow chart of the GDMO/ASN.1 compilation process.

The OOI design is based on the following object-oriented abstractions of the major constituents of OSI management:

1. Management information is represented by managed objects, notifications, and ASN.1 types.

2. Management services are provided by proxy agents.

These abstractions allow the OOI to provide an easy to use programming interface. Furthermore, they separate the OOI implementation from the application, thus allowing for several different OOI implementations which are based on different communication infrastructures, to be exchanged transparently to the application.

FIG. 1 shows the run-time environment of the OOI according to the invention. The OOI components are drawn with solid lines. An application 10 can interact with the OOI through proxy managed objects (PMO) 20 (arrow 1), directly through the proxy agent objects 30 (arrow 2), or through the notification event queue 35 (arrow 3). The OOI uses the XMP API 40 to access the communication infrastructure (CI) 50 which allows it to communicate with an agent 70 that implements the managed objects (MOs) 80.

The proxy agent 30 provides the Common Management Information Service (CMIS) interface as standardized by the ISO [ISO 9595 (CMIS)]. Proxy agents 30 are C++ classes which hide the C-oriented XMP API 40. Proxy managed objects (PMO) 20 are local representatives of remote managed objects 80. PMOs 20 are instances of C++ classes that are automatically generated by the Object Interface Composer (OIC). PMOs 20 provide methods for strong typed access to the ASN.1 values of the attributes of managed objects and to the parameters of actions.

Incoming notifications are stored in an event queue 35. Notifications are instances of C++ classes that are automatically generated by the Object Interface Composer (OIC). Notification classes provide methods for the strong typed access to the ASN.1 values of the information and reply syntax of notifications.

The ASN.1 values of GDMO attributes, of GDMO action information parameters and of notification information and reply syntax are represented by instances of ASN.1 type C++ classes which are also automatically generated from the ASN.1 definitions parsed by the OIC. The ASN.1 type C++ classes provide a set of methods to manipulate the values of the ASN.1 type.

The OOI Run Time System (RTS) and the Object Interface Composer (OIC) thus offer maximum development support for those applications. The OOI Run Time System (OOI RTS) provides easy to use C++ classes to access management information and management services (XMP/XOM). The OIC and the RTS are closely related; in fact the code generated by the OIC must be linked to the OOI RTS to become executable.

The use of strong-typed local representations of remote managed objects and the generation of proxy managed object (PMO) classes with the Object Interface Composer causes a paradigm shift from weakly-typed message-oriented communications programming to strongly-typed local object-oriented programming. This will increase the productivity of regular programmers and enable more programmers to develop management applications.

The OOI provides the following features:
1. Supports management applications written in C++
2. Uses GDMO and ASN.1 definitions as abstract object definitions
3. Uses automatically generated C++ classes from GDMO/ASN.1 definitions (done by the OIC)
4. Relieves the application developer from intricacies of communication interfaces
5. Separates the application from communication interfaces and technologies
6. Provides strong and weak type interface support
7. Provides run-time type information (meta information)
8. Offers a generic communication class (proxy agent) with CMIS functionality
9. Leaves open the migration path towards future communication architectures such as Common Object Request Broker Architecture (CORBA) from Object Management Group (OMG).

These features are detailed in the following sections.

Mapping of GDMO templates into C++ Classes

GDMO defines several templates for the definitions of management information. Documents such as Desktop Management Interface (DMI) or M3100 define managed objects with those templates. The Object Interface Composer (OIC) parses GDMO managed object definition documents (such as DMI) and generates C++ classes that represent the managed objects. This section briefly describes the templates defined in [ISO 10165-4(GDMO)] and explains how managed objects defined with those templates are mapped into C++ classes by the OIC.

FIG. 2 gives an overview of the GDMO templates and their intended use. The OIC provides great flexibility for the generation of C++ classes for objects defined using the GDMO templates. It was decided not to generate one class for every usage of any template in the parsed document because of the huge number of classes that would have been generated using this approach. Instead, the OIC was configured to minimize the number of generated classes and the number of objects to be handled by the application at run time.

The OIC generates C++ classes for the relevant GDMO templates only. Managed objects are the most relevant objects for management applications. A C++ class is generated for every GDMO managed object class. The C++ classes reflect the inheritance hierarchy defined in the GDMO document.

The major interest of application writers is to get or set the values of the attributes of managed object instances, and to perform actions on them. Generating classes for GDMO packages and GDMO attributes would force the application to traverse two additional objects to get access to the value of an attribute.

However, no classes are generated for GDMO package and GDMO attribute templates. Instead, each managed object class provides methods to manipulate its attributes. Attributes have values which can be complex structures defined in ASN.1. A C++ class is generated for each attribute type defined in the GDMO/ASN.1 document parsed by the OIC. These classes provide methods to manipulate the attribute values.

Access methods to attributes are generated as methods of the managed objects classes of the managed objects that contain the attribute. A C++ class is generated for each ASN.1 type. These classes provide methods to manipulate the values of the attributes.

Also no classes are generated for GDMO action templates. Instead access methods for actions are generated as methods of managed objects without further indirection.

GDMO notifications may arrive more or less unexpectedly at the management application and contain structured information of some types defined in ASN.1. A reply information structure may have to be transferred as a possible confirmation to the notification. Therefore, a C++ class is generated for every GDMO notification template. This class provides appropriate access methods to the structured information. Confirmable notifications have a reply( ) method. The optional attribute identifiers are used to generate additional access methods. The errorReply( ) method allows the return of appropriate error information to the issuer of the notifications.

GDMO parameters are not represented by classes. GDMO parameters are rarely used and parameter information can alternatively be transferred through ASN.1 syntax.

GDMO name bindings are not represented by classes. Name binding information is regarded to be of low relevance for management applications.

The Abstract Syntax Notation One (ASN.1) is used by GDMO to define all values which are transmitted between management applications and agents. As mentioned above, C++ classes are generated for all ASN.1 types.

The following restrictions are introduced to the design to improve the usability and the performance of the OOI: the value clauses limit the value range of GDMO attributes of managed objects. These clauses are of importance to agent implementers but not to application implementers. The OOI could be designed to perform run-time checking on the attribute values ("within range?"), but since this checking has to be done in the agent it is estimated that the performance cost is not justified. The value clause is therefore ignored by the OIC.

GDMO packages are regarded as an aid for the definition of managed object classes. According to the GDMO standard, they are of no interest to management applications at run-time, because the attributes, actions and notifications which are defined within packages must be treated as properties of the managed object classes themselves [ISO standard 10165-4 (GDMO)].

GDMO attribute templates point (at least indirectly through another attribute) to the type of their value defined in ASN.1, assign an object identifier to this type and list the operations to be made available for the applications. The type information is kept in the GDMO attribute meta objects. The value is made accessible directly by the managed object, thus avoiding a superfluous hop and a separate run-time object.

Strong and Weak Typed Usage

In order to support generic applications that can handle any object as well as specific applications that are tailored to handle a well known subset of the objects, all objects can be accessed in strong-typed and in weak-typed fashion.

The weak-typed interface can be used to manipulate objects whose type is not yet known at compile time, e.g. analyzing the result of a scoped get, done when a scoped management request returns the management information for several managed object instances as a list of generic managed object instances.

The strong-typed interface should be used whenever possible to allow the compiler to detect type errors that would otherwise result in CMIP errors (or core dumps in an application that directly uses XMP/XOM API) and to avoid time consuming run-time type checking that affects performance.

Both types of interfaces can be used interchangeably and concurrently within the same application.

Proxy Agents

The proxy agent class is one of the fundamental abstractions of the OOI. The proxy agent provides the Common Management Interface Service (CMIS). A proxy agent object acts as a proxy for a real, remote agent. Proxy agent objects are local to the management applications. Agents are not aware of the existence of proxy agent objects. Proxy agent objects hide the XMP-session and the XMP-context C-structure and the related XMP operations behind convenient methods of the proxy agent class.

Proxy Managed Objects

Proxy Managed Objects (PMO) are stateless representations of managed objects that are instantiated in agents. Each PMO C++ class provides a set of object class specific methods through which a management application can conveniently submit CMIS requests to query or manipulate the real managed object in the agent. A management application typically instantiates an instance of a PMO class for each real managed object that it wishes to interact with.

Meta-Information

Meta-information provides the type information derived from GDMO/ASN.1 specifications which is made available at run time.

For the OOI, the presence of meta-information is essential to support the mixed usage of strong- and weak-typed interfaces. The meta-information will most likely be used for the conversion between the binary and string representation of objects. In addition, the meta-information of ASN.1 objects is used for encoding and decoding of their values.

For the OOI, every GDMO/ASN.1 object has a pointer to its meta-information object. All instances of one class share the same instance of meta-information object.

The OOI Environment

The OOI Environment object has a single instance in the applications, in order to cluster those objects which belong to the OOI, e.g. proxy agents or meta-information objects. The OOI Environment becomes visible to the programmer at initialization time and when the application should wait for the first event which happens on any of the existing proxy agent objects, i.e., on any of the active XMP sessions.

GDMO/ASN.1 Object Interface Composer

The Object Interface Composer (OIC) is a tool for the generation of source code based on the specifications of management information in GDMO and in ASN.1. It takes its input from managed object class definitions written in accordance with the ISO standard "Guidelines for the Definition of Managed Objects" (GDMO) [ISO 10165-4 (GDMO)] and generates C++ classes (header and implementation files) for the managed objects, ASN.1 types and notifications defined in the selected document. The Object Interface Composer (OIC) therefore serves as a GDMO/ASN.1 compiler generating C++ classes for XMP/XOM from GDMO/ASN.1 definitions. The Appendix illustrates C++ classes generated for GDMO managed objects and ASN.1 notifications.

The OIC is based on the IBM TMN WorkBench/6000 [WorkBench] product. GDMO and ASN.1 documents are parsed and stored in a relational database or in a shared library by the Managed Object Compiler (MOC) of the WorkBench. The Workbench then provides the GDMO and ASN.1 information through an API.

The OIC generates:

a C++ class for every GDMO managed object class;

a C++ class for each ASN.1 type;

a C++ class for every GDMO notification;

meta information data structures for GDMO and ASN.1;

a set of utility files.

The GDMO/ASN.1 compilation process is shown in greater detail in FIG. 3 and is described in the following.

Proxy Agent Objects

Proxy agent objects are local to the management applications. Agents are not aware of the existence of proxy agent objects. Proxy agent objects hide the XMP session and context C-structure and the related XMP operations behind convenient methods of the proxy agent class. The implementation of the proxy agent class is provided in Listing 1 in the Appendix.

The proxy agent implementation provides synchronous and asynchronous methods. Synchronous methods do not return control to the application until a request is fully processed. Using synchronous OOI methods, a single process application blocks for an undetermined time while a CMIP request is being processed. This behavior may be appropriate for very simple applications, but not for an application that is user-interactive.

Asynchronous methods return control to the application as soon as a CMIP request is sent.

Proxy agent objects provide a service interface to the create, get, set, action, cancelGet and delete operations of CMIS. This service is used internally by the OOI implementation of proxy managed objects and by generic management applications which want direct access to a CMIS interface without using the proxy managed object abstraction. This interface is not directly used by applications which access managed object information through the proxy managed object (PMO) abstraction.

Incoming notifications are queued in the event queue 35 of the responsible proxy agent 30. The application can thus process notification at its leisure. The OOI optionally can trigger an application callback upon receipt of a notification.

Two distinct implementations of proxy agents for direct addressing (DA) and for non-direct addressing (NDAPA) are provided. A direct addressing proxy agent (DAPA) can connect to one specific agent at a time. DAPAs can be used by management applications which communicate with one specific agent. DAPAs are implemented in the "ProxyAgentDA" C++ class. Non-direct addressing proxy agents (NDAPA), are not connected to specific agents. For each management request, the agent must be addressed in one of two ways: explicitly by supplying an addressing parameter as part of the request and implicitly through the object registration service (ORS). In this case, XMP determines the agent's address with the help of the ORS directory service based on the object class and the object instance information of the request. NDAPAs are implemented by the "Proxy-AgentNDA" C++ class.

Direct Addressing Proxy Agents (DAPA)

A DAPA object represents a real, remote agent. The connect( ) method with appropriate parameters will establish a connection (XMP session) to this agent. The disconnect methods will release that session binding.

The creation of a direct-addressing proxy agent object in a management application for use with a specific agent neither implies, that this agent exists, nor that it can be connected. No verification is done when the DAPA object is created. The initial state is disconnected.

The management application must explicitly try to connect the DAPA object to a real agent. This attempt may fail. If the connect succeeds, the DAPA object is in state "connected" and is able to transmit management requests to that agent. Internally, the connection between the DAPA and the agent is based on an XMP session.

The management application can explicitly disconnect a DAPA from the agent. A connection can also be aborted by the agent or by the management information service provider. The DAPA object is then in the "disconnected" state and can be reconnected to the same agent or to any other agent.

Non-Direct-Addressing Proxy Agents (NDAPA)

A management application can instantiate only one indirect addressing proxy agent object. The successful creation of an NDAPA does not imply, that there is an agent available for communication. No verification is done when the NDAPA is created. The management application must explicitly try to connect to the postmaster daemon process. Using the connect( ) method, a non-direct addressing XMP session is established. This session remains active until the management application or the postmaster closes it. As long as the NDAPA object is in the connected state, it can be used to communicate with any agent. The postmaster daemon process directs network management information between multiple applications and agents running concurrently. The postmaster determines the route by using specified addresses or a routing table that is configured in the object registration service.

Mixing DAPA and NDAPA

Several DAPA objects and one NDAPA object may exist in the same management application at the same time. Each of the connected proxy agents has a connection (XMP session) with the agent. The OOI design intends that a management application should only connect one proxy agent object to a specific real agent. If the application tries to use two DAPA objects to communicate with the same agent, or uses a DAPA and the NDAPA to communicate with the same agent, the noticeable effects are strictly dependent on the behavior of XMP and the postmaster. In such cases it is possible that event forwarding discriminators created over one proxy agent object cause notifications to appear on a different XMP session and consequently, in the event queue of a different proxy agent object.

Operations Provided by Proxy Agents

Management operation can be performed on one or more attributes of one or more objects. The proxy agents provide the full set of CMIS services with all parameters as defined in the standard [ISO 9595 (CMIS)]. The resulting structure of the argument and result parameters of the CMIS operations of the proxy agent interface are complex. Therefore, a set of additional methods "simple-create", "simple-get", "simple-set", "simple-action" and "simple-delete" is provided with fewer and simplified parameters to perform operations on only one attribute of one managed object or on several attributes of a single managed object.

The following methods to inquire as to the state and properties of a proxy agent are provided:

The connect( ) method establishes an XMP binding between the proxy agent and an agent or the postmaster.

The disconnect( ) method terminates the XMP binding between the proxy agent and an agent or the postmaster.

The isConnected( ) method checks whether the proxy agent is in the connected state or not.

The id( ) method returns the local id for the proxy agent. The id can be used to distinguish this instance from other instances of proxy agents within the same application.

The fileDescriptor( ) method returns the file descriptor (e.g. in AIX) which is associated with the XMP session. The AIX file descriptor is needed for advanced applications which want to write their own AIX 'select' call, e.g. to synchronize between OOI and Xwindows.

The reset( ) method terminates all activities associated with the proxy agent and re-establishes its initial state, including a disconnect( ).

The following methods to access and modify the underlying XMP data structures are provided:

XMPSession( ) returns a reference to the XMP session which is associated with the proxy agent instance.

contextControls( ) returns a reference to the XMP context object.

sessionControls( ) returns a reference to the XMP session object.

setPresentationModule( ) replaces the defined presentation module.

The following methods to inquire as to the state and properties of a proxy agent are provided:

dump( ) prints out the complete internal status of the proxy agent instance.

dumpRequestQueue( ) prints out the elements of the queue that stores requests to be sent to the agent.

dumpCompletedQueue( ) prints out the elements of the queue of requests to which the agent has replied.

The following methods offer the full CMIS functionality:

MCreate( ) creates a managed object instance at an agent's site

MDelete( ) deletes one or more managed object instances at an agent's site

MGet( ) gets attribute values of one or several managed objects from an agent

MSet( ) replaces the values of attributes of one or several managed objects at an agent MAction( ) invokes an action of one or several managed objects at an agent.

The following methods are provided for easy to use synchronous CMIS functionality:

simpleMCreate( ) creates a managed object instance at an agent's site simpleMDelete( ) deletes a managed object instance at an agent's site simpleMGet( ) gets one attribute of a managed object from an agent simpleMGetSome( ) gets some attributes of a managed object from an agent simpleMSet( ) replaces one attribute of a managed object at an agent simpleMSetSome( ) replaces some attributes of a managed object at an agent simpleMAction( ) invokes the action of a managed object at an agent.

The following methods to wait for the completion of a request or a notification are provided:

wait( ) waits for a specified amount of time;

poll( ) checks with XMP whether something has arrived.

The following methods to inspect the local state of the proxy agent are provided:

HasNotificationQueue( ) checks whether this instance has a notification queue, i.e. is prepared to receive notifications notificationQueue( ) returns a reference to the notification queue of the proxy agent requestQueue( ) returns a reference to the request queue of the proxy agent completedQueue( ) returns a reference to the completed queue of the proxy agent.

The implementation of the queues used by proxy agent objects is provided in Listing 2 in the Appendix.

The Event Queue

The proxy agent objects 30 contain an externally visible event queue object 35 where the received notifications are stored as typed objects (see arrow 3 in FIG. 1). Notifications are received at any time when the proxy agent 30 is receiving messages from its XMP session. The management application may process the notifications in the queue 35 at any time.

The event queue 35 is optional. A different constructor can be used for proxy agents whose role does not include monitoring so that they will never receive any notifications. The notifications are represented by typed notification objects. They are inserted into the event queue of their proxy agent instance as soon as they arrive at the XMP session. Notification objects remain in the event queue, until they are explicitly deleted by the delete( ) method. For confirmable notifications, the application should invoke the errorReply( ) or the reply( ) method before the delete( ) method, otherwise the agent waiting for the confirmation might get confused.

For direct-addressing proxy agents, the source of the notification is the specific agent, whereas for indirect addressing proxy agents, the source can be any agent (excluding those for which an direct-addressing proxy agent with role monitoring exists in the same application). The requester address of the sending agent and the requestor title of the sending agent are not available from XMP.

For asynchronous requests, a request object is allocated by the application and passed to the OOI. This object contains a list, which will be used to collect all replies to this particular request, regardless of whether the replies are successful results or error results. The application explicitly passes control to the OOI run-time system (RTS) by invoking a method to check upon or to wait for the reception of incoming messages.

Wait Methods

Since several proxy agent objects may exist at the same time in the same application, several wait methods are available:

The global wait method returns if anything was received on any proxy agent object, (i.e. on any XMP session).

The wait method of the proxy agent returns if anything was received on that session.

The wait method of the request object returns if anything was received on that request object.

It is necessary to distinguish between a single-event-mode wherein only a single incoming response or notification indication is received, added to the related queue and returned to the application, and a wait-for-completion-mode wherein partial replies to outstanding requests do not cause the end of the wait method. A completed request or a notification will end the wait of the application.

Request Objects

Request objects represent asynchronous requests which the application intends to send or has sent to a remote agent. These objects contain all the information needed to keep track of the request, to synchronize with the reply and to access the results or error information. The implementation of the request class for the OOI is provided in Listing 3 in the Appendix.

Request objects must be explicitly created and deleted by the application. Request objects can be reused several times.

The following methods to inquire as to the status of a request object are provided:

confirmationMode( ) returns a reference to the actual confirmation mode of the request, toBeConfirmed( ) checks whether the confirmation mode is set to "confirm"

waitMode( ) distinguishes between the single event of completion mode for wait methods invokeId( ) returns the invocation identifier state( ) returns the processing state, e.g. 'outstanding' stateAsString( )returns the processing state as a string isIdle( ) queries whether the state, is "idle"

isOutstanding( ) queries whether the state is "outstanding"

isCompleted( ) queries whether the state is "completed"

completionState( ) returns the completion state, completionStateAsString( ) returns the completion state as a string isNormallyCompleted( ) queries the completion state, isCouldNotBeIssued( ) queries whether the completion is due to a local error isAbandonedByUser( ) determines if the user has aborted the request isAbortedByProvider( ) determines if the service provider, e.g. XMP, aborted the request errorOccurred( ) checks if an error occurred numberOfResultElementsReceived( ) returns the number of results in the result queue numberOfServiceErrorsReceived( ) returns the number of service errors encountered during processing numberOfNonServiceErrorsOccurred( ) returns the number of non-service errors The following methods to update data members of a request object, if the request is not in state "outstanding", are provided setWaitMode( ) sets the value of the wait mode of the request object reset( ) aborts any outstanding activity and re-establishes the initial state of the object abandon( ) aborts the outstanding activity by calling the XMP abandon method including cancelGet( ) in case of a get request wait( ) waits for a partial result or for the completion of the request depending on its wait mode hasAttribute( ) checks whether the request did return an attribute with the passed OID receiveAttribute( ) receives an attribute with the passed OID receiveNextAttribute( ) is an iterator method receiveActionReply( ) receives the reply of an action (if the request was to execute an action)

dump( ) formats the actual state of the request object into an "ostream" object.

Request objects must be explicitly deleted by the application, even if the related proxy agent is deleted. All response queue elements included in the request object are automatically deleted with the request object. Additional incoming responses are also deleted.

An application may delete a response queue after all results have been received by means of the class destructor. An abandon/cancel operation on the outstanding operation does not delete the response queue (the queue has to be deleted explicitly).

Responses cannot be received after the proxy agent object was deleted or disconnected from the communication system either by the application or by failure.

Callbacks for the Reception of Incoming Messages

When using several asynchronous requests at the same time, replies may appear in any order. To facilitate the processing of arriving reply messages, the OOI offers the possibility of defining callback methods, which will be activated as soon as a reply message or a notification has been received. The OOI is single threaded, therefore callbacks are invoked only during wait( ) or poll( ) calls and not while the application is processing.

The OOI distinguishes four different tasks for reply callbacks, and therefore there is the possibility of registering four different callbacks per request:

partialReply( ) is called for every successful linked reply message from XMP errorReply( ) is called for every unsuccessful reply message from XMP completed( ) is called upon reception of the "final" reply from XMP disconnected( ) is called during the disconnect processing which might have been triggered by XMP or the application.

Incoming responses for pending requests are represented by objects which have been derived from the ASN.1 definitions of CMIP. These objects are put into the reply queue of the request object. The implementation of the response class for the OOI is provided in Listing 4 in the Appendix. Incoming notifications are represented by objects which also have been derived from the ASN.1 definitions of CMIP. These objects are put into the event queue of their proxy agent. Then the callback method incomingNotificationCallback( ) which is defined by the application for the notification queue is executed with the notification object as parameter.

The callback informs the application that something has been received, and that the queue structures were updated. Thus when the callback is invoked, the object is already in the queue.

The steps in a partial response for an outstanding request are:

1. The response object is added to the response list of the request object. This includes updating of all related information of the request object, 'numberOfResponse' information.
2. The partialReplyCallback( ) or errorReplyCallback( ) is invoked.

The steps in a final response for an outstanding request include the following steps in addition to the partial steps for response callback:

1. The request object is updated. Its state is changed to "completed". There is no "final response object" added to the response queue.
2. The request object is moved from the requestQueue to the completedQueue
3. The final callback requestCompletedCallback( ) is called.

Incoming notification

1. The notification object is added to the notification queue. This includes updating the information in the notification queue header.
2. The incomingNotificationCallback( ) method is invoked.

This scheme allows the application to modify the queue structures, e.g. to 'unlink' the received data from the response objects in order to avoid copying. Some higher level receive methods may modify the queue structure, e.g. methods like getSubordinates( ), which convert the data of the response queue into a list of proxy managed objects.

Mixed Processing of Synchronous and Asynchronous Requests

It is assumed that the application has issued one or more asynchronous CMIS requests. It then decides to send out a synchronous request. While the synchronous request processes, the complete application waits. In the meantime, responses for the asynchronous requests or notifications may arrive.

In order to receive the reply for the synchronous request, the OOI must receive any message from the XMP session of the proxy agent object which was used for the synchronous call. All callback methods defined for the incoming messages will be executed to preserve the semantics and to guarantee the highest responsiveness possible.

It can be argued whether the same approach should be used for the other proxy agents with outstanding requests. For those, the decision was made against receiving to avoid unnecessary pre-reception of messages.

Flow control

The OOI design tries to avoid re-implementing functionality that is already covered by lower layers in the communication stack. Therefore, the OOI relies on the flow control mechanism of XMP and of any other underlying components. The application is responsible for being responsive enough for retrieving the data quickly from XMP. Otherwise purging on XMP level and below may occur. There is a recommendation related to the IBM XMP implementation, which recommends receiving as much data as available as fast as possible. The OOI does not do internal buffering to avoid uncontrollable memory consumption in the manager application.

Using the asynchronous OOI, the manager application has all the mechanisms needed to receive messages from the agents as quickly as it seems advisable from the viewpoint of the application. The OOI receives messages from XMP during the processing of one of the several wait methods. Depending on the properties of the outstanding request objects and the kind of messages which arrive, one or more messages are received from one or more XMP sessions. The provision of callback functions which can handle every message from XMP as soon as it arrives, gives maximum control to the application.

Proxy Managed Objects

Specific management applications can be designed with and rely upon the specific knowledge of managed object classes and of their attributes, which have been defined in GDMO and ASN.1 prior to the development of the application. For those applications, the managed object and attribute templates defined in GDMO are automatically compiled into concrete classes with complete implementation in C++.

Proxy managed objects (PMO) are local representations of managed objects that are instantiated in agents. PMO C++ classes provide a set of methods through which a management application can conveniently call CMIS requests to query or manipulate the real managed object in the agent. A management application typically instantiates an instance of a PMO class for each real managed object that it wishes to interact with. PMOs may also be created as a result of OOI methods, e.g. getSubordinates( ).

The Object Interface Composer (OIC) generates a proxy managed object (PMO) C++ class for every managed object class (MOC) defined in the processed document. Each generated PMO class provides type-safe methods for the access to the mandatory and optional attributes and for the execution of the actions of the managed object. Type safe methods enforce strong typing and make up the strong-typed interface of the generated PMO.

In addition to the strong typed methods, every PMO inherits from the OOIProxyMO class a set of generic methods called the "weak-typed" interface of the PMOs. These methods are intended for management applications or components which do not know at compile time, which classes of managed objects might appear from some agent at run time. It should be noted that these generic methods can also be used for generated PMOs, but will execute less efficiently due to the necessary dynamic type checking done at run time. The implementation of the proxy managed object (OOIProxyMO) class is provided in Listing 5 in the Appendix.

Figure 4:
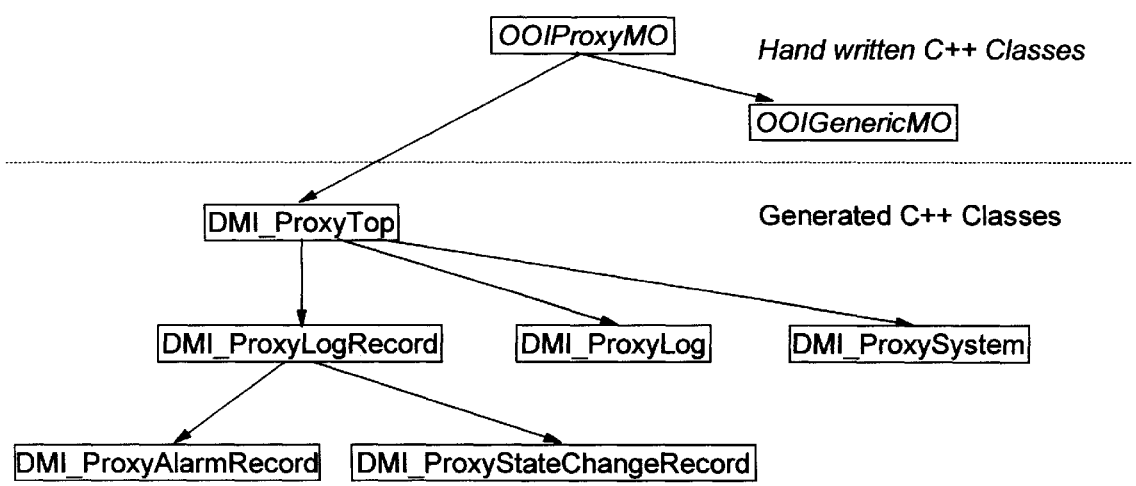
FIG. 4 is an example of a inheritance structure for DMI managed object classes.

The inheritance relation between generated PMO classes in C++ reflects the inheritance relation of the MOCs defined in GDMO/ASN.1 documents. In FIG. 4 an example of an inheritance structure for DMI MOCs is shown. As can be seen in FIG. 4, all generated, strong-typed PMO Classes are derived from the DMI_ProxyTop PMO class which in turn is derived from the OOIProxyMO class. All methods of the OOIProxyMO and DMI_ProxyTop classes are thus inherited by all proxy managed object classes.

The OOIProxyMO and OOIGenericMO classes are hand-coded as part of the OOI run-time environment. The DMI_ProxyTop class and each of its subclasses are generated by the OIC. The DMI_Proxy System subclass generated by the OIC is provided in Listing 6 in the Appendix.

The OOIGenericMO class is used to handle managed objects whose types are not known at compile time. This feature allows the programmer to write generic applications or provide for the handling of new objects that will be defined after the application has been completed.

Storage Management

For the storage management of the OOI, it is assumed that the OOI will allocate objects and pass them to the application. The application must release all allocated objects which it received from the OOI. The OOI will only manage those objects which are used internally and which are not made visible to the application. Upon reception of data from XMP, only the OOI knows its type, and must therefore allocate the object of the correct type, and after passing of such objects to the application, the OOI does not know when the application has finished using them.

The destructor of the OOI objects will take care of the proper deletion of contained objects.

All methods are inherited from the OOIProxyMO class according to the semantics of the C++ language.

Constructors and Destructors of OOIProxyMO

Two constructors are available for OOIProxyMO objects; both expect as parameter the agent on which the MO resides and a pointer to the meta info object. One of these additionally accepts the distinguished name of the object as parameter. In any case, the name can be set explicitly by the setMOInstance( ) method. Both direct-addressing proxy agents (DAPAs) and non-direct addressing proxy agents (NDAPAs) can be used as parameters. The copy constructor and the assignment constructor have been explicitly disabled for the OOIProxyMO class and its subclasses. Copy constructors are not provided to avoid the automatic generation of multiple instances of proxy managed objects of the same managed object instance within one application.

Destructors are provided for each ProxyMO subclass. Both constructors and destructors report errors through the exception mechanism.

The following methods are inherited from the OOIProxyMO class by each proxy managed object class:

setAgent( ) method can be used to overwrite the reference to the ProxyAgent object.

setMOInstance( ) method can be used to overwrite the distinguished name.

<<print operator creates a formatted printout of the MOC and managed object instances (MOI) values of the PMO.

agent( ) method returns a pointer to the ProxyAgent object on which the managed object resides, moClass( ) method returns a reference to the CMIS_ObjectClass (the MOC may not be known if the object is the result of a scoped MGet operation), moClassId( ) method returns the name of the class as a reference to an OOIString, moInstance( ) method returns the distinguished name of the MO as a reference to a CMIS_ObjectInstance, metaInfo( ) access method retrieves the run time Meta information (i.e. structural information specified in the GDMO MO class definition), hasConditionalPackage( ) access method determines the presence of a conditional package, reset( ) method re-establishes the initial status of the object.

Strong-Typed Methods of PMO

The OIC generates C++ header and implementation files for every managed object class defined in the parsed GDMO document. Each PMO class provides type safe methods for the access to attributes and for the execution of the actions of the managed objects. Those methods are said to be strong-typed.

As for their superclass, the strong-typed PMO classes have disabled default, copy and assignment constructors. The constructor for a typed PMO expects the proxy agent on which the MO resides and the distinguished name of the MO instance as parameters; both are defaulted to NULL and can be modified later on by using the local utility methods setAgent and setMOInstance, which have been described above. The class of the represented MOC is known by the type of the proxyMO. Constructors and destructors report errors through the exception mechanism.

Multiple Inheritance

GDMO allows the definition of managed object classes being derived from more than one superior class (multiple inheritance). This section describes how the OOI represents multiple inheritance of managed object classes in the generated C++ classes.

The basic properties of the OOI representation are:
1. The class hierarchy of the OOI proxy managed object classes strictly follows the inheritance structure imposed by the GDMO definition. This includes multiple inheritance.
2. The same holds for the representation of meta information: in case of multiple inheritance, a meta info object for a managed object class has multiple "superior" references.

Even though C++ offers multiple inheritance, C++ has some serious restrictions. A simple mapping of GDMO multiple inheritance to C++ multiple inheritance is not feasible as will be explained below.

As long as multiple inheritance is used in order to inherit from different base classes only, C++ works fine. However, in case of a common base class for different inheritance paths, C++ problems arise. In order to have only one instance of the common base member variables, which is what is normally needed, the base class has to be made a "virtual" base class. Then however, C++ no longer supports casting between base class pointers and sub-class pointers.

This restriction is not acceptable for the OOI, since for internal reasons (decoding), as well as for the user model (which is to support generic and type safe usage in a mixed fashion), the ability to cast pointers is a must. Furthermore, experiments have shown, that today's C++ compilers impose a very large size overhead per instance.

As described above, the main problem of C++ is not related to multiple inheritance itself, but to the use of virtual base class annotation. Thus the basic approach is to avoid this annotation, and to handle the "virtual" base class property by other means. The original purpose of making the base class virtual is to avoid having multiple instances of the base class members.

In case of OOI proxy managed objects, this property is needed. Duplicated instances of the "agent-reference" or "packages-cache" members within a proxy managed object are unacceptable. The OOI approach is to move the "data members" of a proxy managed object out of the proxy managed object class into a separate object called "proxy managed object data" (PMOData). This PMOData object is purely local and completely owned by its corresponding proxy managed object. The original proxy managed object merely contains a pointer to this PMOData object. As required for casting, the original proxy managed object class is not declared as a virtual base class. Obviously, in case of multiple inheritance this may lead to having duplicated pointers to the PMOData. The OOI runtime system guarantees that all these pointers point to the same object during the lifetime of the PMOData object.

The implementation uses the "use-count" paradigm for the PMOData objects: during usage, the "use-count" is equivalent to the number of pointer members of the related proxy managed object, and thus to the number of inheritance paths of a specific managed object class to a common base class.

To the user, this solution is completely hidden. The user is not aware of the existence of multiple pointers, nor of the fact that the proxy managed object data is stored in a separate object. All data and all operations are directly accessible from the proxy managed object interface.

Casting for the C++ proxy managed object classes is achieved by the OOI solution described above. However, in case of multiple inheritance, C++ casting requires specifying the exact casting path (at least at those places with multiple inheritance paths). To simplify this, the OOI offers (as for other classes) a narrow( )operator, which allows casting towards subclasses.

In addition, the OOI provides for the proxy managed object classes a widen( ) operator for casting towards the 'OOIProxyMO' base class. The narrow( ) operator optionally performs run-time checking, whereas this is not necessary for the widen( ) operator. Thus there is no need to use plain C++ casts directly.

Notifications

Specific management applications rely upon the specific knowledge of notification object classes which have been defined in GDMO and ASN.1 prior to the development of the application. The implementation of the notification base class for the OOI is provided in Listing 7 in the Appendix. For those applications, the notification templates defined in GDMO are automatically compiled into concrete classes with complete implementation in C++.

The notification objects that are generated from GDMO/ASN.1 definitions by the Object Interface Composer (OIC) are sent to a manager by means of a CMIS event report. The DMI object creation class generated for a DMI object creation notification by the OIC is provided in Listing 8 in the Appendix. The OOI RTS receives notifications and stores them in the event queue of the responsible proxy agent object.

ASN.1

Specific management applications are designed with and rely upon the specific knowledge of GDMO/ASN.1 definitions, which have been defined in ASN.1 prior to the development of the application. For those applications, the abstractly defined ASN.1 types are automatically compiled into concrete classes with complete implementation in C++.

The specification language ASN.1 ("Abstract Syntax Notation 1") has been defined by the ISO to specify the format of transmitted data in a formal, abstract notation. A standardized encoding scheme, such as the "Basic Encoding Rules" (BER) specifies the precise sequence of "bits on the wire". Thus two communicating partners are able to understand each other if they exchange data that is defined in ASN.1 and encoded according to the same encoding rules.

ASN.1 offers primitive types, string types and constructors which can be used to define further application related types. FIG. 5 shows the types available in ASN.1. In addition to those types, ASN.1 offers the possibility to define named values for some types, and to define several kinds of subtypes.

Mapping Principles

As shown in FIG. 5 there is a set of primitive ASN.1 types and a set of constructors, which are used to compose application oriented complex types.

Base Library: For every primitive ASN.1 type and every ASN.1 constructor, there is a corresponding class in the ASN.1 C++ library, e.g. ASN1_Integer, ASN1_SetOf.

Application Types: Each application-defined ASN.1 type is mapped to one or several C++ classes. In the general case, instances of these classes will form a tree structure with instances of ASN.1 constructors as intermediate nodes and instances of primitive ASN.1 types as leaves. The root object of such a tree will be the application defined class which inherits from the outermost ASN.1 constructor class or simple type.

Common Methods: The generated C++ classes and those in the library are derived from a single common class "ASN1_Type". The declaration of functions such as assignment, comparison, print, encoding, decoding, checking, conversion into and from ASN.1 value notation, etc. as virtual methods in the common base class allows for generic usage of all ASN.1 specific C++ classes.

Strong & Weak Typing: The generated C++ classes inherit from the generic library classes. The generated classes offer a strong typing interface while their generic superclasses offer a weak typing interface to the same objects. The examples in the following text will show how both are intended to be used. A very important feature is that both interfaces can be used for the same objects in a mixed fashion. Therefore, it is possible to use generic components together with strong typing components in the same application.

Meta Information: Every ASN.1 C++ class has access to run time type information (meta information) to support a dynamic style of usage in the application. Generic applications, e.g. a graphic application program, rely on this meta information.

Local Types: Any auxiliary type definition, e.g. the values of an enumeration type or the selector type for alternatives of a choice is defined within the scope of the class which uses it in order to avoid name classes in the global scope.

Compatibility: All C++ classes for primitive types are made compatible with the corresponding C++ basic type, e.g. ASN.1 integers are compatible with C++ integers.

Qualified Identifiers: The overall convention for generated names is: "<ASN.1 Module>_<ASN.1 type name>_<ASN.1 component name>", where the module name is a nickname in upper case letters, and the type name is the same as in the ASN.1 source text. The component name is only generated for anonymous component types.

Meta Information

The purpose of meta information is to provide the type information derived from the various GDMO and ASN.1 specifications which is needed by the OOI at run time. Such information may be used directly or indirectly by applications that 1. use the generic interfaces of the OOI (as opposed to the type-safe interface);
2. offer a generic graphical user interface (GUI) requiring conversion to/from string format; and
3. display GDMO meta information to a user.

Typically the meta information is not used directly by applications that only use the type safe interface. Internally, the OOI-Run Time System (RTS) makes use of the meta information.

The GDMO standard 10165-2 defines templates for the definition of management information. The OOI RTS provides meta information about management information specified using the following templates:

Managed Object Class which specifies the names of the mandatory and optional packages of a managed object;

Parameter which specifies the syntax and behavior of parameters that may be associated with particular attributes, operations and notifications;

Attribute which defines admissible operations for the attribute and refers to an ASN.1 type definition;

Attribute Group which specifies a cluster of attributes that can be accessed or operated upon under one name;

Action which refers to an ASN.1 type for outgoing or incoming information; and

Notification which refers to an ASN.1 type for the information that is passed with an event notification of the defined type.

Figure 6:
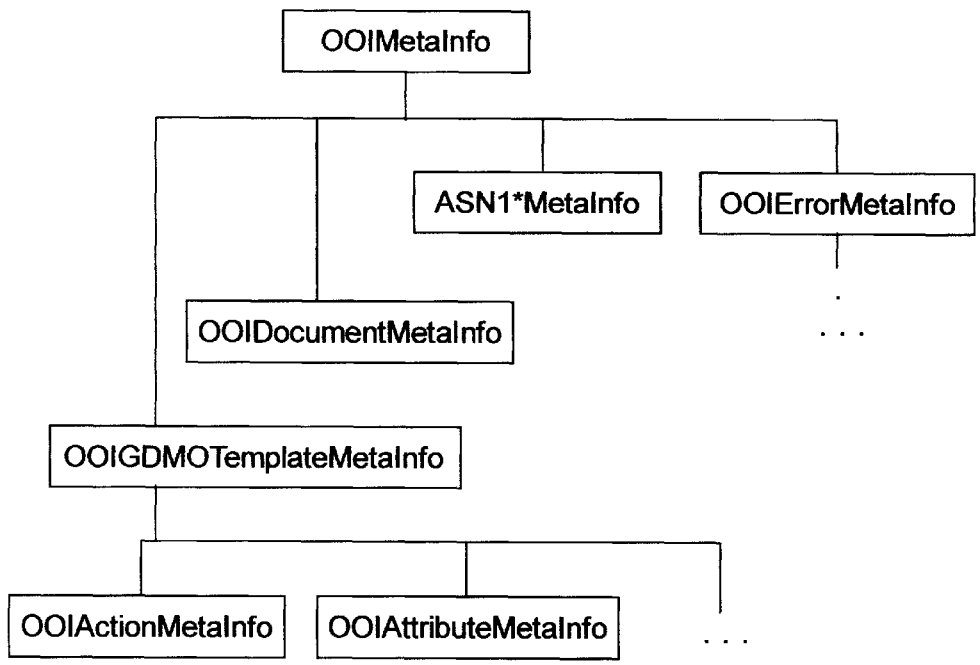
FIG. 6 shows the implementation class hierarchy for meta information.

A C++ class is defined for each of those templates. The Meta Information class hierarchy implementation is depicted in FIG. 6. An instance of this class is instantiated for each GDMO template defined in the GDMO document parsed by OIC. A single instance of the OOIMetaInfoRepository class serves as anchor for the meta information. Additionally instances of C++ classes are generated for each document, each ASN.1 module, and each ASN.1 type defined in a GDMO/ASN.1 document.

The OOI Meta Information can be seen as a data structure which holds most of the information contained in GDMO/ASN.1 documents. This information is stored in a set of objects that provide methods to retrieve specific meta information and to "navigate" through the meta information data structure. For example, the OOIMetaRepository class provides methods to access OOI Document Meta Info and ASN.1 Module Meta Info. Document Meta Information is stored in a list of object instances. Each instance holds or refers to most of the information contained in one GDMO document.

These instances provide methods to access Managed Object Class Meta Info, Parameter Meta Info, Attribute Meta Info, Attribute Group Meta Info, Action Meta Info, Notification Meta Info, ASN.1 Meta Info, which are defined in the document.

OOI Error Handling

Three kinds of errors can be encountered when using the OOI:

1. Application Related Errors,
2. OOI Internal Errors,
3. Communication Errors.

Application related errors occur through incorrect coding of the application. Because the OOI supports strong typing, most coding errors will be detected at compile time, but some errors can only be detected at run-time, e.g. trying to set the hour attribute to the unsupported value of 24 or trying to access a bit outside of a string.

OOI internal errors can be caused by system problems (e.g. resource contingency such as being out of memory), XMP library or system errors.

Communication Errors are ACSE or CMIS service errors. Those errors are expected as they are an inherent part of the protocol definition.

The OOI uses four mechanisms to signal errors:

Boolean return value;

NULL pointers return value;

Error objects returned as function return or through function reference arguments; and Error objects thrown by exceptions.

Error Objects are the preferred error handling method of the OOI. Alternatively, booleans or NULL pointers are returned by some functions to provide additional comfort to the application writer.

Boolean return values are used by functions that are typically used in an evaluation.

NULL pointer return values are returned by Meta Info access methods if the meta information is not available.

Error objects are returned through function reference arguments of the called methods.

Exceptions must be used in C++ to handle failing constructors, because constructors do not support result parameter (hence can't return an error code). Furthermore, exceptions provide a convenient mechanism to indicate internal errors. The OOI throws error objects of the same classes as those used in reference function arguments.

Error Objects

Figure 7:
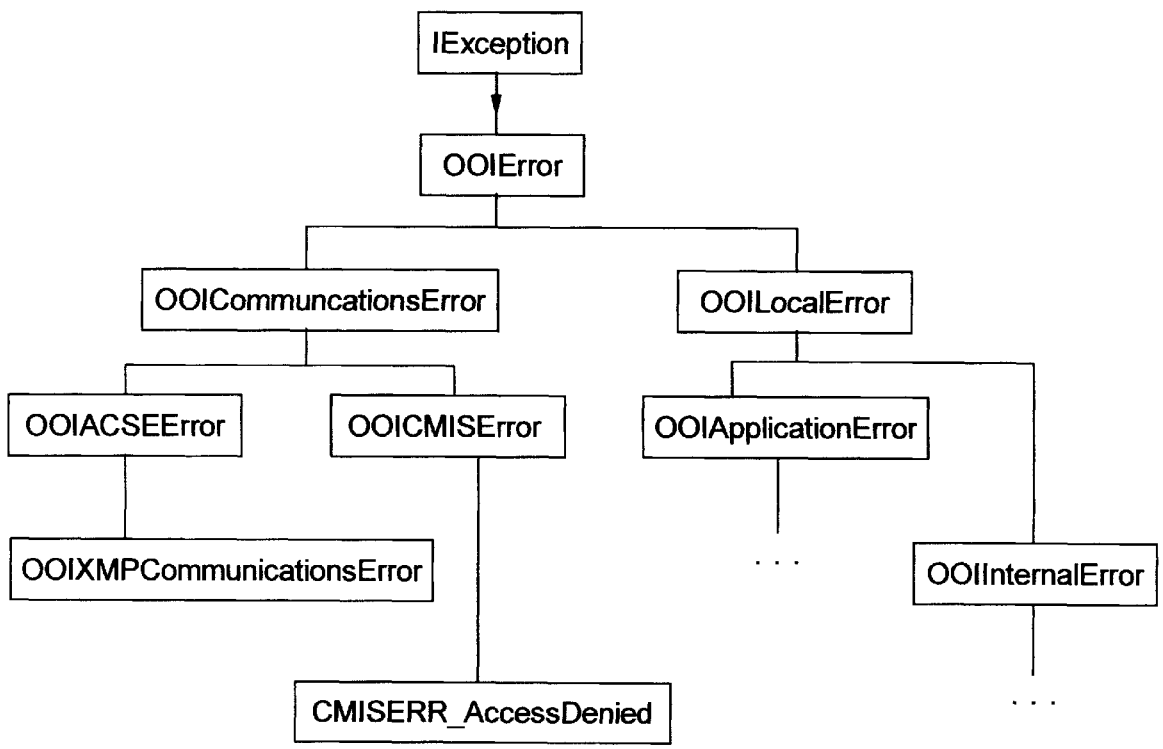
FIG. 7 shows the inheritance hierarchy for error classes.

Error objects are returned by C++ functions through reference arguments or thrown via C++ exceptions. FIG. 7 describes the inheritance hierarchy of OOIErrors.

Communication errors are expected as they are inherent in the ACSE and CMIS protocol operation. Error objects describing communication errors are usually 'returned' and not 'thrown'. Communication errors can originate from the stack interface (currently XMP) or from the CMIS protocol itself.

Methods of OOI Error Objects

OOI error objects usually are allocated by the OOI and passed to the application. It is the responsibility of the application to delete these objects. Constructors are disabled explicitly, but the application may use the copy( ) method to create a copy of an existing error object.

The following methods for inspecting the kind of error are provided:

isCommunicationsError( ) checks if the error is of the category communication error isCMISError( ) checks if the error is of the category CMIS error isLocalError( ) checks if the error is of the category local error isApplicationError( ) checks if the error is of the category application error isInternalError( ) checks if the error is of the category internal error The following general support methods are provided:

name( ) returns the name of the objects class typeCodeIndex( ) returns the index of the subclass (used for inspecting/classifying an error, usually followed by ::narrow)

<<print operator puts a formatted print of the status of the object into an ostream object asString( ) returns a string containing the formatted status of the object copy( ) returns a pointer to a copy of the parameter object metaInfo( ) returns a pointer to the meta information of the object narrow( ) performs a type safe conversion into an instance of a subclass

APPENDIX

Listing 1: Proxy Agent Class

```
/***********************************************************************/
/**                                                                    */
/**     Licensed Materials - Property of IBH                           */
/**                                                                    */
/**     5799-QLN                                                       */
/**                                                                    */
/**     © Copyright IBM Corporation 1995, 1996                         */
/**                                                                    */
/***********************************************************************/
/*
 *  RCS LOG:
 *
 *  $Log:           OOIProxyAgent.H,v $
 *
 */
#ifndef __OOI_PROXY_AGENT_INCLUDED__
#define __OOI_PROXY_AGENT_INCLUDED__
#include "CMIS.ALL.H"
#include "OOIErrors.H"
//***********************************************************************
//
// exported class definitions
//
//
// OOIProxyAgentNDA0:  proxy agent with no queue automatically allocated
// OOIProxyAgentNDA:   proxy agent with standard notification queue
// OOIProxyAgentDA0:   proxy agent with notification queue
// OOIProxyAgentDA:    proxy agent with standard notification queue
class OOIProxyAgentXX;
class OOIProxyAgentDA0;
class OOIProxyAgentDA;
class OOIProxyAgentNDA0;
class OOIProxyAgentNDA;
// type OOIWaitStatus
// type OOIProxyAgentList
//***********************************************************************
//
// useful macro definitions related to CMIS confimation mode
//
#define OOI_CONFIRMED       CMIS_Mode::confirmed
#define OOI_NONCONFIRMED    CMIS_Mode::nonConfirmed
#define OOI_UNCONFIRMED     OOI_NONCONFIRMED
// * * * * * * * * * * * * * * * * * * * * * * * * * * * * * *
//
// OOIWait::'Status' enum type
// used as argument for OOI wait( ) & poll( ) methods
// (warning: this type is different from the XMP completion_flag_return type !)
//
class OOIWait {
  public :
    enum Status Enum {
        error = -1,    // indicating 'wait' internal error,
                       // ( 'ooiStat' will also have a value < > SUCCESS)
                       // ( unless exception mode is used. . .)
        nothing = 0,   // nothing received / wait timeout occured
        response = 1,  // 'non-empty' response, containing cmis data or cmis error:
```

APPENDIX-continued

```
                            // - 'partial' response of a linked reply, or
                            // - 'single' (and thus final) response of a non-linked reply,
                            // ('empty' response, not containing cmis data / cmis error)
           notification     // incoming notification (mgr side only)
           indication       // incoming indication (agent side only)
        };
    static OOIString asString( OOIWait::StatusEnum waitStatus );
};
typedef OOIWait::StatusEnum OOIWaitStatus;
//*********************************************************************
//
// extern class definitions (see 'OOIProxyMO.H' ):
//
#ifdef __OOI_DUMMY_PNO__
  class OOIProxyMO       { };
  class OOIProxyMOList   { };
#else
  class OOIProxyMO;
  class OOIProxyMOList;
#endif
//*********************************************************************
#include "OOIPresentationModule.H"
#include "OOIQueues.H"
// * * * * * * * * * * * * * * * * * * * * * * * * * * * * * * * * * *
//
// overview about important CMIS data structures: ( Session, Context )
//
//   Session ::= SEQUENCE
//      requestorAddress Address OPTIONAL
//      requestorTitle Title OPTIONAL
//      role Role OPTIONAL
//      fileDescriptor INTEGER
//      responderAddress Address OPTIONAL
//      responderTitle Title OPTIONAL
//      accessControl AccessControl OPTIONAL
//      cmisFunctionalUnits FunctionalUnits OPTIONAL
//
//   PAContent ::= SEQUENCE
//      accessControl AccessControl OPTIONAL
//      priority Priority
//      responderAddress Address OPTIONAL      for NDAPA only
//      responderTitle Title OPTIONAL          for NDAPA only
//      useActualClass    BOOLEAN    OPTIONAL -- DEFAULT TRUE --
//
// * * * * * * * * * * * * * * * * * * * * * * * * * * * * * * * * * *
//
// definition of OOIProxyAgent & OOIProxyAgentList (list of pointers to OOIProxyAgent's
//
// this type is mainly used OOI internally !
//
// warning: this list contains only 'aliases' to proxy agents:
//          the proxy agents are not owned by this list, assignment & copy is 'shallow'
//
#include "isetsls.h"
class OOIProxyAgentListElement {
  public:
     OOIProxyAgentListElement( );
     OOIProxyAgentListElement( const OOIProxyAgentListElement& rh);
     OOIProxyAgentListElement( const OOIProxyAgentXX * agent);
     ~OOIProxyAgentListElement( );
     OOIProxyAgentListELement& operator=( const OOIProxyAgentListElement& rh);
     OOIBoolean operator==( const OOIProxyAgentListElement& rh) const;
     OOIBoolean operator<( const OOIProxyAgentListElement& rh) const;
     OOIProxyAgentXX * agent( ) const;
  private:
     OOIProxyAgentXX * _agent;
};
typedef ISetOnSortedLinkedSequence< OIProxyAgentListElement > OOIProxyAgentList;
// * * * * * * * * * * * * * * * * * * * * * * * * * * * * * * * * * *
// * * * * * * * * * * * * * * * * * * * * * * * * * * * * * * * * * *
class OOIProxyAgentXX {
    friend class OOI;
    friend class OOIGenericQueue;
    friend class OOIRequest;
//friend class OOINotificationQueue;
    friend class OOINotification;
    friend class OOIGenericQueueElement;
    friend class OOIIndication;
  public:
```

APPENDIX-continued

```
  enum Kind {
    directAddressing,
    nonDirectAddressing
    };
// * * * * * * * * * * * * * * * * * * * * * * * * * * * * * * * * * * * * * *
  //
  // standard constructors/destructors
  //
private:
  // default constructor, disabled
  OOIProxyAgentXX( );
  // copy constructor, disabled
  OOIProxyAgentXX( const OOIProxyAgentXX& rhs );
  // standard assignment operatore, disabled
  OOIProxyAgentXX& operator=( const OOIProxyAgentXX& rhs );
public:
  // destructor
  virtual    OOIProxyAgentXX( );
protected:
  // initialization constructor
  OOIProxyAgentXX{
              Kind                    kind,
              OOINotificationQueue  * notificationQueue   // IN, if NULL—>none
              OOIIndicationQueue    * indicationQueue     // IN, if NULL—>none
              };
/* * * * * * * * * * * * * * * * * * * * * * * * * * * * * * * * * * * * * *
 *
 *   Name:      initialization constructor
 *   Purpose:   allocate proxy agent
 *   Input:     notificationQueue:
 *              indicationQueue:    may be NULL
 *   Output:    %
 *   Return:    %
 *   Errors:    %
 *   Exceptions: %
 *   Note:      the queues are 'linked' in, not copied. Then they are 'owned'
 *              by the proxy agent, and will usually be deleted automatically when the
 *              proxy agent itself is deleted: see proxyAgentDeleted( ) callback.
 *
 * * * * * * * * * * * * * * * * * * * * * * * * * * * * * * * * * * * * * */
//
// type specific
//
public:
// data member access methods
int         id( ) const;
OOIBoolean  isConnected( ) const;
Kind        kind( ) const;
OOIBoolean  isDirectAddressingProxyAgent( ) const;
//
// access to session controls
// use methods from CMIS_Session to read the contents
//
//   - the proxy agent has to be in 'state' unconnected, if you
//     want to change any settings
//   - role
//   - accessControl (although not really supported by Telco 6k)
//   - cmisFunctionalUnits
const CMIS_Session & sessionControls( ) const;
void resetSessionControls( );
void setRole( const CMIS_Role                          & role );
void setDefaultRole( );
void setSessionAccessControl(
              const CMIS_ExternalAC                    & accessControl );
void setCMISFunctionalUnits(
              const CMIS_FunctionalUnits & functionalUnits );
void setRequestorTitle(
        const CMIS_Title                               & title );
void setRequestorAddress{
        const CMIS_PresentationAddress                 & address };
void setResponderTitle{
        const CMIS_Title                               & title };
void setResponderAddress{
        const CMIS_PresentationAddress                 & address };
// read/write-access to context controls
//  use methods from CMIS_PAContext to read the contents
//  - you may set:
//  - priority
//  - accessControl (although not really supported by Telco 6k)
```

APPENDIX-continued

```
//
// - for NDA - proxy agents (*), you may set
//   - responderAddress
//   - responderTitle
//
// (*) if you want to have context addressing for DA - proxy agents,
//     as well, you have to switch 'OOI::enableDAPAContextAddressing' to true,
//
// - note: the following original (XMP) context controls
//   - mode
//   - asynchronous
//   - (sizeLimit, timeLimit)
//   are not provided through 'PAContext', but via other
//   OOI means.
const CMIS_PAContext &   defaultContext( ) const;
void                     setDefaultContext( const CMIS_PAContext & context );
void                     resetDefaultContext( );
// return the file descriptor associated with this proxy agent
// (returns -1 in case of disconnected proxy agents)
int                      fileDescriptor( ) const;
const OM_private_object & XMPSession( ) const;
// methods related to queues
OOIBoolean               hasNotificationQueue( ) const;
OOINotificationQueue     & notificationQueue( ) const;
OOIBoolean               hasIndicationQueue( ) const;
OOIIndicationQueue       & indicationQueue( ) const;
OOIRequestQueue          & requestQueue( ) const;
OOIRequestQueue          * completedQueue( ) const;
// * * * * * * * * * * * * * * * * * * * * * * * * * * * * * * * * * * * * * *
// global useful consts
static
const OOIOID             & actualClassOID( );
static
const CMIS_ObjectClass   & actualClassMOC( );
// empty attribute id list
static
const CMIS_AttributeIdList& emptyAttributeIdList( );
// * * * * * * * * * * * * * * * * * * * * * * * * * * * * * * * * * * * * * *
//
// SYNCHRONOUS INTERFACE:
//
// impl. note 1: all operations are declared non-'const'
// impl. note 2:
//    the need for the 'proxyMO' parameter is related to the 'packages caching'
//    resp. the fact, that this interface is also internally by the
//    OOIProxyMO implementation
//    for direct usage without proxy MO: simply pass NULL
// * * * * * * * * * * * * * * * * * * * * * * * * * * * * * * * * * * * * * *
void simpleMAction(
        OOIStatus                  * ooiStat,             // OUT, if < > NULL
        const OOIProxyMO           * proxyMO,             // IN, maybe NULL
        const CMIS_ObjectClass     & baseMOCLass,         // IN, mandatory
        const CMIS_ObjectInstance  & baseMOInstance,      // IN, mandatory
        const CMIS_ActionInfo      & actionInfo,          // IN
        CMIS_ActionReply           * actionReply = NULL,  // OUT, conditional
        OOIBoolean                 * actionReplyPresence  = NULL,// OUT, conditional
        const CMIS_Mode            & confirmationMode =   OOI_CONFIRMED // IN
// * * * * * * * * * * * * * * * * * * * * * * * * * * * * * * * * * * * * * *
void simpleMCreate{
        OOIStatus                      * ooiStat,                  // OUT, if < > NULL
        const OOIProxyMO               * proxyMO,                  // IN, maybe NULL
        const CMIS_ObjectClass         & moClass,                  // IN, mandatory
        const CMIS_CreateObjectInstance * createObjectInstance,    // IN, opetional
        const CMIS_ObjectInstance      * referenceObjectInstance,  // IN, optional
        const CMIS_AttributeList       * attributeList,            // IN, optional
        CMIS_ObjectInstance            * MOInstance = NULL,        // OUT, conditional (3)
        OOIBoolean                     * MOInstancePresence = NULL, // INOUT, conditional (3) ?
        CMIS_AttributeList             * attributeListResult = NULL, // OUT, conditional (3)
        OOIBoolean                     * attributeListResultPresence=NULL, // INOUT, conditional (3)
        ASN1_GeneralizedTime           * currentTimeResult = NULL, // OUT, optional (4)
        OOIBoolean                     * currentTimeResultPresence = NULL    // OUT, conditional
        };
// * * * * * * * * * * * * * * * * * * * * * * * * * * * * * * * * * * * * * *
void simpleMDelete{
        OOIStatus                  * ooiStat,             // OUT, if < > NULL
        const OOIProxyMO           * proxyMO,             // IN, maybe NULL
        const CMIS_ObjectClass     & baseMOClass,         // IN, mandatory
        const CMIS_ObjectInstance  & baseMOInstance       // IN, mandatory
        };
```

APPENDIX-continued

```
// * * * * * * * * * * * * * * * * * * * * * * * * * * * * * * * * * * * * * * * * * * *
void simpleMGetSome{
        OOIStatus                       * ooiStat,               // OUT, if < > NULL
        const OOIProxyMO                * proxyMO,               // IN, maybe NULL
        const CMIS_ObjectClass          & baseMOClass,           // IN, mandatory
        const CMIS_ObjectInstance       & baseMOInstance,        // IN, mandatory
        const CMIS_AttributeIdList      * attributeIdList,       // IN, optional
        CMIS_AttributeList              & attrListResult
        };
void simpleMGet{
        OOIStatus                       * ooiStat,               // OUT, if < > NULL
        const OOIProxyMO                * proxyMO,               // IN, maybe NULL
        const CMIS_ObjectClass          & baseMOClass,           // IN, mandatory
        const CMIS_ObjectInstance       & baseMOInstance,        // IN, mandatory
        const CMIS_AttributeId          & attributeId,           // IN, mandatory
        ASN1Type                        & getResult              // OUT, conditional
// * * * * * * * * * * * * * * * * * * * * * * * * * * * * * * * * * * * * * * * * * *
void simpleMSetSome{
        OOIStatus                       * ooiStat,               // OUT, if < > NULL
        const OOIProxyMO                * proxyMO,               // IN, maybe NULL
        const CMIS_ObjectClass          & baseMOClass,           // IN, mandatory
        const CMIS_ObjectInstance       & baseMOInstance,        // IN, mandatory
        const CMIS_Mode                 & confirmationMode,      // IN, mandatory
        const CMIS_ModificationList     & modificationList,      // IN, mandatory
        CMIS_AttributeList              * attrListResult         // OUT, if < > NULL / cond.
        };
void simpleMSet{
        OOIStatus                       * ooiStat,               // OUT, if < > NULL
        const OOIProxyMO                * proxyMO,               // IN, maybe NULL
        const CMIS_ObjectClass          & baseMOClass,           // IN, mandatory
        const CMIS_ObjectInstance       & baseMOInstance,        // IN, mandatory
        const CMIS_Mode                 & confirmationMode,      // IN, mandatory
        const CMIS_AttributeId          & attributeId,           // IN, mandatory
        const ASN1Type                  * valueToBeSet,          // IN, conditional
        const CMIS_ModifyOperator       & modifyOperator         // IN, with default
                                        = CMIS_ModifyOperator::replace ,
        ASN1Type                        * result = NULL,         // OUT, if< >NULL/cond.
        OOIBoolean                      * resultPresence = NULL  // OUT, conditional
        };
// * * * * * * * * * * * * * * * * * * * * * * * * * * * * * * * * * * * * * * * * * *
void doSynchronousUnscopedRequest{
        OOIStatus                       * ooiStat,               // OUT, if < > NULL
        const OOIProxyMO                * proxyMO,               // IN, maybe NULL
        const ASN1Type                  & cmisRequest,           // IN
        ASN1Type                        *& cmisResult,           // OUT, conditional
        const CMIS_Mode                 & confirmationMode = OOI_CONFIRMED, // IN
        const CMIS_PAContext            * singleCallContext = NULL,// IN, may be NULL
        OOIReqServicePrimitiveEnum      primitive = CMIS_SP_UNSPECIFIED
// * * * * * * * * * * * * * * * * * * * * * * * * * * * * * * * * * * * * * * * * * *
//
// ASYNCHRONOUS INTERFACE:
//
// these operations are similar to the operations offered at the PMO interface
// * * * * * * * * * * * * * * * * * * * * * * * * * * * * * * * * * * * * * * * * * *
//
// cmis operations, single mo, asynchronous
//
// action
void simpleMActionRequest{
        OOIStatus                       * ooiStat,               // OUT, if < > NULL
        OOIRequest                      & requestToken,          // INOUT
        const CMIS_ObjectClass          & baseMOClass,           // IN, mandatory
        const CMIS_ObjectInstance       & baseMOInstance,        // IN, mandatory
        const OID                       & actionOID,             // IN
        const ASN1Type                  * actionInfo             // IN, optional
        } const;
// create
void simpleMCreateRequest{
        OOIStatus                       * ooiStat,               // OUT, if < > NULL
        OOIRequest                      & requestToken,          // INOUT
        const CMIS_ObjectClass          & moClass,               // IN, mandatory
        const CMIS_CreatObjectInstance  * createObjectInstance,  // IN, optional
        const CMIS_ObjectInstance       * referenceObjectInstance,//IN, optional
        const CMIS_AttributeList        * attributeList          // IN, optional
        } const;
// simple delete
void simpleMDeleteRequest{
        OOIStatus                       * ooiStat,               // OUT, if < > NULL
        OOIRequest                      & requestToken,          // INOUT
```

APPENDIX-continued

```
              const CMIS_ObjectClass          & baseMOClass,           // IN, mandatory
              const CMIS_ObjectInstance       & baseMOInstance         // IN, mandatory
       } const;
// simpleMGet: get a single attribute
void simpleMGetRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance         // IN, mandatory
       const OID                              & attributeOID           // IN
       } const;
void simpleMGetSomeRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const CMIS_AttributeIdList             & attrIdList             // IN
       } const;
void simpleMGetSomeRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const CMIS_AttributeIdList             * attrIdList = NULL      // IN, optional
       } const;
void simpleMGetAllRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       } const;
// set
void simpleMSetRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const OID                              & attributeOID,          // IN
       const ASN1Type                         * value,                 // IN, conditional
       const CMIS_ModifyOperator              & modifyOperator         // IN, with default
                                            = CMIS_ModifyOperator::replace
       } const;
void simpleMSetToDefaultRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       cost OID                               & attributeOID           // IN
       } const;
void simpleMReplaceRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const OID                              & attributeOID,          // IN
       const ASN1Type                         & value                  // IN
       } const;
void simpeMAddRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const OID                              & attributeOID,          // IN
       const ASN1Type                         & value                  // IN
       } const;
void simpleMRemoveRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const OID                              & attributeOID,          // IN
       const ASN1Type                         & value                  // IN
       } const;
void simpleMSetSomeRequest{
       OOIStatus                              * ooiStat,               // OUT, if < > NULL
       OOIRequest                             & requestToken,          // INOUT
       const CMIS_ObjectClass                 & baseMOClass,           // IN, mandatory
       const CMIS_ObjectInstance              & baseMOInstance,        // IN, mandatory
       const CMIS_ModificationList            & modificationList       // IN, mand.
```

APPENDIX-continued

```
        } const;
// * * * * * * * * * * * * * * * * * * * * * * * * * * * * * * * * * * * * * * *
// * * * * * * * * * * * * * * * * * * * * * * * * * * * * * * * * * * * * * * *
//
// cmis operations, scoped, synchronous
//
// scoped MGet: get some mo's,
// - cannot be used to retrieve attributes
//   (except objectclass/objectinstance)
//   use asynchronous scoped get calls in order to retrieve attributes
void scopedMGet{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        OOIProxyMOList              & proxyMOList,          // OUT
        const CMIS_Scope            & scope,                // IN, mandatory
        const CMIS_Filter           * filter        = NULL, // IN, optional
        const CMIS_Sync             * synchronization = NULL // IN, optional
        };
// alternatively to the generalized 'scopedMGet' method,
// these scope specific methods are offered:
void getSubordinates{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        OOIProxyMOList              & proxyMOList,          // OUT
        const CMIS_Filter           * filter        = NULL, // IN, optional
        const CMIS_Sync             * synchronization = NULL // IN, optional
        };
void GetNthLevelSubordinates{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        OOIProxyMOList              & proxyMOList,          // OUT
        int                           nthLevel,             // IN
        const CMIS_Filter           * filter        = NULL, // IN, optional
        const CMIS_Sync             * synchronization = NULL // IN, optional
        };
void getBaseToNthLevelSubordinates{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        OOIProxyMOList              & proxyMOList,          // OUT
        int                           nthLevel,             // IN
        const CMIS_Filter           * filter        = NULL, // IN, optional
        const CMIS_Sync             * synchronization = NULL // IN, optional
        };
void getWholeSubtree{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        OOIProxyMOList              & proxyMOList,          // OUT
        const CMIS_Filter           * filter        = NULL, // IN, optional
        const CMIS_Sync             * synchronization = NULL // IN, optional
        };
// scoped delete
void scopedMDelete{
        OOIStatus                   * ooiStat,              // OUT, if < > NULL
        const CMIS_ObjectClass      & baseMOClass,          // IN, mandatory
        const CMIS_ObjectInstance   & baseMOInstance,       // IN, mandatory
        const CMIS_Scope            & scope,                // IN, mmandatory
        const CMIS_Filter           * filter        = NULL, // IN, optional
        const CMIS_Sync             * synchronization = NULL // IN, optional
        };
// * * * * * * * * * * * * * * * * * * * * * * * * * * * * * * * * * * * * * * *
//
// cmis operations, scoped, asynchronous
//
// action
void scopedMActionRequest{
        OOIStatus                   * ooiStat,              // OUT, if < > NULL
        OOIRequest                  & requestToken,         // INOUT
        const CMIS_ObjectClass      & baseMOClass,          // IN, mandatory
        const CMIS_ObjectInstance   & baseMOInstance,       // IN, mandatory
        const OID                   & actionOID,            // IN
        const ASN1Type              * actionInfo,           // IN, optional
        const CMIS_Scope            & scope,                // IN, mandatory
        const CMIS_Filter           * filter        = NULL, // IN, optional
        const CMIS_Sync             * synchronization = NULL // IN, optional
```

APPENDIX-continued

```
        } const;
// create
// - there is no scoped create request
// scoped delete
void scopedMDeleteRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const CMIS_Scope               & scope,                // IN, mandatory
        const CMIS_Filter              * filter        = NULL, // IN, optional
        const CMIS_Sync                * synchronization = NULL // IN, optional
        } const;
// scoped get: no / one / some / all attributes
void scopedMGetRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const OID                      & attributeOID,         // IN
        const CMIS_Scope               & scope,                // IN, mandatory
        const CMIS_Filter              * filter        = NULL, // IN, optional
        const CMIS_Sync                * synchronization = NULL // IN, optional
        } const;
void scopedMGetSomeRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const CMIS_AttributeIdList     & attrIdList,           // IN
        const CMIS_Scope               & scope,                // IN, mandatory
        const CMIS_Filter              * filter        = NULL, // IN, optional
        const CMIS_Sync                * synchronization = NULL // IN, optional
        } const;
void scopedMGetSomeRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const CMIS_AttributeIdList     & attrIdList,           // IN
        const CMIS_Scope               & scope,                // IN, mandatory
        const CMIS_Filter              * filter        = NULL, // IN, optional
        const CMIS_Sync                * synchronization = NULL // IN, optional
        } const;
        void scopedMGetAllRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const CMIS_Scope               & scope,                // IN, mandatory
        const CMIS_Filter              * filter        = NULL, // IN, optional
        const CMIS_Sync                * synchronization = NULL // IN, optional
        } const;
// set
void scopedMSetRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const OID                      & attributeOID,         // IN
        const ASN1Type                 * value,                // IN, conditional
        const CMIS_ModifyOperator      & modifyOperator,       // IN
                                       // = CMIS_ModifyOperator::replace
        const CMIS_Scope               & scope,                // IN, mandatory
        const CMIS_Filter              * filter        = NULL, // IN, optional
        const CMIS_Sync                * synchronization = NULL // IN, optional
        } const;
void scopedMSetToDefaultRequest{
        OOIStatus                      * ooiStat,              // OUT, if < > NULL
        OOIRequest                     & requestToken,         // INOUT
        const CMIS_ObjectClass         & baseMOClass,          // IN, mandatory
        const CMIS_ObjectInstance      & baseMOInstance,       // IN, mandatory
        const OID                      & attributeOID,         // IN
        const CMIS_Scope               & scope,                // IN, mandatory
        const CMIS_Filter              * filter        = NULL, // IN, optional
        const CMIS_Sync                * synchronization = NULL // IN, optional
        } const;
void scopedMReplaceRequest{
        OOIStatus                      * ooiStat,              // OUT, if < > NULL
```

APPENDIX-continued

```
            OOIRequest             & requestToken,              // INOUT
            const CMIS_ObjectClass  & baseMOClass,               // IN, mandatory
            const CMIS_ObjectInstance & baseMOInstance,          // IN, mandatory
            const OID              & attributeOID,               // IN
            const ANS1Type         & value,                      // IN
            const CMIS_Scope       & scope,                      // IN, mandatory
            const CMIS_Filter      * filter         = NULL,      // IN, optional
            const CMIS_Sync        * synchronization = NULL      // IN, optional
        } const;
void scopeMAddRequest{
            OOIStatus              * ooiStat,                    // OUT, if < > NULL
            OOIRequest             & requestToken,               // INOUT
            const CMIS_ObjectClass & baseMOClass,                // IN, mandatory
            const CMIS_ObjectInstance & baseMOInstance,          // IN, mandatory
            const OID              & attributeOID,               // IN
            const ANS1Type         & value,                      // IN
            const CMIS_Scope       & scope,                      // IN, mandatory
            const CMIS_Filter      * filter         = NULL,      // IN, optional
            const CMIS_Sync        * synchronization = NULL      // IN, optional
        } const;
void scopedMRemoveRequest{
            OOIStatus              * ooiStat,                    // OUT, if < > NULL
            OOIRequest             & requestToken,               // INOUT
            const CMIS_ObjectClass & baseMOClass,                // IN, mandatory
            const CMIS_ObjectInstance & baseMOInstance,          // IN, mandatory
            const OID              & attributeOID,               // IN
            const ANS1Type         & value,                      // IN
            const CMIS_Scope       & scope,                      // IN, mandatory
            const CMIS_Filter      * filter         = NULL,      // IN, optional
            const CMIS_Sync        * synchronization = NULL      // IN, optional
        } const;
void scopedMSetSomeRequest{
            OOIStatus              * ooiStat,                    // OUT, if < > NULL
            OOIRequest             & requestToken,               // INOUT
            const CMIS_ObjectClass & baseMOClass,                // IN, mandatory
            const CMIS_ObjectInstance & baseMOInstance,          // IN, mandatory
            const CMIS_ModificationList & modificationList,      // IN, mand.
            const CMIS_Scope       & scope,                      // IN, mandatory
            const CMIS_Filter      * filter         = NULL,      // IN, optional
            const CMIS_Sync        * synchronization = NULL      // IN, optional
        } const;
// * * * * * * * * * * * * * * * * * * * * * * * * * * * * * * * * * * * * * * *
// 'generic' CMIS request method
// for specification: check similar methods at proxy agent / OOI request class
void sendCMISRequest{
            OOIStatus              * ooiStat,                    // OUT, if < > NULL
            OOIRequest             & requestToken,               // INOUT
            const ASN1Type         & cmisRequest,                // IN
            OOIReqServicePrimitiveEnum primitive = CMIS_SP_UNSPECIFIED, // IN
            OOIRequest::WaitMode   waitMode                      // IN
                                   = OOIRequest::waitUntilPartialReply
        } const;
// * * * * * * * * * * * * * * * * * * * * * * * * * * * * * * * * * * * * * * *
// * * * * * * * * * * * * * * * * * * * * * * * * * * * * * * * * * * * * * * *
// proxy mo -retrieve methods
OOIProxyMO * getObject{
            OOIStatus              * ooiStat,          // OUT, if < > NULL
            const CMIS_ObjectInstance & moInstance
        };
// get root managed object
//   is defined as getObject{ distinguishedname = empty local dn };
OOIProxyMO & getRoot{
            OOIStatus              * ooiStat = NULL    // OUT, if < > NULL
        };
// * * * * * * * * * * * * * * * * * * * * * * * * * * * * * * * * * * * * * * *
// set presentationModule (optional feature)
void        setPresentationModule( const OOIPresentationModule * presentationModule );
/* * * * * * * * * * * * * * * * * * * * * * * * * * * * * * * * * * * * * * * *
 *
 *   Name:       setPresentationModule
 *   Purpose:    associate a proxy agent with a presentation module
 *   Precond.:   the proxy agent must be in state 'unconnected'
 *   Input:      the presentation module to be associated, usually != NULL
 *   Output:     %
 *   Return:     %
 *   Errors:     %
 *   Exceptions: %
 *   Note:       thanks to the OOI default presentation modules mechanism,
 *               you usually don't need this method.
```

APPENDIX-continued

```
*              Use it, if you need a more restricted presentation module
*              for (some of) your proxy agents.
*    Note:     The initial (default) value of the presentation module
*              of a proxy agent is the OOI default presentation module (see OOIEnv.H).
*              This initial value is set at proxy agent creation time.
*              Using this method, you may change the value of the
*              presentation module afterwards. (You may even reset it to
*              NULL, but this doesn't make much sense.)
*              For a connect, a value != NULL is required.
*    Note:     Any errors related to inability to create a OM workspace
*              and/or load OH packages are not detected in here, but during
*              proxy agent connect( ).
*
* * * * * * * * * * * * * * * * * * * * * * * * * * * * * * * * * * * * * * * * */
// * * * * * * * * * * * * * * * * * * * * * * * * * * * * * * * * * * * * * * * *
virtual void connect{
        OOIStatus                    * ooiStat = NULL         // OUT, if < > NULL
        };
virtual void disconnect{
        OOIStatus                    * ooiStat = NULL         // OUT, if < > NULL
        };
virtual OOIStatus reset{
        OOIBoolean                          resetSessionControls = false,
        OOIBoolean                          resetDefaultContext = false
        };
// dump operation, for debugging
virtual void      dump{ ostream& os, OOIBoolean withData } const;
void              dumpRequestQueue{ ostream& os, OOIBoolean withData } const;
void              dumpCompletedQueue{ ostream& os, OOIBoolean withData } const;
// wait, poll methods
void wait{
        OOIStatus                    * ooiStat,               // out, if < > NULL
        OOIWaitStatus                & waitStatus,            // out
        OOIGenericQueue              ** queue,                // out, if < > NULL
        OOIGenericQueueElement       ** element,              // out, if < > NULL
        long                         maxMilliSecondsToWait = -1
        };
void poll {
        OOIStatus                    *ooiStat,                // out, if < > NULL
        OOIWaitStatus                & waitStatus,            // out
        OOIGenericQueue              ** queue,                // out, if < > NULL
        OOIGenericQueueElement       ** element               // out, if < > NULL
        };
protectd:
    // class data members
    static int       _idCounter;   // used for unique proxy agent id's
    int              _id;          // each proxy agent has a unique 'id'
                                   // (mainly for debugging & use of ordered collections
    Kind             _kind;
    // queue data members
    OOINotificationQueue  *_notificationQueue;   // maybe NULL —> no monitoring role
    OOIIndicationQueue    *_indicationQueue;     // maybe NULL —> no agent role
    OOIRequestQueue       _requestQueue;
    OOIRequestQueue       _completedQueue;
    // connection info related data members
    OOIPresentationModule *_presentationModule;
    CMIS_Session          _session;
    OM_private_object     _XMPSession;           // the XMP session bound for this PA
    OOIBoolean            _XMPActivated;         // used for mp_wait/mp_receive
    OOIBoolean            _isConnected;
    CMIS_PAContext        _defaultContext;
    // some useful vars:
    // the 'actual class' OID
    static
    OOIOID                _actualClassOID;
    static
    CMIS_ObjectClass      *_actualClassMOC;
    // empty attribute id list
    static
    CMIS_AttributeIdList  *_amptyAttribureIdList;
};
// ******************************************************************************
// ******************************************************************************
class OOIProxyAgentDA0 : public OOIProxyAgentXX {
        //
        // standard constructors/destructors
        //
        private:
        // default constructor, see below
```

APPENDIX-continued

```
        // OOIProxyAgentDA0( );
        // copy constructor, disabled
        OOIProxyAgentDA0& operator={ const OOIProxyAgentDA0& rhs };
    public:
        // destructor
        // includes automatic disconnect (if necessary)
        virtual X-OOIProxyAgentDA0( );
        // initialization constructors
        OOIProxyAgentDA0{
                        OOINotificationQueue          * notificationQueue = NULL   // IN, if NULL—>none
                   ,    OOIIndicationQueue            * indicationQueue   = NULL   // IN, if NULL—>none
                   };
        OOIProxyAgentDA0{
                        const CMIS_Title              & requestorTitle,
                        const CMIS_PresentationAddress * requestorAddress,
                        OOINotificationQueue          * notificationQueue = NULL   // IN, if NULL—>none
                   ,    OOIIndicationQueue            * indicationQueue   = NULL   // IN, if NULL—>none
/* * * * * * * * * * * * * * * * * * * * * * * * * * * * * * * * * * * * * * *
 *
 *   Name:        initialization constructor
 *   Purpose:     allocate proxy agent - direct-addressing
 *   Input:       indicationQueue:     may be NULL
 *                notificationQueue:   may be NULL
 *   Output:      %
 *   Return:      %
 *   Errors:      %
 *   Exceptions:  %
 *   Note:        the queues are 'linked' in, not copied. Then they are 'owned'
 *                by the proxy agent, and will usually be deleted automatically when the
 *                proxy agent itself is deleted: see proxyAgentDeleted( ) callback.
 *
 * * * * * * * * * * * * * * * * * * * * * * * * * * * * * * * * * * * * * */
        // note:   the first 'connect' is just a redeclaration of the inherited 'connect'
        //         in order to prevent 'hiding' of the first one by the second 'connect'
        virtual  void connect{
                        OOIStatus                     * ooiStat = NULL       // OUT, if < >0 NULL
        };
        virtual  void connect{
                        OOIStatus                     * ooiStat,             // OUT, if < > NULL
                        const CMIS_Title              & responderTitle,
                        const CMIS_PresentationAddress * responderAddress = NULL };
};
// ****************************************************************************
class OOIProxyAgentDA : public OOIProxyAgentDA0 {
        //
        // standard constructors/destructors
        //
    private:
        // default constructor, disabled
        OOIProxyAgentDA( );
        // copy constructor, disabled
        OOIProxyAgentDA( const OOIRequest& rhs );
        // standard assignment operator, disabled
        OOIProxyAgentDA& operator=( const OOIProxyAgetnDA& rhs );
    public:
        // destructor
        virtual X-OOIProxyAgentDA( )
        // initialization constructor
        OOIProxyAgentDA(
                        const CMIS_Title              & requestorTitle,
                        const CMIS_PresentationAddress * requestorAddress = NULL
                   };
};
// ****************************************************************************
// ****************************************************************************
class OOIProxyAgentNDA0 : public OOIProxyAgentXX {
        //
        // standard constructors/destructors
        //
    private:
        // default constructor, see below
        //OOIProxyAgentNDA0( );
        // copy constructor, disabled
        OOIProxyAgentNDA0& operator=( const OOIProxyAgentNDA0& rhs );
    public:
        // destructor
        // includes automatic disconnect (if necessary)
        virtual X-OOIProxyAgentNDA0() :
        // initialization constructors
```

APPENDIX-continued

```
    // 1: create PA
    // (but don't connect to communications infrastructure
    // set requestorTitle first, then call connect( ))
    OOIProxyAgentNDA0{
                OOINotificationQueue   * notificationQueue  = NULL   // IN, if NULL—>none
              , OOIIndicationQueue     * indicationQueue    = NULL   // IN, if NULL—>none
                };
    // 2: create PA & set requestor title
    // (but don't connect to communications infrastructure, use connect( ) explicitly)
    OOIProxyAgentNDA0{
                const CMIS_Title                & requestorTitle,
                const CMIS_PresentationAddress  * requestorAddress = NULL,
                OOINotificationQueue            * notificationQueue = NULL // IN, if NULL—>none
              , OOIIndicationQueue              * indicationQueue   = NULL // IN, if NULL—>none
                };
/ * * * * * * * * * * * * * * * * * * * * * * * * * * * * * * * * * * * * * * * * * *
 *
 *   Name:        initialization constructor
 *   Purpose:     allocate proxy agent - direct-addressing
 *   Input:       indicationQueue:       may be NULL
 *                notificationQueue:     may be NULL
 *   Output:      %
 *   Return:      %
 *   Errors:      %
 *   Exceptions:  %
 *   Note:        the queues are 'linked' in, not copied. Then they are 'owned'
 *                by the proxy agent, and will usually be deleted automatically when the
 *                proxy agent itself is deleted: see proxyAgentDeleted( ) callback.
 *
 * * * * * * * * * * * * * * * * * * * * * * * * * * * * * * * * * * * * * * * * * */
    // connect to / disconnect from communications infrastructure
    //virtual void connect(
    //   OOIStatus                    * ooiStat              // OUT, if < > NULL
    //   }; is inheritied
};
// ***********************************************************************
class OOIProxyAgentDNA : public OOIProxyAgentDA0 {
    //
    // standard constructors/destructors
    //
  private:
    // default constructor, see below
    //OOIProxyAgetnNDA( );
    // copy constructor, disabled
    OOIProxyAgentNDA( const OOIRequest& rhs );
    // standard assignment operator, disabled
    OOIProxyAgentNDA & operator=( const OOIProxyAgentNDA& rhs );
  public:
    // destructor
    virtual XOOIProxyAgentNDA( );
    // initialization constructors
    // 1: create PA
    // (but don't connect to communications infrastructure
    // first you have to set requestorTitle, then call connect( ))
    OOIProxyAgentNDA{
                OOIIndicationQueue     * indicationQueue  = NULL // IN, if NULL—>none
                };
    // 2: create PA & set requestor title
    // (but don't connect to communications infrastructure, use connect( ) explicitly)
    OOIProxyAgentNDA{
                const CMIS_Title                & requestorTitle,
                const CMIS_PresentationAddress  * requestorAddress = NULL
              , OOIIndicationQueue              * indicationQueue  = NULL   // IN, if NULL—>none
                };
};
// ***********************************************************************
#endif
```

Listing 2: Queues Used by Proxy Agent Objects
```
/*************************************************************************/
/**                                                                      */
/**    Licensed Materials - Property of IBM                              */
/**                                                                      */
/**    5799-QLN                                                          */
```

-continued

```
/**                                                                         */
/**     © Copyright IBM Corporation 1995                                    */
/**                                                                         */
/****************************************************************************/
/*
 * RCS LOG:
 *
 * $Log:     OOIQueues.H,v $
 *
 */
#ifndef _OOI_QUEUES_INCLUDED_
#define _OOI_QUEUES_INCLUDED_
#include "OOI.XMP.H"
#include "CMIS.ALL.H"
#include "OOIErrors.H"
#include "OOIMeta.ALL.H"
// ***************************************************************************
// extern:
class OOIProxyAgentXX;
class OOIProxyMO;
// ***************************************************************************
class OOIGenericQueue;
class OOIRequest;
class OOINotificationQueue;
class OOIIndicationQueue;
class OOIRequestQueue;       // request or completed queue
class OOIGenericQueueElement;
class OOIGenericDataElement;
class OOIResponse;
class OOIIndicationOrNotification;
class OOINotification;
class OOIGenericNotification;
class OOIIndication;
// ***************************************************************************
// misc. lists holding pointers to some ooi object:
#include <iseq.h>
#include <ieqseq.h>
// ***************************************************************************
// ***************************************************************************
// OOIGenericQueueElementList:
//
//  the elements of such a list are either:
//   - individual (partial) responses for one specific request
//   - individual indications
//   - individual notifications
//   - requests, as part of the requestQueue or the completeQueue
typedef IEqualitySequence> OOIGenericQueueElement* > OOIGenericQueueElementList;
// ***************************************************************************
// ***************************************************************************
//
//      'cmis request related service primitives'
//
enum OOIRegServicePrimitiveEnum {
    CMIS_SP_GET_REQ              = 40,
    CMIS_SP_GET_RSP              ,
    CMIS_SP_SET_REQ              ,
    CMIS_SP_SET_RSP              ,
    CMIS_SP_ACTION_REQ           ,
    CMIS_SP_ACTION_RSP           ,
    CMIS_SP_CREATE_REQ           ,
    CMIS_SP_CREATE_RSP           ,
    CMIS_SP_DELETE_REQ           ,
    CMIS_SP_DELETE_RSP           ,
    CMIS_SP_EVENT_REPORT_REQ     ,
    CMIS_SP_EVENT_REPORT_RSP     ,
    CMIS_SP_CANCEL_GET_REQ       ,
    CMIS_SP_CANCEL_GET_RSP       ,
    CMIS_SP_UNSPECIFIED          = 99
    };
// * * * * * * * * * * * * * * * * * * * * * * * * * * * * * * * *
//
//      'cmis response related service primitives'
//
//     { based on XMP: mp_receive primitive_return values }
enum OOIRcvServicePrimitiveEnum {
    CMIS_SP_GET_IND              = MP_GET_IND            ,
    CMIS_SP_GET_CNF              = MP_GET_CNF            ,
    CMIS_SP_GET_ERROR            = 20,
    CMIS_SP_SET_IND              = MP_SET_IND            ,
```

-continued

```
        CMIS_SP_SET_CNF              = MP_SET_CNF              ,
        CMIS_SP_SET_ERROR            = 21,
        CMIS_SP_ACTION_IND           = MP_ACTION_IND            ,
        CMIS_SP_ACTION_CNF           = MP_ACTION_CNF            ,
        CMIS_SP_ACTION_ERROR         = 22,
        CMIS_SP_CREATE_IND           = MP_CREATE_IND            ,
        CMIS_SP_CREATE_CNF           = MP_CREATE_CNF            ,
        CMIS_SP_DELETE_IND           = MP_DELETE_IND            ,
        CMIS_SP_DELETE_CNF           = MP_DELETE_CNF            ,
        CMIS_SP_DELETE_ERROR         = 24,
        CMIS_SP_EVENT_REPORT_IND     = MP_EVENT_REPORT_IND      ,
        CMIS_SP_EVENT_REPORT_CNF     = MP_EVENT_REPORT_CNF      ,
        CMIS_SP_CANCEL_GET_IND       = MP_CANCEL_GET_IND        ,
        CMIS_SP_CANCEL_GET_CNF       = MP_CANCEL_GET_CNF        ,
        CMIS_SP_PROCESSING_FAILURE      = 27,
        CMIS_SP_SERVICE_ERROR           = 28,
        CMIS_SP_NONSERVICE_ERROR        = 33
//CMIS_SP_COMMUNICATIONS_ERROR         = 29, is covered by CMIS_SP_NONSERVICE_ERROR
//CMIS_SP_LIBRARY_ERROR                = 30, "
//CMIS_SP_SYSTEM_ERROR                 = 3  "
    };
//
// class OOIRcvServicePrimitive:
//
// encapsulates the service primitives from above into
// a 'class', providing categorization & asString( ) methods
//
class OOIRcvServicePrimitive {
    private:
        OOIRcvServicePrimitiveEnum    _primitive;
    public:
        // constructor & destructor
        OOIRcvServicePrimitive( );
        OOIRcvServicePrimitive{ OOIRcvServicePrimitiveEnum primitive };
        virtual ~OOIRcvServicePrimitive( );
        // assignment & cast
        OOIRcvServicePrimitive& operator={ OOIRcvServicePrimitiveEnum primitive };
        operator int( ) const;
        // operator OOIRcvServicePrimitiveEnum( ) const; no, (int) is enough
        void setFromInteger( int i );
        OOIString    asString( ) const;
        OOIBoolean   isErrorPrimitive( ) const;
};
// ******************************************************************************
//
// class OOIGenericQueue
//
// abstract base class for all queue types employed in the ooi:
//
//
//     _queueId:            each queue has a unique 'id'
//                          - enabling use of ordered collections
//                          - useful for debugging
//
//     _queueType:          { requestQueue, responseQueue, notificationQueue }
//
//     _numberOfElementsReceived:   statistical information about number of elements
//                                  'received'/'contained' in this queue so far
//                                  (even if these elements have already been pulled out)
//
//     _proxyAgentReference:  the proxy Agent to which this queue belongs
//
//                          always < > NULL for   - indicationQueues
//                                                - notificationQueues
//                                                - requestQueues (&completedQueues)
//                          may be NULL for       - responses
//                                                - request objects not in any queue
//
//
//     _elementList;        generic list to store the elements
//                          { requests, respones, notifications . . . }
//                          dependent on the queue type
//
//     _numberOfElements:   current number of elements in the queue
//                          basically equal to 'elementList.numberOfElements( )'
//                          but stored explicitly to ease debugging
//
```

-continued

```
class OOIGenericQueue {
  friend class OOI;
  friend class OOIGenericQueueElement;
  friend class OOIGenericQueueDataElement;
  friend class OOIResponse;
  friend class OOIIndication;
  friend class OOIRequest;
  friend class OOINotification;
  friend class OOIIndicationOrNOtification;
public:
    // queue type
    enum OOIQueueType {
      requestQueue,
      responseQueue,
      notificationQueue,
      indicationQueue,
      dummyQueue = 99      // dummy last entry
      };
    //
    // class for Cursor:
    //
    class Cursor : public OOIGenericQueueElementList::Cursor
    {
    public:
      // constructor
      Cursor{ const OOIGenericQueue& queue };
      //
      // cursor functions
      //
      // OOIGenericQueueElement & element( ) const; defined automatically
    };
    //
    // standard constructors/destructors
    //
  private:
    // default constructor, disabled
    OOIGenericQueue( );
    // copy constructor, disabled
    OOIGenericQueue{ const OOIGenericQueue& rhs };
    // standard assignment operator, disabled
    OOIGenericQueue& operator={ const OOIGenericQueue& rhs };
  public:
    // destructor
    virtual ҳOOIGenericQueue( );
  protected:
    // initialization constructor
    OOIGenericQueue{
                        OOIQueueType              queueType,
                        const OOIProxyAgentXX    * proxyAgentReference
                        };
    /* * * * * * * * * * * * * * * * * * * * * * * * * * * * * * * * * * * * * * *
     *
     *   Name:         initializatoin constructor
     *   Purpose:      allocate queue
     *   Input:        queueType
     *                 proxyAgentReference:  - must be < > NULL for responseQueue
     *                                       - usually == NULL for indication Queue/notificationQ
     *                                       —> automatically set afterwards by proxy agent constructor
     *                                          (which is usually called shortly afterwards)
     *   Output:       %
     *   Return:       %
     *   Errors:       %
     *   Exceptions:   %
     *   Note:         %
     *
     * * * * * * * * * * * * * * * * * * * * * * * * * * * * * * * * * * * * * * */
    //
    // type specific
    //
  public:
    // data member access methods
    // queue_type
    OOIQueueType                 queueType( ) const;
    // queue id
    int                          queueId( ) const;
    // reference to agent
    OOIProxyAgentXX             * proxyAgentReference( ) const;
    // current number of elements in queue
int                                          numberOfElements( ) const;
```

```
        // total number of elements received so far
        int                         numberOfElementsReceived( ) const;
        // access to queue
        OOIGenericQueueElementList & elementList( ) const;
        OOIGenericQueueElement      * lookupElementByInvokeId( int invokeId ) const;
        // may return NULL
        // dump operation, for debugging
        virtual void                dump{ ostream& os, OOIBoolean withData } const;
        // data members
    protected:
        static int           _idCounter;      // used for unique queue id's
        int                  _queueId;        // each queue has a unique 'id'
                                              // (mainly for debugging & use of ordered collections)
        OOIQueueType         _queueType;
        int                  _numberOfElementsReceived; // so far (altogether)
        OOIProxyAgentXX *    _proxyAgentReference;
        int                  _numberOfElements;  //    current number of elements
                                                 // ==   _elementList.numberOfElements
                                                 //    stored explicitly to ease debugging
                                                 //    (it is too difficult to look inside templates . . .)
        OOIGenericQueueElementList  _elementList;
};
// ****************************************************************************
// ****************************************************************************
//
//
// class OOIGenericQueueElement
//
// abstract base class for all queue elements, e.g.
//
// - requests
// - responses
// - notifications
//
//
//    _elementId:     each queue element has a unique 'id'
//                    - enabling use of ordered collections
//                    - useful for debugging
//
//    _elementKind:   { request, response, notification . . . }
//
//    _queueReference: reference to queue this element is contained in
//                    { < > NULL, as long as the element is inside a queue }
//
//    _invokeId:      invoke id of request, notification, . . .
//                    not used for responses / linked id's are not stored
//
class OOIGenericQueueElement {
    friend class OOI;
    friend class OOIGenericQueue;
    friend class OOIRequest;
    friend class OOINotificationQueue;
    friend class OOIIndicationQueue;
    public:
        // element kind
        enum Kind {
            request,
            response,
            notification,
            indication,
            dummyKind = 99
        };
        //
        // standard constructors/destructors
        //
    private:
        // default constructor, disabled
        OOIGenericQueueElement( );
        // copy constructor, disabled
        OOIGenericQueueElement{ const OOIGenericQueueElement& rhs };
        // standard assignment operator, disabled
        OOIGenericQueueElement& operator={ const OOIGenericQueueElement& rhs };
    public:
        // destructor
        virtual XOOIGenericQueueElement( );
        //
        // type specific
        //
    protected:
```

-continued

```
            // initialization constructor
            OOIGenericQueueElement{
                                    Kind                        elementKind
                                        };
            OOIGenericQueueElement{
                                    Kind                        elementKind,
                                    const OOIGenericQueue     * queueReference,
                                    int                         invokeId
                                        };
            void set{                const OOIGenericQueue     * queueReference,
                                    int                         invokeId
                                        };
        public:
            // data member access methods
            // element id
            int                         elementId( ) const;
            // element kind
            OOIGenericQueueElement::Kind elementKind( ) const;
            // reference to own queue
            OOIGenericQueue            * queueReferenceGeneric( ) const;
            // inovke-id
            int                         invokeId( ) const;
        public:
            // dump operation, for debugging
            vitual void                dump{ ostream& os, OOIBoolean withData } const;
        protected:
            // class data members
            static int          _idCounter;    // used for unique queue element id's
            int                 _elementKind;  // each queue element has a globally unique 'id'
                                               // (mainly for debugging & use of ordered collections
            Kind                _elementKind;  // request, response, notification . . .
            OOIGenericQueue   * _queueReference;
            int                 _invokeId;     // (no linked id's stored)
    };
// ************************************************************************************
//
// class OOIGenericQueueDataElement
//
// abstract class, inherited from OOIGenericQueueElement, used for
//
// - notifications
// - responses
//
//
//      _primitive:  CMIS_SP_GET_IND, CMIS_SP_EVENT_REPORT_IND etc.
//
//      _status:     represent error information in case of
//                   'responses' containing
//                      CMIS_SP_SERVICE_ERROR
//                      CMIS_SP_NONSERVICE_ERROR
//
//      _data:       represent received 'data'
//
// either 'data' or 'status' is set.
//
//
//
// the _primitive indicates what was received:
//
//   note that in case of a linked reply, the linked reply data structure
// (CMIS_LinkedReplyArgument) is automatically broken up, and the actual data
// (e.g. CMIS_GetArgument) is stored here.
//
// OOIRcvServicePrimitive                        status          data
//
// CMIS_SP_GET_IND                               SUCCESS         CMIS_GetArgument
// CMIS_SP_GET_CNF                               SUCCESS         CMIS_GetArgument
// CMIS_SP_GET_ERROR                       (L)   SUCCESS         CMIS_GetListError
// CMIS_SP_SET_IND                               SUCCESS         CMIS_SetArgument
// CMIS_SP_SET_CNF                               SUCCESS         CMIS_SetArgument
// CMIS_SP_SET_ERROR                       (L)   SUCCESS         CMIS_SetListError
// CMIS_SP_ACTION_IND                            SUCCESS         CMIS_ActionArgument
// CMIS_SP_ACTION_CNF                            SUCCESS         CMIS_ActionArgument
// CMIS_SP_ACTION_ERROR                    (L)   SUCCESS         CMIS_ActionError
// CMIS_SP_CREATE_IND                            SUCCESS         CMIS_CreateArgument
// CMIS_SP_CREATE_CNF                            SUCCESS         CMIS_CreateArgument
// CMIS_SP_DELETE_IND                            SUCCESS         CMIS_DeleteArgument
// CMIS_SP_DELETE_CNF                            SUCCESS         CMIS_DeleteArgument
// CMIS_SP_DELETE_ERROR                    (L)   SUCCESS         CMIS_DeleteError
```

-continued

```
// CMIS_SP_EVENT_IND              SUCCESS     CMIS_EventReportArgument
// CMIS_SP_EVENT_CNF              SUCCESS     CMIS_EventReportArgument
// CMIS_SP_CANCEL_GET_IND         SUCCESS     CMIS_CancelGetArgument
// (CMIS_SP_CANCEL_GET_CNF)       <is never represented by a 'GenericQueueDataElement'
//
// CMIS_SP_PROCESSING_FAILURE (L) SUCCESS     CMIS_ProcessingFailure
//
// CMIS_SP_SERVICE_ERROR          OOICMISError - (NULL)
// CMIS_SP_NONSERVICE_ERROR       OOIError     - (NULL)
//
// (*) may be of class CMIS-service-error !
// (L) only used when received as part of a linked reply. Otherwise, CMIS reports
//     these errors via a CMIS_SP_SERVICE_ERROR.
//
class OOIGenericQueueDataElement : public OOIGenericQueueElement {
    friend class OOI;
    friend class OOIGenericQueue;
    friend class OOIRequest;
    friend class OOINotificationQueue;
    friend class OOIIndicationQueue;
        //
        // standard constructors/destructors
        //
    private:
        // default constructor, disabled
        OOIGenericQueueDataElement( );
        // copy constructor, disabled
        OOIGenericQueueDataElement( const OOIGenericQueueDataElement& rhs );
        // standard assignment operator, disabled
        OOIGenericQueueDataElement& operator=( const OOIGenericQueueDataElement& rhs );
    public:
        // destructor
        virtual  ̃OOIGenericQueueDataElement( );
        //
        // type specific
        //
    protected:
        // initialization constructor
        OOIGenericQueueDataElement{
                        OOIGenericQueueElement::Kind  elementKind,
                        const OOIGenericQueue         * queueReference,
                        OOIRcvServicePrimitive          primitive,
                        int                             invokeId,
                        OOIError                      * error,
                        const ASN1Type                * data };
        OOIGenericQueueDataElement{
                        OOIGenericQueueElement::Kind  elementKind,
                        OOIRcvServicePrimitive          primitive
                        };
        void set{       const OOIGenericQueue         * queueReference,
                        int                             invokeId,
                        OOIError                      * error,
                        const ASN1Type                * data };
    public:
        // data member access methods
        // primitive
        OOIRcvServicePrimitive primitive( ) const;
        // data              & status( ) const;
        ASN1Type         *& data( ) const;
        // operations:
        ASN1Type     * unlinkData( ); // unlink data from response object, may return NULL
    public:
        // dump operation, for debugging
        virtual void    dump{ ostream& os, OOIBoolean withData } const;
    protected:
        // class data members
        OOIRcvServicePrimitive   _primitive;
        OOIStatus                _status
        ASN1Type             *   _data;
};
// ************************************************************************
// ************************************************************************
class OOIIndicationQueue : public OOIGenericQueue {
    friend class OOI;
    friend class OOIProxyAgentXX;
    friend class OOIIndication;
    //
    // class for Cursor:
    //
```

```
    class Cursor : public OOIGenericQueue::Cursor
    {
      public:
      // constructor
      Cursor{ const OOIIndicationQueue& queue };
      //
      // cursor functions
      //
    };
      // class data members
    protected:
      int               __numberOfOutstandingElements;
      //
      // standard constructors/destructors
      //
    public:
      // default constructor
      OOIIndicationQueue( );
    private:
      // copy constructor, disabled
      OOIIndicationQueue& operator={ const OOIIndicationQueue& rhs };
    public:
      // destructor
      virtual ̶X̶OOIIndicationQueue( );
      //
      // type specific
      //
    public:
      static OOIIndication & narrow{ const OOIGenericQueueElement * source};
      data member access methods
      int numberOfOutstandingElements( ) const;
      // queue methods
      // reset queue
      virtual OOIStatus      reset( );
    protected:
      // virtual callback methods for specialization in sub classes
      virtual void incomingIndicationCallback{
                          OOIIndication     * indication
                          };
    public:
      // dump operation, for debugging
      virtual void          dump( ostream& os, OOIBoolean withData ) const;
};
// ****************************************************************************
//
//
// class OOINotificationQueue
// concrete class, to store notification
//
// __numberOfOutstandingElements:
//                        number of notifications in this queue, for which
//                        confirmations are outstanding
//
class OOINotificationQueue : public OOIGenericQueue {
    friend class OOI;
    friend class OOIProxyAgentXX;
    friend class OOINotification;
    //
    // class for Cursor:
    //
    class Cursor : public OOIGenericQueue::Cursor
    {
      public:
      // constructor
      Cursor{ const OOINotificationQueue& queue };
      //
      // cursor functions
      //
    };
      //
      // standard constructors/destructors
      //
    public:
      // default constructor
      OOINotificationQueue( );
    private:
      // copy constructor, disabled
      OOINotificationQueue{ const OOINotificationQueue& rhs };
      // standard assignment operator, disabled
```

```
        OOINotificationQueue& operator={ const OOINotificationQueue& rhs };
    public:
        // destructor
        virtual ✗OOINotificationQueue( );
        //
        // type specific
        //
    public:
        static OOINotification * narrow{ const OOIGenericQueueElement * source};
        // data member access methods
        int numberOfOutstandingElements( ) const;
        // queue methods
        // reset queue
        virtual OOIStatus      reset( );
    protected:
        // virtual callback methods for specialization in sub classes
        virtual void incomingNotificationCallback{
                                 OOINotification   * notification
                                 };
    public:
        // dump operation, for debugging
        virtual void       dump{ ostream& os, OOIBoolean withData } const;
        // class data members
    protected:
        int                    _numberOfOutstandingElements;
};
// *****************************************************************************
//
//
// class OOIRequestQueue:
//
// a request queue contains references to request objects.
//
// each proxy agent has two request queues:
//   1 - a outstanding-request queue
//   2 - a completed-request queue
//
// the request objects in (1) are in state 'outstanding'
// whereas the ones in (2) are in state 'completed'.
//
// note that the request objects are not owned by this queue, but
// by the application. {this is different to notification queues}
//
//
// data members:
//   { this queue class does not define any additional data members }
//
class OOIRequestQueue : public OOIGenericQueue {
        friend class OOI;
        friend class OOIProxyAgentXX;
        //
        // class for Cursor:
        //
        class Cursor : public OOIGenericQueue::Cursor
        {
            public:
            // constructor
            Cursor{ const OOIRequestQueue& queue };
            //
            // cursor functions
            //
        };
        //
        // standard constructors/destructors
        //
    private:
        // default constructor, disabled
        OOIRequestQueue( );
        // copy constructor, disabled
        OOIRequestQueue{ const OOIRequestQueue& rhs };
        // standard assignment operator, disabled
        OOIRequestQueue& operator={ const OOIRequestQueue& rhs };
    public:
        // destructor
        virtual ✗OOIRequestQueue( );
        // initialization constructor
        OOIRequestQueue{
                 const OOIProxyAgentXX      & proxyAgentReference };
```

-continued

```
/ * * * * * * * * * * * * * * * * * * * * * * * * * * * * * * * * * * * * * *
 *
 *   Name:        initialization constructor
 *   Purpose:     allocate queue
 *   Input:
 *                proxyAgentReference: - must be < > NULL for responseQueue
 *   Output:      %
 *   Return:      %
 *   Errors:      %
 *   Exceptions:  %
 *   Note:        %
 *
 * * * * * * * * * * * * * * * * * * * * * * * * * * * * * * * * * * * * * */
//
// type specific
//
public:
  static OOIRequest * narrow{ const OOIGenericQueueElement * source};
  // data member access methods
  // queue methods
public:
  // dump operation, for debugging
  virtual void        dump{ ostream& os, OOIBoolean withData } const;
  // class data members
  // (none)
};
// *****************************************************************************
//
//
// class OOIIndicationOrNotification:
//
// this abstract class inherits from OOIGenericQueueDataElement and is the base class
// of OOINotification.
//
// data members
//
//      _toBeConfirmed:  is this notification (indication) to be confirmed
//
//      _outstanding:    for notification (indication) to be confirmed:
//                       - true, if not yet confirmed
//                       - false, if already confirmed
//                       for notification (indication) not to be confirmed:
//                       - false
//                       number of notifications in this queue, for which
//
class OOIIndicationOrNotification : public OOIGenericQueueDataElement
{
  //
  // standard constructors/destructors
  //
private:
  // default constructor, disabled
  OOIIndicationOrNOtification( );
  // copy constructor, disabled
  OOIIndicationOrNOtification( const OOIIndicationOrNotification& rhs );
  // standard assignment operator, disabled
  OOIIndicationOrNotification& operator={ const OOIIndicationOrNotification& ths };
protected:
  // destructor
  virtual ˜OOIIndicationOrNotification( );
  //
  // type specific
  //
  // initialization constructor
  OOIIndicationOrNotification{
              OOIGenericQueueElement::Kind  elementKind,
              const OOIGenericQueue   * queueReference,
              OOIRcvServicePrimitive     primitive,
              int                        invokeId,
              OOIBoolean                 toBeConfirmed,
              OOIError                 * error,
              const ASN1Type           * data };
  OOIIndicationOrNotification{
              OOIGenericQueueElement::Kind  elementKind,
              OOIRcvServicePrimitive     primitive
              };
  void set{     const OOIGenericQueue    * queueReference,
                int                        invokeId,
  OOIBoolean         toBeConfirmed,
```

```
        OOIError          * error,
        const ASN1Type    * data };
    // data member access methods
    public:
        // confirmed/unconfirmed
        OOIBoolean              toBeConfirmed( ) const;
        // state
        OOIBoolean              isOutstanding( ) const;
        // dump operation, for debugging
        virtual void    dump{ ostream& os, OOIBoolean withData } const;
    protected:
        // class data members
        OOIBoolean              _toBeConfirmed;
        OOIBoolean              _outstanding;
    };
// ****************************************************************************
class OOIIndication : public OOIIndicationOrNOtification {
    friend class OOIProxyAgentXX;
    protected:
        // class data members
        int             _numberOfReplies;
        //
        // standard constructors/destructors
        //
    private:
        // default constructor, disabled
        OOIIndication( );
        // copy constructor, disabled
        OOIIndication( const OOIIndication & rhs );
        // standard assignment operator disabled
        OOIIndication & operator={ const OOIIndication & rhs };
    public:
        // destructor
        virtual ⨯OOIIndication( );
        //
        // type specific
        //
    protected:
    // initialization constructor
    OOIIndication{
                        const OOIIndicationQueue    * queueReference,
                        OOIRcvServicePrimitive        primitive,
                        int                           invokeId,
                        OOIBoolean                    toBeConfirmed,
                        OOIError                    * error
                        const ASN1 Type             * data };
    public:
        // data member access methods
        // reference to own queue
        OOIIndicationQueue * queueReference( ) const;
        // is scoped request ?    (shortcut for looking into CMIS_xxxArgument)
        OOIBoolean          isScoped( ) const;
        // reply methods:
        // empty reply, e.g. no object selected by scoping
        //   use linkedReplyCompleted( )
        // simple reply:
        //   - one successful reply - unlinked
        // or use 0..n time linkedXXXReply( ) and finish wth linkedReplyCompleted( )
        // or use 0..n time linkedXXXReply( ) and finish with error reply ( operation-cancelled)
        // or use error reply: reply with CMIS service error (generally not a linked reply)
        void simpleReply{
                        OOIStatus           * ooiStat,           // OUT, if < > NULL
                        const ASN1Type      & reply };
void linkedReply{
                        OOIStatus           * ooiStat,           // OUT, if < > NULL
                        const ASN1Type      & reply };
void linkedReplyCompleted{
                        OOIStatus           * ooiStat            // OUT, if < > NULL
                        };
void errorReply{
                        OOIStatus           * ooiStat,           // OUT, if < > NULL
                        const OOICMISError  & reply };
    public:
        // dump operation, for debugging
        virtual void            dump{ ostream& os, OOIBoolean withData } const;
};
// ****************************************************************************
#include "OOIRequest.H"
#include "OOIResponse.H"
```

-continued

```
#include "OOINotification.H"
#include "OOIGenericNotification.H"
// ******************************************************************************
#endif
```

Listing 3: OOI Request Class

```
/******************************************************************************/
/**                                                                          */
/**    Licensed Materials - Property of IBM                                  */
/**                                                                          */
/**    5799-QLN                                                              */
/**                                                                          */
/**    © Copyright IBM Corporation 1995, 1996                                */
/**                                                                          */
/******************************************************************************/
#ifndef __OOI_REQUEST_INCLUDED__
#define __OOI_REQUEST_INCLUDED__
//
// class OOIRequest
//
// instances represent CMIS requests
// these request objects may be contained in a RequestQueue or CompletedQueue
//   of a proxy agent
// each request object has a response queue
//
// applications may define their own request class inherited from this class,
// and supply application specific callback logic.
//
//
//
// data members:
//
//
//     CMIS_Mode           __confirmationMode:
//
//         - stores confirmation mode of an outstanding request.
//         - set when the request is issued by the application
//         - information is valid until a request object is 'reset' or 'reused' for
//             a different request
//
//
//     OOIProxyMO          * __proxyMOReference:
//
//         - used if this request has been initiated via a PMO
//         - references this PMO, otherwise NULL
//         - if the PMO is deleted (or changed), the ooi automatically cares for
//             resetting this reference to NULL
//
//
//     WaitMode            __waitMode:
//
//         - to remember 'waitMode' during outstanding call
//         - set when the request is issued by the application
//         - information is valid until a request object is 'reset' or 'reused' for
//             a different request
//
//     OOIBoolean          __isScoped;
//
//
//         - to remember whether a request is scoped or unscoped during outstanding call
//         - set when the request is issued by the application
//         - information is valid until a request object is 'reset' or 'reused' for
//             a different request
//
//
//     int                 __requestCounter;
//
//         - statistical information about how many requests have been issued
//             using this request object, (may be useful for debugging)
//         - initially 0,
//         - == 1, while first request is outstanding or completed
//         -  > 1, if this request object is reused
//
//
```

```
//    OOIReqServicePrimitiveEnum    _primitive:
//
//        - to remember the service primitive, e.g. CMIS_SP_GET_REQ, during outstanding call
//        - set when the request is issued by the application
//        - information is valid until a request object is 'reset' 'reused' for
//            a different request
//
//
//    state                          _state:
//
//        - state of this request:    idle, outstanding, or completed
//        - state is related to queue membership:
//            state           request if contained in queue:
//            -idle;          <in no queue>
//            -outstanding    <in outstanding-request-queue of a proxy agent>
//            -completed      <in completed-request-queue of a proxy agent>
//                        or  <in no queue>
//
//
//    CompletionState           _completionState;
//
//        - information about how a request has completed
//        - information is only useful for requests in state 'completed'
//        - the 'completionStatus' described next is similar, but provides more
//            detailed information
//        - values:
//            unspecified:        request is not in state 'completed'
//            normallyCompleted:  successful as specified by protocol / service interface
//                                (responses were either indicating success or cmis-errors,
//                                but no other errors)
//            couldNotBeIssued,   issuance of request failed
//            abandonedByUser:    the user (== the ooi application) has abandonned the request
//            abortedByProvider:  request ended due to broken connection
//
//        - information is valid until a request object is 'reset' or 'reused' for
//            a different request
//
//
//    OOIStatus               _completionStatus
//
//        - information about how a request has completed, provided via a 'status object'
//        - information is only useful for requests in state 'completed'
//        - value:
//            SUCCESS:            only 'successful' responses have been received,
//                                (even no cmis-errors !!!)
//            OOICMISError:       for a scoped request several responses have been received.
//                                Several of them were cmis-errors.)
//            CMISERR_XXX:        (a particular cmis-error)
//                                a single response, containing 'this' cmis-error has
//                                been received
//                                Note the special case of a CMISERR_OperationCancelled:
//                                Its original purpose in CMIS is to indicate that processing of
//                                a get request has been terminated due to a cancel get.
//                                The ooi extends this meaning to all CMIS requests:
//                                all requests can be abandoned, this 'abandon' is
//                                represented by a completionStatus 'CMISERR_OperationCancelled'.
//            OOIXMPCommunicationsError: request is ended due to communications error
//            <OTHER ERROR>:      internal error or any other application error during issuance
//                                of the request of processing of responses.
//        - information is valid until a request object is 'reset' or 'reused' for
//            a different request
//
//
//    int                     _numberOfResultElementsReceived;
//
//        - number of cmis-result (excluding cmis service errors) received for 'this' request
//        - information is valid until a request object is 'reset' or 'reused' for
//            a different request
//
//
//    int                     _numberOfServiceErrorsReceived;
//
//        - number of cmis-service-error received for 'this' request
//        - information is valid until a request object is 'reset' or 'reused' for
//            a different request
//
//
//    int                     _numberOfNonServiceErrorsOccurred
//
```

-continued

```
//              - number of errors other than cmis service errors
//              - either '0' or '1'
//              - if '1', then request is completed with completionState '???'
//
//
//      CMIS_PAContext      * _defaultContext
//
//              - a default context may be defined for a request object
//              - this default context overrides the proxy agent default context
//              - this default context may however be overridden by a 'single cell context>
//
//
//      CMIS_PAContext      * _actualContext:
//
//              - used to remember context for potential 'cancel' of a get req
//              - < > NULL only for outstanding 'get-requests'
//              - this mechanism is only enabled when the OOI::saveGetContextForAbandon switch
//                  is turned on. Otherwise 'actualContext' is ==NULL.
//
class OOIRequest : public OOIGenericQueue, public OOIGenericQueueElement {
    friend class OOI;
    friend class OOIProxyMO;
    public:
        // current state of request
        enum State {
            idle = 0,
            outstanding,
            completed
        };
        // wait mode
        enum WaitMode {
            waitUntilPartialReply   = 0,
            waitUntilCompletion     = 1,
            synchronousWait         = 2
        };
        // completion info
        enum CompletionState {
            unspecified = 0,
            normallyCompleted,      // successful as specified by protocol / service interface
            couldNotBeIssued,       // could not be issued
            abandonnedByUser,       // by application
            abortedByProvider       // connection broken etc
        };
    //
    // class for Cursor:
    //
    class Cursor : public OOIGenericQueue::Cursor
    {
        public:
        // constructor
        Cursor { const OOIRequest& queue };
        //
        // cursor functions
        //
    };
    //
    // standard constructors/destructors
    //
    private:
        // default constructor, see below
        // OOIRequest( );
        // copy constructor, disabled
        OOIRequest{ const OOIRequest& rhs );
        // standard assignment operator, disabled
        OOIRequest& operator={ const OOIRequest& rhs };
    public:
        // destructor
        virtual XOOIRequest( );
        // initialization/default constructor
        OOIRequest{
                    const OOIProxyAgentXX   * proxyAgentReference = NULL,
                    const OOIProxyMO        * proxyMOReference = NULL
                };
    /* * * * * * * * * * * * * * * * * * * * * * * * * * * * * * * * * * * * *
     *
     *   Name:       initialization constructor
     *   Purpose:    allocate queue
     *   Input:
     *               proxyAgentReference:   - may be NULL
```

-continued

```
 *                proxyMOReference:    - may be NULL
 *    Output:     %
 *    Return:     %
 *    Errors:     %
 *    Exceptions: %
 *    Note:       in order to issue requests, proxyAgentReference has to be < > NULL
 *                (when an request is actually to be issued).
 *                see also setProxyAgentReference
 *
 * * * * * * * * * * * * * * * * * * * * * * * * * * * * * * * * * * * * * * */
//
// type specific
//
public:
    static OOIResponse * narrow{ const OOIGenericQueueElement * source};
    // data member access methods
    const CMIS__Mode    & confirmationMode( ) const;   // doesn't make sense for non-outstanding requests
    OOIBoolean            toBeConfirmed( ) const;      // however, doesn't cause any error
    OOIProxyMO          * proxyMOReference( ) const;
    WaitMode              waitMode( ) const;
    OOIBoolean            isScoped( ) const;
    OOIReqServicePrimitiveEnum primitive( ) const;
    // int                invokeId( ) const; (is inherited)
    // about the state of the request
    State                 state( ) const;
    OOIString             stateAsString( ) const;
    OOIBoolean            isIdle( ) const;
    OOIBoolean            isOutstanding( ) const;
    OOIBoolean            isCompleted( ) const;
    CompletionState       completionState( ) const;
    OOIString             completionStateAsString( ) const;
    OOIBoolean            isNormallyCompleted( ) const;
    OOIBoolean            isCouldNotBeIssued( ) const;
    OOIBoolean            isAbandonnedByUser( ) const;
    OOIBoolean            isAbortedByProvider( ) const;
    const OOIStatus     & completionStatus( ) const;
    OOIBoolean            errorOccurred( ) const;
    int                   numberOfResultElementsReceived( ) const;
    int                   numberOfServiceErrorsReceived( ) const;
    int                   numberOfNonServiceErrorsOccurred( ) const;
    // methods to update data members
    // precondition: request is not in state 'outstanding'
    void                  setProxyAgentReference{ const OOIProxyAgentXX * pxyAgent };
    void                  setProxyMOReference{ const OOIProxyMO * proxyMO }; // may be NULL
    // context related
    const CMIS__PAContext & defaultContext( ) const;
    OOIBoolean              hasDefaultContext( ) const;
    void                    setDefaultContext( const CMIS__PAContext & context );
    void                    resetDefaultContext( );
    // queue methods
    // reset queue
    virtual OOIStatus     reset( ); // = reset( false, false, false )
    OOIStatus reset{
                OOIBoolean                  resetProxyAgentReference,//
    OOIBoolean                              resetProxyMOReference,    // = false,
    OOIBoolean                              resetDefaultContext       // = false
    };
    virtual void doRequest{
                OOIStatus              * ooiStat,              // OUT, if < > NULL
                const OOIProxyMO       * proxyMO,              // IN, maybe NULL
                const ASN1Type         & cmisRequest,          // IN
                const CMIS__Mode       & confirmationMode      // IN
                const CMIS__PAContext  * singleCallContext = NULL,// IN, may be NULL
                OOIReqServicePrimitiveEnum primitive = CMIS__SP__UNSPECIFIED
                WaitMode                 waitMode = waitUntilPartialReply };
                };
    virtual void doSynchronousRequest{
                OOIStatus              * ooiStat,              // OUT, if < > NULL
                const OOIProxyMO       * proxyMO,              // IN, maybe NULL
                const ASN1Type         & cmisRequest,          // IN
    const CMIS__PAContext              * singleCallContext = NULL,// IN, may be NULL
    OOIReqServicePrimitiveEnum           primitive = CMIS__SP__UNSPECIFIED
    };
    virtual void abandon{
                OOIStatus              * ooiStat = NULL,       // OUT, if < > NULL
                const CMIS__PAContext  * cancelGetContext = NULL   // IN, may be NULL
                };
    void cancel{
                OOIStatus              * ooiStat,              // OUT, if < > NULL
```

-continued

```
                 OOIRequest              & cancelRequestToken,      // INOUT
                 const CMIS_PAContext    * cancelGetContext = NULL  // IN, may be NULL
                 } const;
void             wait{
                 OOIStatus               * ooiStat = NULL           // OUT, if < > NULL
                 };
virtual void takeOutOfQueue{
                 OOIStatus               * ooiStat = NULL           // OUT, if < > NULL
                 };
/* * * * * * * * * * * * * * * * * * * * * * * * * * * * * * * * * * * * * */
*
*   Name:        doRequest
*   Purpose:
*   Input:
*   Output:      %
*   Return:      %
*   Errors:      %
*   Exceptions:  %
*   Note:        %
*
/* * * * * * * * * * * * * * * * * * * * * * * * * * * * * * * * * * * * * */
*
*   Name:        doSynchronousRequest
*   Prupose:
*   Input:
*   Output:      %
*   Return:      %
*   Errors:      %
*   Exceptions:  %
*   Note:        == doRequest{ confirmed, synchronousWait }
*
/* * * * * * * * * * * * * * * * * * * * * * * * * * * * * * * * * * * * * */
*
*   Name:        abandon
*   Purpose:     abandon an active (asynchronous-confirmed) request
*   Input:       sendCancelGet: include sending of a cancel get, if the original
                                request was a get request
*   Output:      %
*   Return:      %
*   Errors:      %
*   Exceptions:  %
*   Note:        has not effect if the request is not outstanding.
*   Note:        if the original request was a get-request and if 'sendCancelGet' is true,
*                a cancel-get request if sent. However, the confirmation of the cancel-get
*                will not be returned to the application. The request immediately will
*                change its state to 'completed'.
*   Note:        the abandonCallback will be invoked
*
/* * * * * * * * * * * * * * * * * * * * * * * * * * * * * * * * * * * * * */
*
*   Name:        cancel
*   Purpose:     cancel this outstanding get request by issuing a
*                cancel get request
*   Precond.:    'this' request must be a get-request, and outstanding
*                'cancelRequestToken' may not be outstanding
*   Input:       cancelRequestToken
*   Output:      %
*   Return:      %
*   Errors:      OOIInvalidRequest etc.
*   Exceptions:  %
*   Note:        this method implements the 'normal' CMIS cancel get:
*                As defined by CMIS, the request to be cancelled is not
*                immediately abandonned. Responses can still be received,
*                until the agent sends the final CMIS-operation-cancelled service error.
*
*                The 'cancelRequestToken' request object is an 'outstanding' request on
*                its own, and will be confirmed by a cancel-get-cnf.
*
/* * * * * * * * * * * * * * * * * * * * * * * * * * * * * * * * * * * * * */
*
*   Name:        takeOutOfQueue
*   Purpose:     take a completed request out of the completed queue (if in there)
*   Precond:     request is not in state outstanding
*   Input:       %
*   Output:      %
*   Return:      %
*   Errors:      %
*   Exceptions:  OOIInvalidRequest, if 'request' is outstanding
*   Note:        %
```

-continued

```
*
* * * * * * * * * * * * * * * * * * * * * * * * * * * * * * * * * * * * */
// equality: two request are equal, only if they are the same object (—>pointer comparison)
friend int operator==( const OOIResponse& lhs, const OOIResponse$ rhs );
//
// methods related to responses
// (see also OOIProxyMO)
//
OOIBoolean hasAttribute{
                OOIStatus              * ooiStat,             // OUT, if < > NULL
                const OID              & attributeOID         // IN
                } const;
void receiveAttribute{
                OOIStatus              * ooiStat,             // OUT, if < > NULL
                const OID              & attributeOID,        // IN
                ASN1Type               & result               // OUT
                } const;
ASN1Type * receiveNextAttribute{
                OOIStatus              * ooiStat              // OUT, if < > NULL
                OID                    & attributeOID,        // OUT, conditional
                ASN1Type               *& attributeError      // OUT, only if attributeError
                };
ASN1Type * receiveActionReply{
                OOIStatus              * ooiStat              // OUT, if < > NULL
                } const;
void receiveActionReply{
                OOIStatus              * ooiStat,             // OUT, if < > NULL
                ASN1Type               * actionReplyData,     // OUT, conditional
                OOIBoolean             * actionReplyPresence = NULL // OUT, conditional
                } const;
// unfortunately the 'actionReplyDate' parameter can not default to NULL,
// (would collide with 1st version of this method)
* * * * * * * * * * * * * * * * * * * * * * * * * * * * * * * * * * * * */
*
*    Name:         hasAttribute
*    Purpose:      test, whether a specific attributeValue available
*                  if the atttributeValue is part of a cmis error etc, partial reply error etc.
*                  it is nevertheless indicated as present, and may be retrieved via
*                  receiveAttribute. This does not hold for attribute related error
*                  without error value (e.g. NoSuchAttribute),
*                  and also not for cmis-setlisterror
*    Precond.:     request is completed
*    Input:
*    Output:
*    Return:
*    Errors:       if the attributeValue can not be found, ooiStat resp. the exception
*                  will indicate an internal error or a cmis error
*    Exceptions:   %
*    Note:         %
*
* * * * * * * * * * * * * * * * * * * * * * * * * * * * * * * * * * * * */
*
*    Name:         receiveNextAttribute ('iterator method')
*    Purpose:      receive 'next' attribute related info of a cmis result
*                  this functions should only be used for results, that contain
*                  attribute related information, such as:
*                      CreateResult
*                      GetListError
*                      GetResult
*                      SetListError
*                      SetResult
*                      (InvalidAttributeValue ?)
*                      (MIssionAttributeValue ?)
*                      (NoSuchAttribute?)
*    Precond.:     request if completed
*    Input:        this request, representing cmis result structure, of a type
*                      listed above.
*                  If called with other results structures —> see errors
*    Output:       see below
*                  ooiStat/the exception will indicate AccessError
*                  in return code mode: returns NULL, resets attributeOID to EMPTY_OID
*
*                  if there is data:
*                    set 'attributeOID', return the value
*
*                  if there is attribute related error info:
*                    set 'attributeOID', return NULL,
*                    ooiStat/the exception will indicate the attribute related error
*
```

```
 *   Return:      <explained above>
 *   Errors:      CMIS-error : 'XXX' if a cmis error other than listed above occurred
 *   Errors:      OOIInvalidRequest / InternalError etc. : in other cases
 *
 *   Exceptions:  %
 *   Note:        see also the mibDumpCB sample
 *
 *
 *   The following table defines the various return values
 *   of the receiveNextAttribute( ) methods.
 *
 *
 *   called with:
 *   cmis objects: ('cmisResponseData')
 *                              ooiStat     OID  Value  Error
 *   CreateResult               success     +    +      -
 *                              AccessError -    -      -
 *
 *   GetListError               success     +    +      -
 *                              success     +    -      +
 *                                                      (Get/SetInfoStatus)
 *                              AccessError -    -      -
 *
 *   GetResult                  success     +    +      -
 *                              AccessError -    -      -
 *
 *   SetListError   see GetListError
 *   SetResult      - see SetResult
 *
 *   <other cmis objs>    InvRequest  -    -      -
 *
 *
 *
 *   cmis/ooi error objects: ('errorResponseData')
 *
 *   InvalidAttr.Val.           success     +    -      +
 *                                                      (Attribute)
 *                              AccessError -    -      -
 *
 *   NoSuchAttr. Val.           success     +    -      - (!)
 *                              AccessError -    -      -
 *
 *   MissingAttr.Val.           success     +    -      - (!)
 *                              AccessError -    -      -
 *
 *   <other error objs>    <error obj>  -    -      -
 *
 *
 *
 * * * * * * * * * * * * * * * * * * * * * * * * * * * * * * * * * * * * * */
 *
 *   Name:        receiveActionReply
 *   Purpose:     receive the 'reply' data of a completed action
 *   Precond.:    request is completed
 *                received cmis data is actionResult
 *
 *   Input:       %
 *   Output:      %
 *   Return:      %
 *   Errors:      %
 *   Exceptions:  %
 *   Note:        %
 *
 * * * * * * * * * * * * * * * * * * * * * * * * * * * * * * * * * * * * * */
protected:
  // virtual callback methods for specialization in sub classes
  virtual void partialReplyCallback{
                           OOIResponse        * response
                           };
  virtual void errorReplyCallback{
                           OOIResponse        * response
                           };
  virtual void replyCompletedCallback( );
public:
  // dump operation, for debugging
  virtual void         dump{ ostream& os, OOIBoolean withData } const;
  // class data members
protected:
  CMIS_Mode          _confirmationMode;   // stores confirmationMode for a particular request
```

-continued

```
        OOIProxyMO         * _proxyMOReference;   // may be NULL
        WaitMode             _waitMode;            // to remember 'waitMode' during outstanding call
        OOIBoolean           _isScoped;
        int                  _requestCounter;      // number of requests issued
        OOIReqServicePrimitiveEnum _primitive;     // GET, SET etc.
        State                _state;
        CompletionState      _completionState;     // valid only if _state == completed
        OOIStatus            _completionStatus;    // valid only if _stats == completed
        int                  _numberOfResultElementsReceived;
        int                  _numberOfServiceErrorsReceived;
        int                  _numberOfNonServiceErrorsOccurred;
        CMIS_PAContext     * _defaultContext;      // may be NULL
        CMIS_PAContext     * _actualContext;       // remember context for potential 'cancel' of a get req
    };
    #endif // _OOI_REQUEST_INCLUDED_
```

Listing 4: OOI Response Class
```
/*************************************************************************/
/**                                                                      */
/**    Licensed Materials - Property of IBM                              */
/**                                                                      */
/**    5799-QLN                                                          */
/**                                                                      */
/**    © Copyright IBM Corporation 1995                                  */
/**                                                                      */
/*************************************************************************/
#ifndef _OOI_RESPONSE_INCLUDED_
#define _OOI_RESPONSE_INCLUDED_
//
// class OOIResponse:
//
// instances of this class are responses for requests,
// these responses are stored
// in a response queue belonging to the request
//
// (note that for linked replies the 'final element' is not
// stored in the response queue at all)
//
// data members
//      _finalElement ( OOIBoolen ):   basically as in CMIS & DMP:
//                                     1 - for linked replies:
//                                         set to true only for the last element
//                                     2 - for a single reply:
//                                         set to true
//
//              (however as noted above, for linked replies the 'final element' is not
//              stored in the response queue at all)
//
//
class OOIResponse : public OOIGenericQueueDataElement {
    friend class OOIRequest;
    //
    // standard constructors/destructors
    //
    private:
    // default constructor, disabled
    OOIResponse( );
    // copy constructor, disabled
    OOIResponse( const OOIResponse% rhs );
    // standard assignment operator, diabled
    OOIResponse& operator=( const OOIResponse& rhs );
    public:
    // destructor
    virtual ~OOIResponse( );
    //
    // type specific
    //
    // initialization constructor
    OOIResponse{
                    const OOIRequest         * requestReference,
                    OOIRcvServicePrimitive     primitive,
                    int                        invokeId,
                    OOIBoolean                 finalElement,
```

-continued

```
                    OOIError            * error,
                    const ASN1Type      * data };
// data member access methods
// reference to request
OOIRequest          * requestReference( ) const;
OOIBoolean          isFinalElement( ) const;
// note:  these methods returns 'alias' pointers to data owned by
//        the response object
CMIS_ObjectInstance    * lookupObjectInstance{
        OOIErrorMode  errorMode = OOI_ERR_RC
        } const;
OOIProxyMO          * createProxyMOFromData{
        OOIErrorMode  errorMode = OOI_ERR_RC
        } const;
// what's in the response ?
OOIBoolean isSuccess( ) const;
OOIBoolean isError( ) const;
OOIBoolean isLinkedError( ) const;
OOIBoolean isCMISError( ) const;
OOIBoolean isNonCMISError( ) const;
/* * * * * * * * * * * * * * * * * * * * * * * * * * * * * * * * * *
*
*    primitive                         classification                data/status
*
*                                      Success
*                                      |   Error
*                                      |   |   LinkedError
*                                      |   |   |   CMISError
*                                      |   |   |   |   NonCMISError
*                                      |   |   |   |   |
*    CMIS_SP_GET_CNF                   S   —   —   —   —            'data'
*    CMIS_SP_GET_ERROR                 —   E   L   —   —            'data'
*    CMIS_SP_SET_CNF                   S   —   —   —   —            'data'
*    CMIS_SP_SET_ERROR                 —   E   L   —   —            'data'
*    CMIS_SP_ACTION_CNF                S   —   —   —   —            'data'
*    CMIS_SP_ACTION_ERROR              —   E   L   —   —            'data'
*    CMIS_SP_CREATE_CNF                S   —   —   —   —            'data'
*    CMIS_SP_DELETE_CNF                S   —   —   —   —            'data'
*    CMIS_SP_DELETE_ERROR              —   E   L   —   —            'data'
*    CMIS_SP_EVENT_REPORT_CNF          S   —   —   —   —            'data'
*
*    (CMIS_SP_CANCEL_GET_CNF)          —                            (no response object at all)
*
*    CMIS_SP_PROCESSING_FAILURE        —   E   L   —   —            'data'
*
*    CMIS_SP_SERVICE_ERROR             —   E   —   C   —            'status'
*    CMIS_SP_NONSERVICE_ERROR          —   E   —   —   N            'status'
*
*
*
* * * * * * * * * * * * * * * * * * * * * * * * * * * * * * * * * */
//
// methods related to reponses
// (see similar methods in OOIRequest( ) for documentation)
OOIBoolean hasAttribute{
            OOIStatus          * ooiStat          // OUT, if < > NULL
            const OID          & attributeOID     // IN
            } const;
void receiveAttribute{
            OOIStatus          * ooiStat,         // OUT, if < > NULL
            const OID          & attributeOID,    // IN
            ANS1Type           & result           // OUT
            } const;
ASN1Type * receiveNextAttribute{
            OOIStatus          * ooiStat,         // OUT, if < > NULL
            OID                & attributeOID,    // OUT, conditional
            ASN1Type           *& attributeError  // OUT, only if attributeError
            };
ASN1Type * receiveActionReply{
            OOIStatus          * ooiStat          // OUT, if < > NULL
            } const;
void receiveActionReply{
            OOIStatus          * ooiStat,         // OUT, if < > NULL
            ASN1Type           * actionReplyData, // OUT, conditional (*)
            OOIBoolean         * actionReplyPresence = NULL // OUT, conditional
            } const;
            // (*): impl. note (quirk):
            // 'actionReplyData' can not default to NULL, would collide with 1st version of this method
// * * * * * * * * * * * * * * * * * * * * * * * * * * * * * * * * * * *
```

```
        // dump operation, for debugging
        virtual void      dump( ostream& os, OOIBoolean withData ) const;
/* * * * * * * * * * * * * * * * * * * * * * * * * * * * * * * * * * * * * * * * * */
        *
        *   Name:         createProxyMOFromData
        *   Purpose:      look at data in response, and build up proxy mo object
        *                 works only, if data contains moc & moi
        *   Input:        errorMode:   if proxy mo cannot be created,
        *                              report error either by return NULL or via exc.
        *   Output:       %
        *   Return:       NULL, if no data available, or moc and/or moi missing
        *   Errors:       %
        *   Eceptions:    %
        *   Note:         may create a generic proxy mo, if moc unknown
        *                 current version does not destroy moc/moi info of data
        *                 this may change in future !
        *
        * * * * * * * * * * * * * * * * * * * * * * * * * * * * * * * * * * * * * */

// class data members
    protected:
        OOIBoolean              _finalElement;
};
#endif // _OOI_RESPONSE_INCLUDED_
```

---

```
Listing 5: Proxy Managed Object Class
/*******************************************************************************/
/**                                                                           */
/**     Licensed Materials - Property of IBM                                  */
/**                                                                           */
/**     5799-QLN                                                              */
/**                                                                           */
/**     © Copyright IBM Corporation 1995                                      */
/**                                                                           */
/*******************************************************************************/
/*
 * RCS LOG:
 *
 *
 */
#ifndef _OOI_PROXY_MO_INCLUDED_
#define _OOI_PROXY_MO_INCLUDED_
//
// EXPORTS:
// the following class definitions are exported to OOI applications:
//
class OOIProxyMO;
class OOIProxyMOList;
// externals:
class OOIProxyMOData;
//
// includes:
//
#include <iseq.h>
#include "OOIProxyAgent.H"
#include "OOIPMORequest.H"
// the following 'include' is currently needed for generated PMO's:
// but also useful for debugging...
#include "OOIProxyMOData.H"
// * * * * * * * * * * * * * * * * * * * * * * * * * * * * * * * * *
//
// class OOIProxyMO    is the abstract base class of
//                     all typed proxy mo's and OOIGenericMO
//
// it provides
//
//    _metaInfo:         pointer to MOCMetaInfo, always < > NULL
//                       for generic proxy mo's (of class OOIGenericMO) one special
//                       meta info object 'OOI_GenericMO_MetaInfo' with
//                       moClass set to " " (empty-oid) is provided.
//                       this is a read-only member
//    _moClass;          available thru meta info, resp. stored in OOIGenericMO class
//                       this is a read-only member
//    _instanceName:     distinguished name, may be empty (up to you...)
//    _packagesCacheValid: indicates validity of cached _packages info, (internal)
```

```
//    __packages:       retrieve-once, provide-many 'cache' for packages attributed (internal)
//    __agent:          reference to proxy agent, normally < > NULL
//                      in order to invoke cmis operations
//                      this agent reference has to be < > NULL
//                      this agent reference may be temporarily == NULL (up to you...)
//
// About the 'packages' cache:
//
//   when is the packages cache filled:
//
//   a.   when it is empty, and
//   b.   when one of the following requests is issued:
//        1-   hasConditionalPackage
//        2-   getPackage
//        3-   or when any response for an unscoped request containing
//             package attribute information arrives
//             e.g. a create-response, get-some-response, get-list-error
//   c.   when the CMIS request is issued using a proxy MO
//
//   d.   or: when the OOI built up the proxy MO and information about the
//        packages cache was available. (getSubordinates( ) etc.)
//
//   an update of 'instanceName' or 'agent' (from NULL->agent) will cause
//   the packages cache to be invalidated.
//
// note:
//        -   the absence of the 'packages' attribute in the agent-mo is represented by
//            '__packagesCacheIsValid'    : TRUE
//            '__packages'                : NULL
//            in this case, 'hasConditionalPackage' will always return 'false'
//            in this case, 'getPackage' will return a 'NoSuchAttribute' cmis error
//            (in accordance to normal cmis behaviour)
//
// * * * * * * * * * * * * * * * * * * * * * * * * * * * * * * * * * * * * * *
//
// these dummy definitions are related to the 'packages caching logic'
//    and 'cmis create'
// these definitions are OOI internal only:
//
#ifndef __DMI_PACKAGES_INCLUDED__
#define DMI_Packages        ASN1Type
#endif
#ifndef __DMI_NAME_BINDING_INCLUDED__
#define DMI_NameBinding     ASN1Type
#endif
// * * * * * * * * * * * * * * * * * * * * * * * * * * * * * * * * * * * * * *
//
// class OOIProxyMO
//
// this is a public OOI class
// it is the abstract base class of
//    all typed proxy mo's and OOIGenericMO
//
// this class provides the following categories of methods:
//
//   - local member access (of course...)
//   - packages cache related methods
//   - unscoped    synchronous cmis operations
//   -   scoped    synchronous cmis operations
//   - unscoped asynchronous cmis send operations
//   -   scoped asynchronous cmis send operations
//   - receive attribute value resp. action reply value methods for
//     looking at responses of asynchronous requests
//
//
// note:  'equality of mo's/pmo's':
//        there is no equality operator (==) provided for this class
//        and for its subclasses.
//        the most reasonable equality test for proxy mo's is to
//        test for equality of the 'MOI'-information:
//
//           if ( pmo1.moInstance( ) == pmo2.moInstance( ) )
//
//        this however does not take into account, that
//        a pmo with a 'localDistinguishedName' may be the same
//        as one with a 'distinguishedName' resp. a 'nonSpecificForm'.
//
class OOIProxyMO
{
```

-continued

```
// friend's (for packages cache etc)
friend class OOI;
friend class OOIRequest;
public:
    // state of packages cache
    enum CacheStatus {
      invalid,
      updating,
      valid
      };
    //
    // standard constructors/destructors
    //
private:
    // default constructor, disabled
    OOIProxyMO( );
    // copy constructor, disabled
    OOIProxyMO( const OOIProxyMO& rhs );
    // standard assignment operator, disabled
    OOIProxyMO& operator=( const OOIProxyMO& rhs );
public:
    // destructor
    virtual %OOIProxyMO( );
protected:
    // these initialization constructors are employed by the subclasses only
    // (remember: the OOIProxyMO class is an abstract base class)
    // initialization constructor, taking OOIProxyMOData
    OOIProxyMO(
      const OOIProxyMOData     * data
      );
    //
    // type specific
    //
public:
    // data member access methods
    const OOIMOCMetaInfo     * metaInfo( ) const;
    virtual CMIS_ObjectClass    moClass( ) const;
    virtual const OOIString   & moClassId( ) const;
    const CMIS_ObjectInstance & moInstance( ) const;
    OOIProxyAgentXX          * agent( ) const;
    // data member update
    void    setAgent(    const OOIProxyAgentXX    * agent );       // may be NULL
    void    setMOInstance( const CMIS_ObjectInstance & moInstance ); // may be 'unselected'
                                                  // -> behaves like resetMOInstance( )
    void    resetMOInstance( );
    // create pmo from oid
    static OOIProxyMO        * createPMOFromOID(
            const OID        & oid,
            OOIBoolean         createGenericPMOIfOIDUnknown = true,
            OOIErrorMode       errorMode = OOI_ERR_RC
            );
    // make a copy of this pmo
    OOIProxyMO * copy( ) const;
    // * * * * * * * * * * * * * * * * * * * * * * * * * * * * * * * * * * * *
    //
    // packages cache related operations:
    //
    // predicate: packages cache is valid
    // method:    reset packages cache
    // (both more or less internal, but if you want to call them...)
    OOIBoolean                     packagesCacheIsValid( ) const;
    void                           resetPackages( );
    // the following operations are for replacing the standard
    // 'accessPackages( )' & 'getPackages( )' methods of DMI_ProxyTop
    // the DMI_ProxyTop class is uses these new methods
    // instead of the standard 'getAttribute( )' methods
    // applications usually call the DMI_ProxyTop methods rather than
    // these methods directly
    const DMI_Packages         * accessPackages( ) const;   // may return NULL
    DMI_Packages * getPackages(
            OOIStatus                * ooiStat = NULL    // OUT, if < > NULL
            ) const;
    //
    // remember: getPackages:
    //   if there is no packages attribute in the agent, this
    //   method behaves like standard CMIS:
    //   -> return CMISERR_NoSuchAttribute via 'ooiStat'/exception
    //
    // hasConditionalPackage:
```

-continued

```
        OOIBoolean hasConditionalPackage(
                OOIStatus          * ooiStat,              // OUT, if < > NULL
                const OID          & packageOID
                ) const;
        OOIBoolean hasPackagesPackage(
                OOIStatus          * ooiStat = NULL        // OUT, if < > NULL
                ) const;
// * * * * * * * * * * * * * * * * * * * * * * * * * * * * * * * * * * * * * *
//
// cmis operations, single mo / unscoped, synchronous
//
public:
        // implementation note:
        // although some methods may change the state of the packages cache,
        // they are declared as 'const'.
        // this also holds for MCreate, where the MOI info might be set from
        // info contained in the response
        // action
        void simpleMAction(
                OOIStatus          * ooiStat,              // OUT, if < > NULL
                const OID          & actionOID,            // IN
                const ASN1Type     * actionInfoData,       // IN, optional
                ASN1Type           * actionReplyDate = NULL,  // OUT, conditional
                OOIBoolean         * actionReplyPresence=NULL,// OUT, conditional
                const CMIS_Mode    & confirmationMode = OOI_CONFIRMED // IN
                ) const;
/* * * * * * * * * * * * * * * * * * * * * * * * * * * * * * * * * * * * * *
*
* Name:        simpleMAction
* Purpose:     issue cmis-action operation - single mo - single reply
* Input:       actionInfoData:
*                  if there is a INFORMATION SYNTAX specified for the action
*                     related to 'actionOID', data of the type as specified
*                     by INFORMATION SYNTAX has to be passed
*                  if there is no INFORMATION SYNTAX specified for the action
*                     related to 'actionOID', pass NULL
*
* Output:      actionReply:
*
*              only if confirmed:
*              actionReplyPresence:   indicates whether reply contains user info
*                                     (replySyntax) -> whether actionReply
*                                     contains data
*              actionReply:           holds user info from peer
*                                     only valid if 'actionReplyPresence' is true
* Return:      %
* Errors:      %
* Exceptions:  %
* Note:        don't use this method in case the agent may return multiple repies
*              (you have to use asynchronous calls instead)
*              for 'actionReplyData' you have to supply an object of the 'correct'
*                  ASN.1 syntax related to this particular action.
*                  In case this action has no reply syntax, simply pass NULL/NULL.
*
*              this interface provides for synchronous-confirmed as well as for
*              unconfirmed operations
*
*              Basically 'actionReplyPresence' is superflouous, since it should be
*              clear from the action definition whether there is replyData or not.
*              But for convenience, it is provided anyway.
* * * * * * * * * * * * * * * * * * * * * * * * * * * * * * * * * * * * * */
        // create
//protected: (must be public due to C++ cast problem)
public:
        void simpleMCreate(
                OOIStatus              * ooiStat,               // OUT, if < > NULL
                const CMIS_ObjectInstance * superiorMOInstanceName, // IN, may be NULL
                const OOIProxyMO       * referenceObject,       // IN, may be NULL
                const CMIS_AttributeList * attributeList        // IN, may be NULL
                //CMIS_AttributeList   * resultAttributeList = NULL   // OUT, conditional
                ) const;
        // currently no support for create-result information
        // if you're interested in create-result information
        //    -> use the asynchronous interface
        // simple delete
        void simpleMDelete(
                OOIStatus              * ooiStat = NULL         // OUT, if < > NULL
                ) const;
        // simpleMGet: get a single attribute
```

-continued

```
// see also getPackages( )
ASN1Type * simpleMGet(
    OOIStatus               * ooiStat,              // OUT, if < > NULL
    const OID               & attributeOID          // IN
    ) const;
void simpleMGet(
    OOIStatus               * ooiStat,              // OUT, if < > NULL
    const OID               & attributeOID,         // IN
    ASN1Type                & result                // OUT
    ) const;
// note: for 'result' you have to supply an object of the 'correct' ASN.1 syntax
//       related to 'attributeOID'
void simpleMGetSome(
    OOIStatus               * ooiStat,              // OUT, if < > NULL
    const CMIS_AttributeIdList  * attrIdList,       // IN, NULL->all
    CMIS_AttributeList      & attributeList         // OUT
    ) const;
// set
void simpleMSet(
    OOIStatus               * ooiStat,              // OUT, if < > NULL
    const OID               & attributeOID,         // IN
    const ASN1Type          * value,                // IN, conditional
    const CMIS_ModifyOperator & modifyOperator      // IN, with default
                            = CMIS_ModifyOperator::replace,
    ASN1Type                * result = NULL,        // OUT, conditional
    OOIBoolean              * resultPresence = NULL,// OUT, conditional
    const CMIS_Mode         & confirmationMode = OOI_CONFIRMED // IN
    ) const;
void simpleMSetToDefault(
    OOIStatus               * ooiStat,              // OUT, if < > NULL
    const OID               & attributeOID,         // IN
    ASN1Type                * result = NULL,        // OUT, conditional
    OOIBoolean              * resultPresent = NULL, // OUT, conditional
    const CMIS_Mode         & confirmationMode = OOI_CONFIRMED // IN
    ) const;
void simpleMReplace(
    OOIStatus               * ooiStat,              // OUT, if < > NULL
    const OID               & attributeOID,         // IN
    const ASN1Type          & value,                // IN
    ASN1Type                * result = NULL,        // OUT, conditional
    OOIBoolean              * resultPresence = NULL,// OUT, conditional
    const CMIS_Mode         & confirmationMode = OOI_CONFIRMED // IN
    ) const;
void simpleMAdd(
    OOIStatus               * ooiStat,              // OUT, if < > NULL
    const OID               & attributeOID,         // IN
    const ASN1Type          & value,                // IN
    ASN1Type                * result = NULL,        // OUT, conditional
    OOIBoolean              * resultPresence = NULL,// OUT, conditional
    const CMIS_Mode         & confirmationMode = OOI_CONFIRMED // IN
    ) const;
void simpleMRemove(
    OOIStatus               * ooiStat,              // OUT, if < > NULL
    const OID               & attributeOID,         // IN
    const ASN1Type          & value,                // IN
    ASN1Type                * result = NULL,        // OUT, conditional
    OOIBoolean              * resultPresence = NULL,// OUT, conditional
    const CMIS_Mode         & confirmationMode = OOI_CONFIRMED // IN
    ) const;
void simpleMSetSome(
    OOIStatus               * ooiStat,              // OUT, if < > NULL
    const CMIS_ModificationList & modificationList, // IN, mand.
    CMIS_AttributeList      * attributeListResult = NULL, // OUT, cond.
    OOIBoolean              * resultPresence = NULL,// OUT, conditional
    const CMIS_Mode         & confirmationMode = OOI_CONFIRMED // IN
    ) const;
/* * * * * * * * * * * * * * * * * * * * * * * * * * * * * * * * * * * * *
 *
 *  Name:      simpleMSet etc.
 *  Purpose:   issue cmis-set operation - single mo - single attribute
 *             if the caller is interested in the set-result value, he/she may indicate
 *             this by passing:
 *             - the address of an appropriate ASN.1 object (owned by the caller)
 *               as argument to 'result'.
 *             - the address of an OOIBoolean as argument to 'resultPresence'
 *             if the result is returned by the agent (which is not guaranteed), the
 *             'result' object will hold the value, and 'resultPresence' will indicate
 *             'true'.
 *  Input:     %
```

```
 *   Output:       result: see above
 *   Return:       %
 *   Errors:       %
 *   Exceptions:   %
 *   Note:
 *                 this interface provides for synchronous-confirmed as well as for
 *                 unconfirmed operations
 *
 * * * * * * * * * * * * * * * * * * * * * * * * * * * * * * * * * * * * * * * */
// * * * * * * * * * * * * * * * * * * * * * * * * * * * * * * * * * * * * * *
//
// 'receive attribute value'
// local access to attribute value of a cmis-get-result, get-list-error etc.
//
// - 'hasAttribute( )':      is an attribute value available ?
// - 'receiveAttribute( )':  unlink and return the attribute value
//    2 flavours:   1 - returning the value via result / reference
//                  2 - returning the value as pointer object,
//
// both methods come in two version:
// - request based, mainly useful for unscoped requests
// - response based, useful for scoped (& unscoped) requests
// request based versions:
OOIBoolean hasAttribute(
    OOIStatus              * ooiStat,              // OUT, if < > NULL
    const OOIPMORequest    & requestToken,         // IN
    const OID              & attributeOID          // IN
    ) const;
void receiveAttribute(
    OOIStatus              * ooiStat,              // OUT, if < > NULL
    OOIPMORequest          & requestToken,         // IN
    const OID              & attributeOID,         // IN
    ASN1Type               & result                // OUT
    ) const;
// note:  for 'result' you have to supply an object of the 'correct' ASN.1 syntax
//        related to 'attributeOID'
ASN1Type * receiveAttribute(
    OOIStatus              * ooiStat,              // OUT, if < > NULL
    OOIPMORequest          & requestToken,         // IN
    const OID              & attributeOID          // IN
    ) const;
ASN1Type * receiveActionReply(
    OOIStatus              * ooiStat,              // OUT, if < > NULL
    OOIPMORequest          & requestToken          // IN
    ) const;
void receiveActionReply(
    OOIStatus              * ooiStat,              // OUT, if < > NULL
    OOIPMORequest          & requestToken,         // IN
    ASN1Type               * actionReplyData,      // OUT, conditional (*)
    OOIBoolean             * actionReplyPresence = NULL // OUT, conditional
    ) const;
    // impl note (quirk):
    // 'actionReplyData' can not default to NULL, would collide with 1st version of this method
// note:  for 'actionReplyDate' you have to supply an object of the 'correct' ASN.1 syntax
//        related to this particular action. In case this action has no
//        reply syntax, simply pass NULL/NULL
// response based versions:
OOIBoolean hasAttribute(
    OOIStatus              * ooiStat,              // OUT, if < > NULL
    const OOIResponse      & response,             // IN
    const OID              & attributeOID          // IN
    ) const;
void receiveAttribute(
    OOIStatus              * ooiStat,              // OUT, if < > NULL
    OOIResponse            & response,             // IN (non-const)
    const OID              & attributeOID,         // IN
    ASN1Type               & result                // OUT
    ) const;
// note:  for 'result' you have to supply an object of the 'correct' ASN.1 syntax
//        related to 'attributeOID'
ASN1Type * receiveAttribute(
    OOIStatus              * ooiStat,              // OUT, if < > NULL
    OOIResponse            & response,             // IN (non-const)
    const OID              & attributeOID          // IN
    ) const;
ASN1Type * receiveActionReply(
    OOIStatus              * ooiStat,              // OUT, if < > NULL
    OOIResponse            & response              // IN (non-const)
    ) const;
```

-continued

```
    void receiveActionReply(
        OOIStatus              * ooiStat,              // OUT, if < > NULL
        OOIResponse            & response,             // IN (non-const)
        ASN1Type               * actionReplyData,      // OUT, conditional
        OOIBoolean             * actionReplyPresence = NULL // OUT, conditional
        ) const;
        // impl note (quirk):
        // 'actionReplyData' can not default to NULL, would collide with 1st version of this method
    // note:   for 'actionReplyData' you have to supply an object of the 'correct' ASN.1 syntax
    //         related to this particular action. In case this action has no
    //         reply syntax, simply pass NULL/NULL
    // * * * * * * * * * * * * * * * * * * * * * * * * * * * * * * * * * * * * *
    //
    // cmis operations, single mo, asynchronous
    //
    // action
    void simpleMActionRequest(
        OOIStatus              * ooiStat,              // OUT, if < > NULL
        OOIPMORequest          & requestToken,         // INOUT
        const OID              & actionOID,            // IN
        const ASN1Type         * actionInfo            // IN, optional
        ) const;
    // create
//protected: (must be public due to C++ cast problem)
public:
    void simpleMCreateRequest(
        OOIStatus              * ooiStat,              // OUT, if < > NULL
        OOIPMORequest          & requestToken,         // INOUT
        const CMIS_ObjectInstance * superiorMOInstanceName, // IN, may be NULL
        const OOIProxyMO       * referenceObject,      // IN, may be NULL
        const CMIS_AttributeList * attributeList       // IN, may be NULL
        ) const;
    // simple delete
    void simpleMDeleteRequest(
        OOIStatus              * ooiStat,              // OUT, if < > NULL
        OOIPMORequest          & requestToken          // INOUT
        ) const;
    // simpleMGet
    //     several versions, for one / some / none-one-some-all / all attributes
    //     the 3rd version is the one providing 'full' CMIS functionality
    //     (where 'attributeIdList' is an optional parameter)
    void simpleMGetRequest(
        OOIStatus              * ooiStat,              // OUT, if < > NULL
        OOIPMORequest          & requestToken,         // INOUT
        const OID              & attributeOID          // IN
        ) const;
    void simpleMGetSomeRequest(
        OOIStatus              * ooiStat,              // OUT, if < > NULL
        OOIPMORequest          & requestToken,         // INOUT
        const CMIS_AttributeIdList & attrIdList        // IN
        ) const;
    void simpleMGetSomeRequest(
        OOIStatus              * ooiStat,              // OUT, if < > NULL
        OOIPMORequest          & requestToken,         // INOUT
        const CMIS_AttributeIdList * attrIdList = NULL // IN, optional
        ) const;
    void simpleMGetAllRequest(
        OOIStatus              * ooiStat,              // OUT, if < > NULL
        OOIPMORequest          & requestToken          // INOUT
        ) const;
    // set
    void simpleMSetRequest(
        OOIStatus              * ooiStat,              // OUT, if < > NULL
        OOIPMORequest          & requestToken,         // INOUT
        const OID              & attributeOID,         // IN
        const ASN1Type         * value,                // IN, conditional
        const CMIS_ModifyOperator & modifyOperator     // IN, with default
                               = CMIS_ModifyOperator::replace
        ) const;
    void simpleMSetToDefaultRequest(
        OOIStatus              * ooiStat,              // OUT, if < > NULL
        OOIPMORequest          & requestToken,         // INOUT
        const OID              & attributeOID          // IN
        ) const;
    void simpleMReplaceRequest(
        OOIStatus              * ooiStat,              // OUT, if < > NULL
        OOIPMORequest          & requestToken,         // INOUT
        const OID              & attributeOID,         // IN
        const ASN1Type         & value                 // IN
```

-continued

```
    ) const;
void simpleMAddRequest(
    OOIStatus                 * ooiStat,              // OUT, if < > NULL
    OOIPMORequest             & requestToken,         // INOUT
    const OID                 & attributeOID,         // IN
    const ASN1Type            & value                 // IN
    ) const;
void simpleMRemoveRequest(
    OOIStatus                 * ooiStat,              // OUT, if < > NULL
    OOIPMORequest             & requestToken,         // INOUT
    const OID                 & attributeOID,         // IN
    const ASN1Type            & value                 // IN
    ) const;
void simpleMSetSomeRequest(
    OOIStatus                 * ooiStat,              // OUT, if < > NULL
    OOIPMORequest             & requestToken,         // INOUT
    const CMIS_ModificationList & modificationList    // IN, mand.
    ) const;
// * * * * * * * * * * * * * * * * * * * * * * * * * * * * * * * * * * *
// 'generic' CMIS request method
// for specification: check similar methods at proxy agent / OOI request class
void sendCMISRequest(
    OOIStatus                 * ooiStat,              // OUT, if < > NULL
    OOIPMORequest             & requestToken,         // INOUT
    const ASN1Type            & cmisRequest,          // IN
    OOIReqServicePrimitiveEnum  primitive = CMIS_SP_UNSPECIFIED, // IN
    OOIRequest::WaitMode        waitMode
                              = OOIRequest::waitUntilPartialReply  // IN
    ) const;
// * * * * * * * * * * * * * * * * * * * * * * * * * * * * * * * * * * *
//
// cmis operations, scoped, synchronous
//
// scoped MGet: get some mo's,
// - cannot be used to retrieve attributes
//   (except objectclass/objectinstance)
//   use asynchronous scoped get calls in order to retrieve attributes
void scopedMGet(
    OOIStatus                 * ooiStat,              // OUT, if < > NULL
    OOIProxyMOList            & proxyMOList,          // OUT
    const CMIS_Scope          & scope,                // IN, mandatory
    const CMIS_Filter         * filter         = NULL, // IN, optional
    const CMIS_Sync           * synchronization = NULL // IN, optional
    );
// alternatively to the generalized 'scopedMGet' method,
// these scope specific methods are offered:
void getSubordinates(
    OOIStatus                 * ooiStat,              // OUT, if < > NULL
    OOIProxyMOList            & proxyMOList,          // OUT
    const CMIS_Filter         * filter         = NULL, // IN, optional
    const CMIS_Sync           * synchronization = NULL // IN, optional
    );
void getNthLevelSubordinates(
    OOIStatus                 * ooiStat,              // OUT, if < > NULL
    OOIProxyMOList            & proxyMOList,          // OUT
    int                         nthLevel,             // IN
    const CMIS_Filter         * filter         = NULL, // IN, optional
    const CMIS_Sync           * synchronization = NULL // IN, optional
    );
void getBaseToNthLevelSubordinates(
    OOIStatus                 * ooiStat,              // OUT, if < > NULL
    OOIProxyMOList            & proxyMOList,          // OUT
    int                         nthLevel,             // IN
    const CMIS_Filter         * filter         = NULL, // IN, optional
    const CMIS_Sync           * synchronization = NULL // IN, optional
    );
void getWholeSubtree(
    OOIStatus                 * ooiStat,              // OUT, if < > NULL
    OOIProxyMOList            & proxyMOList,          // OUT
    const CMIS_Filter         * filter         = NULL, // IN, optional
    const CMIS_Sync           * synchronization = NULL // IN, optional
    );
// scoped delete
void scopedMDelete(
    OOIStatus                 * ooiStat,              // OUT, if < > NULL
    const CMIS_Scope          & scope,                // IN, mandatory
    const CMIS_Filter         * filter         = NULL, // IN, optional
    const CMIS_Sync           * synchronization = NULL // IN, optional
    );
```

-continued

```
// *****************************************************
//
// cmis operations, scoped, asynchronous
//
// action
void scopedMActionRequest(
    OOIStatus              * ooiStat,              // OUT, if < > NULL
    OOIPMORequest          & requestToken,         // INOUT
    const OID              & actionOID,            // IN
    const ASN1Type         * actionInfoData,       // IN, optional
    const CMIS_Scope       & scope,                // IN, mandatory
    const CMIS_Filter      * filter        = NULL, // IN, optional
    const CMIS_Sync        * synchronization = NULL // IN, optional
    ) const;
// create
// - there is no scoped create request
// scoped delete
void scopedMDeleteRequest(
    OOIStatus              * ooiStat,              // OUT, if < > NULL
    OOIPMORequest          & requestToken,         // INOUT
    const CMIS_Scope       & scope,                // IN, mandatory
    const CMIS_Filter      * filter        = NULL, // IN, optional
    const CMIS_Sync        * synchronization = NULL // IN, optional
    ) const;
// scoped get:
//     several versions, for one / some / none-one-some-all / all attributes
//     the 3rd version is the one providing 'full' CMIS functionality
//     (where 'attributeIdList' is an optional parameter)
void scopedMGetRequest(
    OOIStatus              * ooiStat,              // OUT, if < > NULL
    OOIPMORequest          & requestToken,         // INOUT
    const OID              & attributeOID,         // IN
    const CMIS_Scope       & scope,                // IN, mandatory
    const CMIS_Filter      * filter        = NULL, // IN, optional
    const CMIS_Sync        * synchronization = NULL // IN, optional
    ) const;
void scopedMGetSomeRequest(
    OOIStatus              * ooiStat,              // OUT, if < > NULL
    OOIPMORequest          & requestToken,         // INOUT
    const CMIS_AttributeIdList * attrIdList,       // IN
    const CMIS_Scope       & scope,                // IN, mandatory
    const CMIS_Filter      * filter        = NULL, // IN, optional
    const CMIS_Sync        * synchronization = NULL // IN, optional
    ) const;
void scopedMGetSomeRequest(
    OOIStatus              * ooiStat,              // OUT, if < > NULL
    OOIPMORequest          & requestToken,         // INOUT
    const CMIS_AttributeIdList * attrIdList,       // IN, optional
    const CMIS_Scope       & scope,                // IN, mandatory
    const CMIS_Filter      * filter        = NULL, // IN, optional
    const CMIS_Sync        * synchronization = NULL // IN, optional
    ) const;
void scopedMGetAllRequest(
    OOIStatus              * ooiStat,              // OUT, if < > NULL
    OOIPMORequest          & requestToken,         // INOUT
    const CMIS_Scope       & scope,                // IN, mandatory
    const CMIS_Filter      * filter        = NULL, // IN, optional
    const CMIS_Sync        * synchronization = NULL // IN, optional
    ) const;
// set
void scopedMSetRequest(
    OOIStatus              * ooiStat,              // OUT, if < > NULL
    OOIPMORequest          & requestToken,         // INOUT
    const OID              & attributeOID,         // IN
    const ASN1Type         * value,                // IN, conditional
    const CMIS_ModifyOperator & modifyOperator     // IN
                           // = CMIS_ModifyOperator::replace
    const CMIS_Scope       & scope,                // IN, mandatory
    const CMIS_Filter      * filter        = NULL, // IN, optional
    const CMIS_Sync        * synchronization = NULL // IN, optional
    ) const;
void scopedMSetToDefaultRequest(
    OOIStatus              * ooiStat,              // OUT, if < > NULL
    OOIPMORequest          & requestToken,         // INOUT
    const OID              & attributeOID,         // IN
    const CMIS_Scope       & scope,                // IN, mandatory
    const CMIS_Filter      * filter        = NULL, // IN, optional
    const CMIS_Sync        * synchronization = NULL // IN, optional
    ) const;
```

-continued

```
    void scopedMReplaceRequest(
        OOIStatus              * ooiStat,                          // OUT, if < > NULL
        OOIPMORequest          & requestToken,                     // INOUT
        const OID              & attributeOID,                     // IN
        const ASN1Type         & value,                            // IN
        const CMIS_Scope       & scope,                            // IN, mandatory
        const CMIS_Filter      * filter          = NULL,           // IN, optional
        const CMIS_Sync        * synchronization = NULL            // IN, optional
        ) const;
    void scopedMAddRequest(
        OOIStatus              * ooiStat,                          // OUT, if < > NULL
        OOIPMORequest          & requestToken,                     // INOUT
        const OID              & attributeOID,                     // IN
        const ASN1Type         & value,                            // IN
        const CMIS_Scope       & scope,                            // IN, mandatory
        const CMIS_Filter      * filter          = NULL,           // IN, optional
        const CMIS_Sync        * synchronization = NULL            // IN, optional
        ) const;
    void scopedMRemovalRequest(
        OOIStatus              * ooiStat,                          // OUT, if < > NULL
        OOIPMORequest          & requestToken,                     // INOUT
        const OID              & attributeOID,                     // IN
        const ASN1Type         & value,                            // IN
        const CMIS_Scope       & scope,                            // IN, mandatory
        const CMIS_Filter      * filter          = NULL,           // IN, optional
        const CMIS_Sync        * synchronization = NULL            // IN, optional
        ) const;
    void scopedMSetSomeRequest(
        OOIStatus              * ooiStat,                          // OUT, if < > NULL
        OOIPMORequest          & requestToken,                     // INOUT
        const CMIS_ModificationList & modificationList,            // IN, mand.
        const CMIS_Scope       & scope,                            // IN, mandatory
        const CMIS_Filter      * filter          = NULL,           // IN, optional
        const CMIS_Sync        * synchronization = NULL            // IN, optional
        ) const;
// * * * * * * * * * * * * * * * * * * * * * * * * * * * * * * * * * * * * * *
//
// general operations
//
// reset
    void                     reset( );
// asString, not yet supported for this class. use dump( )
// OOIString    asString( ) const;
// print operator / dump
    friend ostream&   operator<<( ostream& os, const OOIProxyMO& mo);
    void              dump     ( ostream& os, OOIBoolean withData) const;
// narrow-operator:
// not supported for this abstract base class
//    but for all subclasses
// static OOIProxyMO * narrow( const OOIProxyMO    * source,
//                             OOICheckModeT       chkMode = OOI_CHK_TYPE_RC );
// widen:
// cast to base class pointer
    virtual OOIProxyMO *     widen( ) const;
// * * * * * * * * * * * * * * * * * * * * * * * * * * * * * * * * * * * * * *
    protected:
        // class members:
        // unfortunately '_data' has to be public
        // in order to allow access to '_data' for generated code
        // (reason: 'this' is casted)
    public:
        OOIProxyMOData       * _data;
};
// * * * * * * * * * * * * * * * * * * * * * * * * * * * * * * * * * * * * * *
//
// class OOIProxyMOList (public class)
//
// - a OOIProxyMOList contains a list of pointers to OOIProxyMO's
// - the OOIProxyMO's in this list are 'owned' by the list,
// - when the list is destroyed, the elements that are currently referenced
//   the list, are destroyed too.
// - in and out operations are per pointer, not per value copy.
//   therefore, assignment & copy constructor's are currently not supported
//
// for operations, see Collection Class Library documentation about 'ISequence'
//#include <iseq.h>
class   OOIProxyMOList : public ISequence <OOIProxyMO * >
{
  public:
```

-continued

```
        //
        // standard methods
        //
        // default constructor
        OOIProxyMOList( ) : ISequence<OOIProxyMO*>( ) { ;}
    private:
        // copy constructor, disabled
        OOIProxyMOList( const OOIProxyMOList & );
        // std. assignment, disabled
        OOIProxyMOList& operator=( const OOIProxyMOList & );
    public:
        // destructor
        virtual %OOIProxyMOList( );    // follow pointers and delete OOIProxyMOs
        //
        // type specific
        //
        void      removeAllObjects( );
        // unlink 'element'
        // returns NULL, if 'element' was not in list
        OOIProxy MO * unlinkElement( OOIProxyMO * element );
};
// * * * * * * * * * * * * * * * * * * * * * * * * * * * * * * * * * * * * * * * * * * *
//
// undefine packages cache / cmis create related dummy definitions
//
#ifndef __DMI_PACKAGES_INCLUDED__
 #undef  DMI_Packages
#endif
#ifndef __DMI_NAME_BINDING_INCLUDED__
 #undef  DMI_NameBinding
#endif
// * * * * * * * * * * * * * * * * * * * * * * * * * * * * * * * * * * * * * * * * * * *
#endif
```

Listing 6: Generated DMI Proxy Managed Object Class
```
// This file has been generated by the Object Oriented Interface Generator 1995
// Version 1.2.0
//
//    Time: WED NOV 29 18:36:16 1995
//
//
// SHARED LIBRARIES used
//
#ifndef __DMI_PROXY_SYSTEM_INCLUDED__
#define __DMI_PROXY_SYSTEM_INCLUDED__
//
// this class DMI_ProxySystem represents
//    remote 'system' managed objects
// include all superior classes
#include "DMI_ProxyTop.H"
// include related document
#include "DMI.GDMO.INIT.H"
// include ASN.1 types of all attributes
#include "DMI_SystemId.H"
#include "DMI_SystemTitle.H"
#include "DMI_OperationalState.H"
#include "DMI_UsageState.H"
#include "DMI_AdministrativeState.H"
#include "DMI_SupportedFeatures.H"
class DMI_ProxySystem : public DMI_ProxyTop
{
    public:
        //
        // standard methods
        //
        // default constructor/ initialization constructor
        DMI_ProxySystem( const OOIProxyAgentXX     * agent = NULL,
                         const CMIS_ObjectInstance * instanceName = NULL );
        DMI_ProxySystem( const OOIProxyMOData      * data );
    private:
        // copy constructor
            // copy constructor is disabled to avoid multiple
            // proxies of the same managed object instance
            DMI_ProxySystem( const DMI_ProxySystem& rhs );
```

-continued

```
    // assignment operator
        // assignment operator is disabled to avoid multiple
        // proxies of the same managed object instance
        DMI_ProxySystem& operator=( const DMI_ProxySystem& rhs );
public:
    // destructor
        virtual
        #DMI_ProxySystem( );
    ////////////////////////////////////////////////////
    // SYNCHRONOUS INTERFACE //
    ////////////////////////////////////////////////////
    //
    // single attribute related methods
    //
    // attributes of mandatory package 'systemPackage'
    DMI_SystemId*           getSystemId( OOIStatus * _status );
    DMI_SystemTitle*        getSystemTitle( OOIStatus * _status );
    DMI_OperationalState*   getOperationalState( OOIStatus * _status );
    DMI_UsageState*         getUsageState( OOIStatus * _status );
    // attributes of conditional package 'administrativeStatePackage'
    OOIBoolean              hasAdministrativeStatePackage( OOIStatus * _status = NULL );
    DMI_AdministrativeState*   getAdministrativeState( OOIStatus & _status );
    void                setAdministrativeState( OOIStatus & _status,
                            const DMI_AdministrativeState & _value ,
                            const CMIS_Mode & _confimrationMode = OOI_CONFIRMED );
    // attributes of condtional package 'supportedFeaturesPackage'
    OOIBoolean              hasSupportedFeaturesPackage( OOIStatus & _status = NULL );
    DMI_SupportedFeatures*  getSupportedFeatures( OOIStatus * _status );
    void                setSupportedFeatures( OOIStatus * _status,
                            const DMI_SupportedFeatures & _value ,
                            const CMIS_Mode & _confirmationMode = OOI_CONFIRMED );
    void                addSupportedFeaturesElement( OOIStatus * _status,
                            const DMI_SupportedFeatures & _value ,
                            const CMIS_Mode & _confirmationMode = OOI_CONFIRMED );
    void                removeSupportedFeaturesElement( OOIStatus * _status,
                            const DMI_SupportedFeatures & _value ,
                            const CMIS_Mode & _confirmationMode = OOI_CONFIRMED );
    //
    // methods to create and delete managed objects
    //
    // create a managed object
    void simpleMCreate( OOIStatus                  * _status,
                        const CMIS_ObjectInstance  * _superiorMOInstanceName = NULL,
                        const DMI_ProxySystem      * _referenceObject = NULL,
                        // only two attributes of class Top
                        const DMI_NameBinding      * nameBinding = NULL,
                        const DMI_Packages         * packages = NULL,
                        // attributes of mandatory package 'systemPackage'
                        const DMI_SystemId*          systemId = NULL,
                        const DMI_SystemTitle*       systemTitle = NULL,
                        const DMI_OperationalState*  operationalState = NULL,
                        const DMI_UsageState*        usageState = NULL,
                        // attributes of conditional package 'administrativeStatePackage'
                        const DMI_AdministrativeState*  administrativeState = NULL,
                        // attribute of conditional package 'supportedFeaturesPackage'
                        const DMI_SupportedFeatures*    supportedFeatures = NULL
                        };
    // delete a managed object (inherited from class OOIProxyMO)
    // void simpleMDelete( OOIStatus              * _status,
                        // attributes of class Top
                        CMIS_ObjectClass         ** objectClass,
                        DMI_NameBinding          ** nameBinding,
                        DMI_Packages             ** packages,
                        DMI_Allomorphs           ** allomorphs,
                        // atttributes of mandatory package 'systemPackage'
                        DMI_SystemId**             systemId,
                        DMI_SystemTitle**          systemTitle,
                        DMI_OperationalState**     operationalState,
                        DMI_UsageState**           usageState,
                        // attributes of conditional package 'administrativeStatePackage'
                        DMI_AdministrativeState**       administrativeState,
                        attributes of conditional package 'supportedFeaturesPackage'
                        DMI_SupportedFeatures**    supportedFeatures
                        };
//
// method to set some or all settable attributes
//
void simpleMSetSome( OOIStatus           * _status,
                     const CMIS_Mode     & _confirmationMode,
```

```
                        attributes of conditional package 'administrativeStatePackage'
                        const DMI_AdministrativeState*    administrativeState = NULL,
                        // attributes of conditional package 'supportedFeaturesPackage'
                        const DMI_SupportedFeatures*      supportedFeatures = NULL
    };
/////////////////////////////////////////////////
// ASYNCHRONOUS INTERFACE //
/////////////////////////////////////////////////
//
// single attribute related request methods
//
// attributes of mandatory package 'systemPackage'
void                    getSystemIdRequest{
                        OOIStatus              * _status,
                        OOIPMORequest          & _requestToken };
void                    getSystemTitleRequst{
                        OOIStatus              * _status,
                        OOIPMORequest          & _requestToken };
void                    getOperationalStateRequest{
                        OOIStatus              * _status,
                        OOIPMORequest          & _requestToken };
void                    getUsageStateRequest{
                        OOIStatus              * _status,
                        OOIPMORequest          & _requestToken };
// attributes of conditional package 'admnistrativeStatePackage'
void                    getAdministrativeStateRequest{
                        OOIStatus              * _status,
                        OOIPMORequest          & _requestToken };
                        void                   setAdministrativeStateRequest{
                        OOIStatus              * _status,
                        OOIPMORequest          & _requestToken };
                        const DMI_AdministrativeState & _value };
attributes of conditional package 'supportedFeaturesPackage'
void                    getSupportedFeaturesRequest{
                        OOIStatus              * _status,
                        OOIPMORequest          & _requestToken };
void                    setSupportedFeatruesRequst{
                        OOIStatus              * _status,
                        OOIPMORequest          & _requestToken };
                        const DMI_SupportedFeatures & _value };
void                    addSupportedFeaturesElementRequest{
                        OOIStatus              * _status,
                        OOIPMORequest          & _requestToken };
                        const DMI_SupportedFeatures & _value };
void                    removeSupportedFeaturesElementRequest{
                        OOIStatus              * _status,
                        OOIPMORequest          & _requestToken };
                        const DMI_SupportedFeatures & _value };
//
// single attribute related receive methods
//
// attributes of mandatory package 'systemPackage'
DMI_SystemId*           receiveSystemId{
                        OOIStatus              * _status,
                        OOIPMORequest          & _requestToken };
DMI_SystemId*           receiveSystemId{
                        OOIStatus              * _status,
                        OOIPMORequest          & _requestToken };
DMI_SystemTitle*        receive SystemTitle{
                        OOIStatus              * _status,
                        OOIPMORequest          & _requestToken };
DMI_SystemTitle*        receive SystemTitle{
                        OOIStatus              * _status,
                        OOIPMORequest          & _requestToken };
DMI_OperationalState*   receiveOperationalState{
                        OOIStatus              * _status,
                        OOIPMORequest          & _requestToken };
DMI_OperationalState*   receiveOperationalState{
                        OOIStatus              * _status,
                        OOIPMORequest          & _requestToken };
DMI_UsageState*         receiveUsageState{
                        OOIStatus              * _status,
                        OOIPMORequest          & _requestToken };
DMI_UsageState*         receiveUsageState{
                        OOIStatus              * _status,
                        OOIPMORequest          & _requestToken };
// attributes of conditional package 'administrativeStatePackage'
DMI_AdministrativeState* receiveAdministrativeState{
                        OOIStatus              * _status,
```

-continued

```
                              OOIPMORequest      & _requestToken };
       DMI_AdministrativeState*  receiveAdministrativeState{
                              OOIStatus          * _status,
                              OOIPMORequest      & _requestToken };
// attributes of conditional package 'supportedFeaturesPackage'
       DMI_SupportedFeatures*   receiveSupportedFeatures{
                              OOIStatus          * _status,
                              OOIPMORequest      & _requestToken };
       DMI_SupportedFeatures*   receiveSupportedFeatures{
                              OOIStatus          * _status,
                              OOIPMORequest      & _requestToken };
//
// request methods to create and delete managed objects
//
// create a managed object
       void simpleMCreateRequest{ OOIStatus           * _status,
                              OOIPMORequest       & _requestToken,
                  const CMIS ObjectInstance * _superiorMOInstanceName = NULL,
                  const DMI_ProxySystem     * _referenceObject = NULL,
                  // only two attributes of class Top
                  const DMI_NameBinding        * nameBinding = NULL,
                  const DMI_Packages           * packages = NULL,
                  // attributes of mandatory package 'systemPackage'
                  const DMI_SystemId*          systemId = NULL,
                  const DMI_SystemTitle*       systemTitle = NULL,
                  const DMI_OperationalState*  operationalState = NULL,
                  const DMI_UsageState*        usageState = NULL,
                  // attributes of conditional package 'administrativeStatePackage'
                  const DMI_AdministrativeState*  administrativeState = NULL,
                  // attributes of conditional package 'supportedFeaturesPackage'
                  const DMI_SupportedFeatures*    supportedFeatures = NULL
                  };
// delete a managed object (inherited from class OOIProxyMO)
//void    simpleMDelete{    OOIStatus           * _status,
//                          OOIPMORequest       & _requestToken };
//
// requst method to get some or all attributes
//
       void simpleMGetSomeRequest{ OOIStatus          * _status,
                              OOIPMORequest{      & _request(Token };
                  // attributes of class Top
                  CMIS ObjectClass       ** objectClass,
                  DMI_NameBinding        ** nameBinding,
                  DMI_Packages           ** packages,
                  DMI_Allomorphs         ** allmomorphs,
                  // attributes of mandatory package 'systemPackage'
                  DMI_SystemId**         systemId,
                  DMI_SystemTitle**      systemTitle,
                  DMI_OperationalState** operationalState,
                  DMI_UsageState**       usageState,
                  // attributes of conditional package 'administrativeStatePackage'
                  DMI_AdministrativeState**   administrativeState,
                  // attributes of conditional package 'supportedFeaturesPackage'
                  const DMI_SupportedFeatures* supportedFeatures = NULL
           };
//
// instance creation and narrowing
//
       static OOIProxyMO *        create( );
       static DMI_ProxySystem *   narrow{ const OOIProxyMO    * source,
                                  OOICheckModel    chkMode = OOI_CHK_TYPE_RC };
       virtual OOIProxyMO *     widen( ) const;
};
#endif // _DMI_PROXY_SYSTEM_INCLUDED_
```

Listing 7: Notification Base Class
```
/****************************************************************************/
/**                                                                        */
/**    Licensed Materials - Property of IBM                                */
/**                                                                        */
/**    5799-QLN                                                            */
/**                                                                        */
/**    © Copyright IBM corporation 1995                                    */
/**                                                                        */
```

-continued

```
/************************************************************************/
#ifndef _OOI_NOTIFICATION_INCLUDED_
#define _OOI_NOTIFICATION_INCLUDED_
//
// class OOINotification
//
// this abstract class is the base class of all notification classes
//
class OOINotification : public OOIIndicationOrNotification {
    friend class OOIPropyAgentXX;
    //
    // standard constructors/destructors
    //
    private:
        // default constructor, disabled
        OOINotification( );
        // copy constructor, disabled
        OOINotification( const OOINotification& rhs );
        // standard assignment operator, disabled
        OOINotification& operator=( const OOINotification& rhs );
    public:
        // destructor
        virtual ҲOOINotification( );
    protected:
        //
        // type specific
        //
        // initialization constructor
        OOINotification{
                        const OOINotificationQueue    * queueReference,
                        int                             invokeId,
                        OOIBoolean                      toBeConfirmed,
                        OOIError                      * error,
                        const ASN1Type                * date,
                        const OOINotificationMetaInfo * metaInfo );
        OOINotification{   const OOINotificationMetaInfo    * metaInfo
                    };
        void set{       const OOINotificationQueue    * queueReference,
                        int                             invokeId,
                        OOIBoolean                      toBeConfirmed,
                        OOIError                      * error,
                        const ASN1Type                * data );
    public:
        // reference to own queue
        OOINotificationQueue * queueReference( ) const;
        const OOINotificationMetaInfo = metaInfo( ) const;
        virtual const OID         & oid( ) const;
        // generic interface
        // access to info syntax
        ASN1Type *                informationSyntaxGeneric( );
        // event argument access:
        const CMIS_EventReportArgument& eventReportArgument( ) const;
        // reply methods:
        void replyGeneric{
                    OOIStatus              * ooiStat,             // OUT, if < > NULL
                    const ASN1Type         * replyValue = NULL );  // IN, may be NULL
                                                                   // NULL <—> no reply syntax
        void eventReply{
                    OOIStatus              * ooiStat,             // OUT, if < > NULL
                    const CMIS_EventReportResult & reply };
        void errorReply{
                    OOIStatus              * ooiStat,             // OUT, if < > NULL
                    const OOICMISError     & reply };
        // create notification from OID
        static OOINotification * creatNotificationFromOID{
                    const OID         & oid,
                    OOIBoolean          createGenericNotificationIfOIOUnknown = true,
                    OOIErroMode         errorMode = OOI_ERR_RC
        // dump operation, for debugging
        virtual void       dump( ostream& os, OOIBoolean withData ) const;
        // data members
+private:
    OOINotificationMetaInfo * _metaInfo;
};
#endif // _OOI_NOTIFICATION_INCLUDED_
```

Listing 8: Generated DMI Object Creation Class

```
// This file has been generated by the Object Oriented Interface Generator 1995
// Version 1.2.0
//
//   Time: WED NOV 29 18:36:50 1995
//
//
// SHARED LIBRARIES used
//
//
//   objectCreation NOTIFICATION
//      BEHAVIOUR
//         objectCreationBehaviour
//         WITH INFORMATION SYNTAX Notification-ASN1Module.DMI_ObjectInfo
//         AND ATTRIBUTE IDS
//            sourceIndicator    sourceIndicator
//            attributeList    attributeList
//            notificationIdentifier    notificationIdentifier
//            correlatedNotifications    correlatedNotifications
//            additionalText    additionalText
//               additionalInformation    additionalInformation
//      REGISTERED AS {2.9.3.2.10.6}
#ifndef _NOTIFICATION_DMI_OBJECT_CREATION_INCLUDED_
#define _NOTIFICATION_DMI_OBJECT_CREATION_INCLUDED_
#include "DMI_DOCUMENT.H"
#include "OOIQueues.H"
#include "DMI_ObjectionInfo.H"
#include "DMI_SourceIndicator.H"
#include "DMI_AttributeList.H"
#include "DMI_NotificationIdentifier.H"
#include "DMI_CorrelatedNotifications.H"
#include "DMI_AdditionalText.H"
#include "DMI_AdditionalInformation.H"
class DMI_objectCreation : public OOINotification
{
    //
    // standard methods
    //
    public:
    // default constructor
    DMI_objectCreation( );
    // destructor
    virtual #DMI_objectCreation( );
    private:
    // copy constructor, disabled
    DMI_objectCreation( const DMI_objectCreation & rhs );
    // assignment operator, disabled
    DMI_objectCreation & operator={ const DMI_objectCreation & rhs };
    public:
    //
    // information & reply syntax
    //
    // return INFORMATION SYNTAX
    const DMI_ObjectInfo*    informationSyntax( );
    // send REPLY SYNTAX
    void     reply( OOIStatus   * _status = NULL ); // OUT, if < > NULL
    //
    // access to attribute ids ( WITH ALTERNATIVE IDS clause )
    //
//   NOTE:   if the component of the underlying ASN.1 type (SEQUENCE) related to
//            a field is optional, NULL will be returned if the corresponding attribute
//            has not been sent.
    DMI_SourceIndicator*    sourceIndicator( );
    DMI_AttributeList*    attributeList( );
    DMI_NotificationIdentifier*    notificationIdentifier( );
    DMI_CorrelatedNotifications*    correlatedNotifications( );
    DMI_AdditionalText*    additionalText( );
    DMI_AdditionalInformation*    additionalInformation( );
    //
    // weak type interface support
    //
    static OOINotification         * create( );
    static DMI_objectCreation * narrow( const OOINotification * source,
                          OOICheckModeT chkMode = OOI_CHK_TYPE_RC );
};
#endif
```

Having thus described our invention, what we claim and desire to protect by Letters Patent is:

1. An object-oriented programming interface for developing and running a plurality of network management applications on a network communication infrastructure, wherein each of said management applications has access to and can manipulate a plurality of managed objects which are accessible at a plurality of remote managed agents through the communication infrastructure and can exchange management information between the management applications and the remote managed agents, and wherein the plurality of managed objects are defined by a corresponding plurality of managed object classes and are specified in an object-oriented syntax notation defining data types; said programming interface comprising:

object interface composing means for generating code which provides a plurality of proxy managed object classes as local representatives for the plurality of managed object classes, a plurality of object classes for types defined in said syntax notation, a plurality of notification classes for incoming notifications, and a plurality of object-oriented methods for manipulating a plurality of specified managed objects;

run time system means for providing a plurality of proxy agent object classes as representatives for the plurality of remote managed agents which provide access to the operations of the common management information services;

wherein the code generated by the object interface composing means is linked to the run time system for execution.

2. The programming interface according to claim 1, wherein the object interface composing means generates C++ code, the application programs are written in C++, and the plurality of proxy managed object classes and the ASN classes are object classes in C++.

3. The programming interface according to claim 1 or 2, wherein the object interface composing means generates automatically proxy managed object C++ class definitions and implementation files based on managed objects written in accordance with the ISO standard GDMO and ASN.1.

4. The programming interface according to claim 1 or 2, wherein the object interface composing means comprises generating means for the generation of code for said plurality of managed objects based on the specifications of management information in GDMO and in ASN.1.

5. The programming interface according to claim 1, including means for providing non-direct-addressing proxy agents for which, for each management request, the agent must be addressed explicitly by supplying an addressing parameter as part of the request by means of a context object or implicitly through a directory service.

6. The programming interface according to claim 5 wherein the object interface composing means generates a C++ class for every GDMO managed object class, a C++ class for each ASN.1 type, a C++ class for every GDMO notification, meta information data structures for GDMO and ASN.1, and a set of utility files.

7. The programming interface according to claim 1, including means for signalling errors by error objects returned as a function return or through function reference arguments and by error objects thrown by exceptions.

8. The programming interface according to claim 7, including means for defining error classes representing an inheritance hierarchy.

9. The programming interface according to claim 1, wherein the inheritance relation between generated proxy managed object classes in C++ reflects the inheritance relation of the managed object classes defined in GDMO and ASN.1 documents.

10. The programming interface according to claim 9, wherein the definition of managed object classes is derived from more than one superior class thereby providing multiple inheritances.

11. The programming interface according to claim 1, wherein said plurality of managed objects are fully embedded into C++ to allow strong type checking at compile time.

12. The programming interface according to claim 1, wherein said incoming notifications are stored in an event queue object.

13. The programming interface according to claim 1, wherein the plurality of proxy agent objects provide a service interface to the operations of the common management information services.

14. The programming interface according to claim 1, including means for providing direct-addressing proxy agents which can connect to one specific agent at a time.

15. The programming interface according to claim 1 wherein the proxy agents provide a set of additional methods including simple-create, simple-get, simple-action and simple-delete to perform operations on only one attribute of one managed object or on several attributes of a single managed object.

16. The programming interface according to claim 1, wherein the run time system receives notifications and stores them in the event queue means of the responsible proxy agent object.

* * * * *